(12) United States Patent
Dorantes Loarca et al.

(10) Patent No.: US 12,301,477 B2
(45) Date of Patent: May 13, 2025

(54) SYSTEMS AND METHODS FOR AUTOMATIC NETWORK HEALTH CHECK

(71) Applicant: Oracle International Corporation, Redwood Shores, CA (US)

(72) Inventors: Edgar Jesus Dorantes Loarca, Olympia, WA (US); Danyang He, Seattle, WA (US); Xiangkun Dai, Lynnwood, WA (US); Oleksandr (Alex) Kadushko, Knoxville, TN (US); Andi Mullaraj, San Jose, CA (US); Sharath Vaddempudi, Issaquah, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/946,526

(22) Filed: Sep. 16, 2022

(65) Prior Publication Data
US 2024/0098038 A1    Mar. 21, 2024

(51) Int. Cl.
*H04L 49/25* (2022.01)
*H04L 43/10* (2022.01)
*H04L 41/40* (2022.01)
*H04L 43/026* (2022.01)
*H04L 43/20* (2022.01)
*H04L 43/50* (2022.01)

(52) U.S. Cl.
CPC .............. *H04L 49/25* (2013.01); *H04L 43/10* (2013.01)

(58) Field of Classification Search
None
See application file for complete search history.

(56) References Cited

U.S. PATENT DOCUMENTS

| 9,246,804 | B1 * | 1/2016 | Muir | H04L 45/74 |
| 11,115,309 | B1 * | 9/2021 | Scholl | H04L 43/12 |
| 11,212,216 | B2 * | 12/2021 | Beck | H04L 45/124 |
| 2006/0233155 | A1 | 10/2006 | Srivastava | |

(Continued)

OTHER PUBLICATIONS

Author: Camilla Zhang Title: "Top of Rack VS End of Row: Which to Choose for Data Center Network" Year: 2018 (Year: 2018).*

(Continued)

*Primary Examiner* — Kamal M Hossain
(74) *Attorney, Agent, or Firm* — Kilpatrick Townsend & Stockton LLP

(57) ABSTRACT

Systems and methods for automatic network health check are disclosed herein. A method for performing an automatic health check includes determining to perform a health check on a portion of a communications network, the communications network including a plurality of hosts that each include a routing agent and an advertising agent. The method includes adding a test route indicated as applicable to every host and pointing to an IP address to a database, and receiving the test route from the database with the routing agents of at least some of the plurality of hosts. The method includes providing the test route from the routing agent to the advertising agent, advertising the test route with of the at least some of the plurality of hosts to a plurality of switches within the communications network, and determining success of health check based on information received from the plurality of switches.

20 Claims, 17 Drawing Sheets

(56) References Cited

U.S. PATENT DOCUMENTS

| | | | | |
|---|---|---|---|---|
| 2007/0294399 A1* | 12/2007 | Grossner | ............... | H04L 41/22 |
| | | | | 709/224 |
| 2008/0304497 A1* | 12/2008 | Viswanath | ............ | H04L 45/04 |
| | | | | 370/401 |
| 2019/0166036 A1* | 5/2019 | Tappin | .................. | H04L 45/02 |
| 2021/0297339 A1* | 9/2021 | Yu | ....................... | H04L 45/033 |
| 2022/0038309 A1* | 2/2022 | Boutros | ................ | H04L 45/02 |

OTHER PUBLICATIONS

U.S. Appl. No. 17/946,534 , Non-Final Office Action, Mailed On Jan. 6, 2025, 14 pages.

* cited by examiner

| Host | Original as path | First flip | Second flip |
|---|---|---|---|
| A | 1 - primary | 30 - secondary | 1 - primary |
| B | 20 - secondary | 20 - primary | 20 - secondary |

*FIG. 12*

SYSTEMS AND METHODS FOR AUTOMATIC NETWORK HEALTH CHECK

TECHNICAL FIELD

The present disclosure relates generally to route management within a network.

BACKGROUND

A network may utilize one or several load balancers that can each distribute network or application traffic across a number of other devices such as across a number of servers. The use of a load balancer can, for example, improve application and/or system availability and/or responsiveness, and can prevent server overload.

While load balancers provide many benefits, their use also includes drawbacks and potential complications. This is particularly the case when load balancer routes changes. Due to these and other limitations, further developments in route management is desired.

BRIEF SUMMARY

Aspects of the present disclosure relate to a method for performing an automatic health check. The method includes determining to perform a health check on a portion of a communications network, the communications network including a plurality of hosts, each of the plurality of hosts including a routing agent and an advertising agent. The method includes adding a test route to a database accessible by each of the plurality of hosts, the test route indicated as applicable to every host and pointing to an IP address. The method includes receiving the test route from the database with the routing agents of at least some of the plurality of hosts, for each of the at least some of the plurality of hosts, providing the test route from the routing agent to the advertising agent, advertising the test route with of the at least some of the plurality of hosts to a plurality of switches within the communications network, and determining success of health check based on information received from the plurality of switches.

In some embodiments, the at least some of the plurality of hosts includes all of the plurality of hosts. In some embodiments, at least some of the plurality of hosts includes less than all of the plurality of hosts. In some embodiments, receiving the test route from the database with the routing agents comprises retrieving the test route with the routing agents. In some embodiments, the plurality of switches can be a plurality of Top-Of-Rack (TOR) switches.

In some embodiments, advertising the test route includes: each of the advertising agents advertising the test route to a one of the plurality of switches associated with the advertising agent. In some embodiments, the method includes receiving the advertised test route at the one of the plurality of switches associated with the advertising agent. In some embodiments, the method includes generating information indicative of the switch receiving the advertised test route and the path length of the advertised test route.

In some embodiments, the method includes providing the information to a network provisioner. In some embodiments, providing the information to a network provisioner includes storing the information in a database accessible by the network provisioner. In some embodiments, information for each of the plurality of switches is provided to the network provisioner. In some embodiments, the network provisioner determines success of the health check based on the information received from the plurality of switches. In some embodiments, determining success of the health check includes determining if the path length of the test route stored by each the plurality of switches matches the path length of the test route.

In some embodiments, the method includes generating an alert when the health check is unsuccessful. In some embodiments, determining success of the health check includes determining if the path length of the test route stored by each the plurality of switches within a predetermined time period subsequent to adding the test route to the database matches the path length of the test route.

One aspect of the present disclosure relates to a system. The system includes memory including a database of routing information, a plurality of hosts, a plurality of switches, and a process. Each of the plurality of hosts includes a routing agent and an advertising agent, and the database of routing information is accessible by each of the hosts. In some embodiments, the advertising agents of the plurality of hosts are coupled at least one of the switches, and that advertising agent can advertise a route to the at least one of the switches with which it is coupled. The processor can determine to perform a health check on a portion of a communications network including plurality of hosts and the plurality of switches, and add a test route to the database of routing information, the test route indicated as applicable to each of the plurality of hosts and pointing to an IP address. At least some of the plurality of hosts can receive the test route from the database with the routing agent of each of the at least some of the plurality of hosts, provide the test route from the routing agent to the advertising agent, and advertise the test route to the plurality of switches within the communications network. The at least one processor can determine success of health check based on information received from the plurality of switches.

In some embodiments, advertising the test route includes each of the advertising agents advertising the test route to a one of the plurality of switches associated with the advertising agent.

One aspect of the present disclosure relates to a non-transitory computer-readable storage medium storing a plurality of instructions executable by one or more processors. When executed by the one or more processors, the plurality of instructions cause the one or more processors to determine to perform a health check on a portion of a communications network, add a test route to a database accessible by each of the plurality of hosts, receive the test route from the database with the routing agents of at least some of the plurality of hosts, for each of the at least some of the plurality of hosts, provide the test route from the routing agent to the advertising agent, advertise the test route with of the at least some of the plurality of hosts to a plurality of switches within the communications network; and determine success of health check based on information received from the plurality of switches. In some embodiments, the communications network includes a plurality of hosts, each of the plurality of hosts including a routing agent and an advertising agent. In some embodiments, the test route is indicated as applicable to every host and pointing to an IP address.

In some embodiments, advertising the test route includes each of the advertising agents advertising the test route to a one of the plurality of switches associated with the advertising agent. In some embodiments, determining the success of the health check based on information received from the plurality of switches includes receiving the advertised test route at the one of the plurality of switches associated with the advertising agent, generating information indicative of the switch receiving the advertised test route and the path length of the advertised test route, providing the information to a network provisioner, and determining success of the health check with the network provisioner based on the information received from the plurality of switches. In some embodiments, providing the information to a network provisioner includes storing the information in a database accessible by the network provisioner. In some embodiments, information for each of the plurality of switches is provided to the network provisioner.

Various embodiments are described herein, including methods, systems, non-transitory computer-readable storage media storing programs, code, or instructions executable by one or more processors, and the like.

The foregoing, together with other features and embodiments will become more apparent upon referring to the following specification, claims, and accompanying drawings.

BRIEF DESCRIPTION OF THE DRAWINGS

FIG. 12 is chart depicting one exemplary embodiment of changes in path lengths caused by the route flip process of FIG. 11.

DETAILED DESCRIPTION

Figure 1:
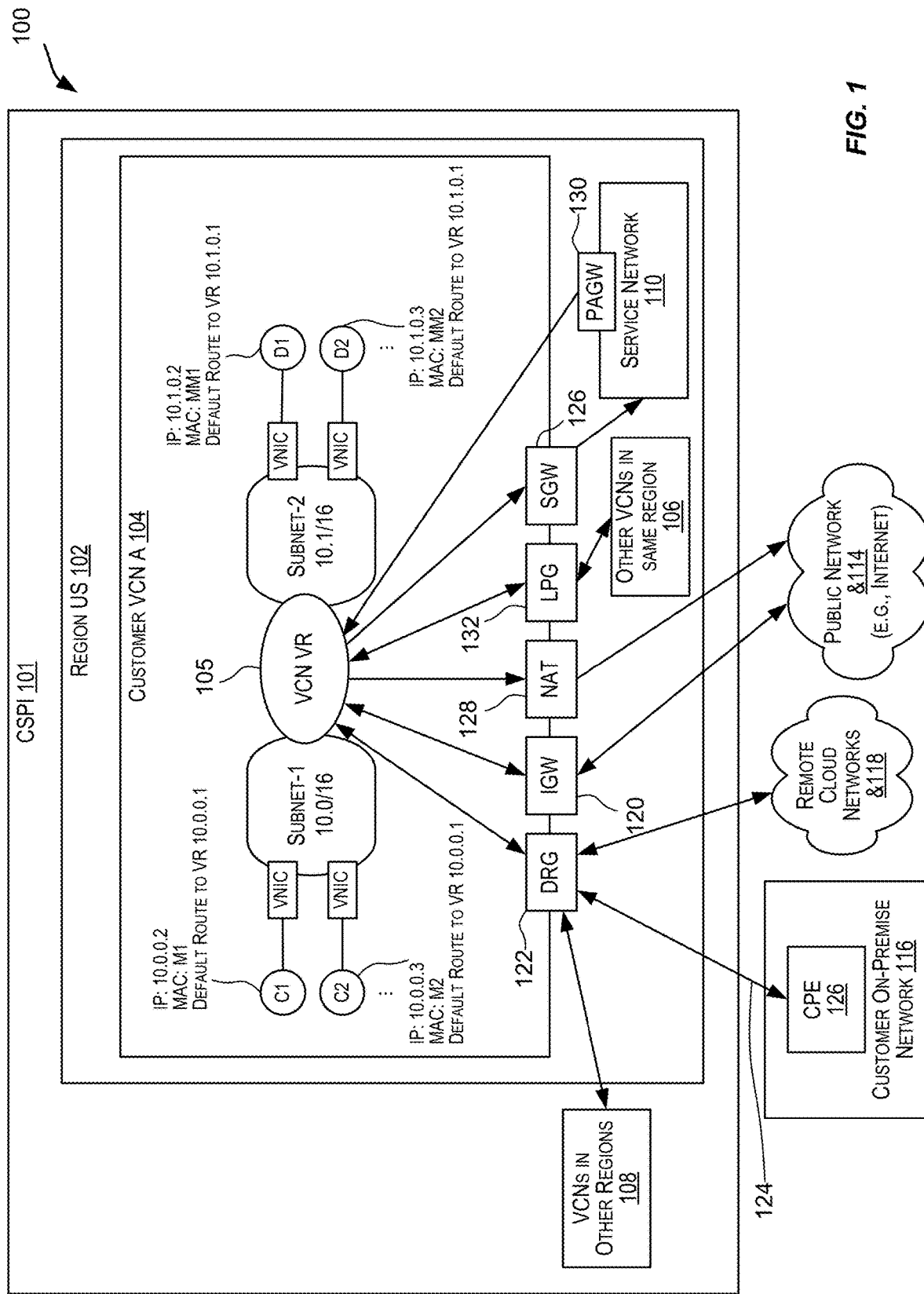
FIG. 1 is a high level diagram of a distributed environment showing a virtual or overlay cloud network hosted by a cloud service provider infrastructure according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Example Virtual Networking Architecture

The term cloud service is generally used to refer to a service that is made available by a cloud services provider (CSP) to users or customers on demand (e.g., via a subscription model) using systems and infrastructure (cloud infrastructure) provided by the CSP. Typically, the servers and systems that make up the CSP's infrastructure are separate from the customer's own on-premise servers and systems. Customers can thus avail themselves of cloud services provided by the CSP without having to purchase separate hardware and software resources for the services. Cloud services are designed to provide a subscribing customer easy, scalable access to applications and computing resources without the customer having to invest in procuring the infrastructure that is used for providing the services.

There are several cloud service providers that offer various types of cloud services. There are various different types or models of cloud services including Software-as-a-Service (SaaS), Platform-as-a-Service (PaaS), Infrastructure-as-a-Service (IaaS), and others.

A customer can subscribe to one or more cloud services provided by a CSP. The customer can be any entity such as an individual, an organization, an enterprise, and the like. When a customer subscribes to or registers for a service provided by a CSP, a tenancy or an account is created for that customer. The customer can then, via this account, access the subscribed-to one or more cloud resources associated with the account.

As noted above, infrastructure as a service (IaaS) is one particular type of cloud computing service. In an IaaS model, the CSP provides infrastructure (referred to as cloud services provider infrastructure or CSPI) that can be used by customers to build their own customizable networks and deploy customer resources. The customer's resources and networks are thus hosted in a distributed environment by infrastructure provided by a CSP. This is different from traditional computing, where the customer's resources and networks are hosted by infrastructure provided by the customer.

The CSPI may comprise interconnected high-performance compute resources including various host machines, memory resources, and network resources that form a physical network, which is also referred to as a substrate network or an underlay network. The resources in CSPI may be spread across one or more data centers that may be geographically spread across one or more geographical regions. Virtualization software may be executed by these physical resources to provide a virtualized distributed environment. The virtualization creates an overlay network (also known as a software-based network, a software-defined network, or a virtual network) over the physical network. The CSPI physical network provides the underlying basis for creating one or more overlay or virtual networks on top of the physical network. The physical network (or substrate network or underlay network) comprises physical network devices such as physical switches, routers, computers and host machines, and the like. An overlay network is a logical (or virtual) network that runs on top of a physical substrate network. A given physical network can support one or multiple overlay networks. Overlay networks typically use encapsulation techniques to differentiate between traffic belonging to different overlay networks. A virtual or overlay network is also referred to as a virtual cloud network (VCN). The virtual networks are implemented using software virtualization technologies (e.g., hypervisors, virtualization functions implemented by network virtualization devices (NVDs) (e.g., smartNICs), top-of-rack (TOR) switches, smart TORs that implement one or more functions performed by an NVD, and other mechanisms) to create layers of network abstraction that can be run on top of the physical network. Virtual networks can take on many forms, including peer-to-peer networks, IP networks, and others. Virtual networks are typically either Layer-3 IP networks or Layer-2 VLANs. This method of virtual or overlay networking is often referred to as virtual or overlay Layer-3 networking. Examples of protocols developed for virtual networks include IP-in-IP (or Generic Routing Encapsulation (GRE)), Virtual Extensible LAN (VXLAN—IETF RFC 7348), Virtual Private Networks (VPNs) (e.g., MPLS Layer-3 Virtual Private Networks (RFC 4364)), VMware's NSX, GENEVE (Generic Network Virtualization Encapsulation), and others.

For IaaS, the infrastructure (CSPI) provided by a CSP can be configured to provide virtualized computing resources over a public network (e.g., the Internet). In an IaaS model, a cloud computing services provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance. CSPI provides infrastructure and a set of complementary cloud services that enable customers to build and run a wide range of applications and services in a highly available hosted distributed environment. CSPI offers high-performance compute resources and capabilities and storage capacity in a flexible virtual network that is securely accessible from various networked locations such as from a customer's on-premises network. When a customer subscribes to or registers for an IaaS service provided by a CSP, the tenancy created for that customer is a secure and isolated partition within the CSPI where the customer can create, organize, and administer their cloud resources.

Customers can build their own virtual networks using compute, memory, and networking resources provided by CSPI. One or more customer resources or workloads, such as compute instances, can be deployed on these virtual networks. For example, a customer can use resources provided by CSPI to build one or multiple customizable and private virtual network(s) referred to as virtual cloud networks (VCNs). A customer can deploy one or more customer resources, such as compute instances, on a customer VCN. Compute instances can take the form of virtual machines, bare metal instances, and the like. The CSPI thus provides infrastructure and a set of complementary cloud services that enable customers to build and run a wide range of applications and services in a highly available virtual hosted environment. The customer does not manage or control the underlying physical resources provided by CSPI but has control over operating systems, storage, and deployed applications; and possibly limited control of select networking components (e.g., firewalls).

The CSP may provide a console that enables customers and network administrators to configure, access, and manage resources deployed in the cloud using CSPI resources. In certain embodiments, the console provides a web-based user interface that can be used to access and manage CSPI. In some implementations, the console is a web-based application provided by the CSP.

CSPI may support single-tenancy or multi-tenancy architectures. In a single tenancy architecture, a software (e.g., an application, a database) or a hardware component (e.g., a host machine or a server) serves a single customer or tenant. In a multi-tenancy architecture, a software or a hardware component serves multiple customers or tenants. Thus, in a multi-tenancy architecture, CSPI resources are shared between multiple customers or tenants. In a multi-tenancy situation, precautions are taken and safeguards put in place within CSPI to ensure that each tenant's data is isolated and remains invisible to other tenants.

In a physical network, a network endpoint ("endpoint") refers to a computing device or system that is connected to a physical network and communicates back and forth with the network to which it is connected. A network endpoint in the physical network may be connected to a Local Area Network (LAN), a Wide Area Network (WAN), or other type of physical network. Examples of traditional endpoints in a physical network include modems, hubs, bridges, switches, routers, and other networking devices, physical computers (or host machines), and the like. Each physical device in the physical network has a fixed network address that can be used to communicate with the device. This fixed network address can be a Layer-2 address (e.g., a MAC address), a fixed Layer-3 address (e.g., an IP address), and the like. In a virtualized environment or in a virtual network, the endpoints can include various virtual endpoints such as virtual machines that are hosted by components of the physical network (e.g., hosted by physical host machines). These endpoints in the virtual network are addressed by overlay addresses such as overlay Layer-2 addresses (e.g., overlay MAC addresses) and overlay Layer-3 addresses (e.g., overlay IP addresses). Network overlays enable flexibility by allowing network managers to move around the overlay addresses associated with network endpoints using software management (e.g., via software implementing a control plane for the virtual network). Accordingly, unlike in a physical network, in a virtual network, an overlay address (e.g., an overlay IP address) can be moved from one endpoint to another using network management software. Since the virtual network is built on top of a physical network, communications between components in the virtual network involves both the virtual network and the underlying physical network. In order to facilitate such communications, the components of CSPI are configured to learn and store mappings that map overlay addresses in the virtual network to actual physical addresses in the substrate network, and vice versa. These mappings are then used to facilitate the communications. Customer traffic is encapsulated to facilitate routing in the virtual network.

Accordingly, physical addresses (e.g., physical IP addresses) are associated with components in physical networks and overlay addresses (e.g., overlay IP addresses) are associated with entities in virtual or overlay networks. A physical IP address is an IP address associated with a physical device (e.g., a network device) in the substrate or physical network. For example, each NVD has an associated physical IP address. An overlay IP address is an overlay address associated with an entity in an overlay network, such as with a compute instance in a customer's virtual cloud network (VCN). Two different customers or tenants, each with their own private VCNs can potentially use the same overlay IP address in their VCNs without any knowledge of each other. Both the physical IP addresses and overlay IP addresses are types of real IP addresses. These are separate from virtual IP addresses. A virtual IP address is typically a single IP address that is represents or maps to multiple real IP addresses. A virtual IP address provides a 1-to-many mapping between the virtual IP address and multiple real IP addresses. For example, a load balancer may use a VIP to map to or represent multiple servers, each server having its own real IP address.

The cloud infrastructure or CSPI is physically hosted in one or more data centers in one or more regions around the world. The CSPI may include components in the physical or substrate network and virtualized components (e.g., virtual networks, compute instances, virtual machines, etc.) that are in an virtual network built on top of the physical network components. In certain embodiments, the CSPI is organized and hosted in realms, regions and availability domains. A region is typically a localized geographic area that contains one or more data centers. Regions are generally independent of each other and can be separated by vast distances, for example, across countries or even continents. For example, a first region may be in Australia, another one in Japan, yet another one in India, and the like. CSPI resources are divided among regions such that each region has its own independent subset of CSPI resources. Each region may provide a set of core infrastructure services and resources, such as, compute resources (e.g., bare metal servers, virtual machine, containers and related infrastructure, etc.); storage resources (e.g., block volume storage, file storage, object storage, archive storage); networking resources (e.g., virtual cloud networks (VCNs), load balancing resources, connections to on-premise networks), database resources; edge networking resources (e.g., DNS); and access management and monitoring resources, and others. Each region generally has multiple paths connecting it to other regions in the realm.

Generally, an application is deployed in a region (i.e., deployed on infrastructure associated with that region) where it is most heavily used, because using nearby resources is faster than using distant resources. Applications can also be deployed in different regions for various reasons, such as redundancy to mitigate the risk of region-wide events such as large weather systems or earthquakes, to meet varying requirements for legal jurisdictions, tax domains, and other business or social criteria, and the like.

The data centers within a region can be further organized and subdivided into availability domains (ADs). An availability domain may correspond to one or more data centers located within a region. A region can be composed of one or more availability domains. In such a distributed environment, CSPI resources are either region-specific, such as a virtual cloud network (VCN), or availability domain-specific, such as a compute instance.

ADs within a region are isolated from each other, fault tolerant, and are configured such that they are very unlikely to fail simultaneously. This is achieved by the ADs not sharing critical infrastructure resources such as networking, physical cables, cable paths, cable entry points, etc., such that a failure at one AD within a region is unlikely to impact the availability of the other ADs within the same region. The ADs within the same region may be connected to each other by a low latency, high bandwidth network, which makes it possible to provide high-availability connectivity to other networks (e.g., the Internet, customers' on-premise networks, etc.) and to build replicated systems in multiple ADs for both high-availability and disaster recovery. Cloud services use multiple ADs to ensure high availability and to protect against resource failure. As the infrastructure provided by the IaaS provider grows, more regions and ADs may be added with additional capacity. Traffic between availability domains is usually encrypted.

In certain embodiments, regions are grouped into realms. A realm is a logical collection of regions. Realms are isolated from each other and do not share any data. Regions in the same realm may communicate with each other, but regions in different realms cannot. A customer's tenancy or account with the CSP exists in a single realm and can be spread across one or more regions that belong to that realm. Typically, when a customer subscribes to an IaaS service, a tenancy or account is created for that customer in the customer-specified region (referred to as the "home" region) within a realm. A customer can extend the customer's tenancy across one or more other regions within the realm. A customer cannot access regions that are not in the realm where the customer's tenancy exists.

An IaaS provider can provide multiple realms, each realm catered to a particular set of customers or users. For example, a commercial realm may be provided for commercial customers. As another example, a realm may be provided for a specific country for customers within that country. As yet another example, a government realm may be provided for a government, and the like. For example, the government realm may be catered for a specific government and may have a heightened level of security than a commercial realm. For example, Oracle Cloud Infrastructure (OCI) currently offers a realm for commercial regions and two realms (e.g., FedRAMP authorized and IL5 authorized) for government cloud regions.

In certain embodiments, an AD can be subdivided into one or more fault domains. A fault domain is a grouping of infrastructure resources within an AD to provide anti-affinity. Fault domains allow for the distribution of compute instances such that the instances are not on the same physical hardware within a single AD. This is known as anti-affinity. A fault domain refers to a set of hardware components (computers, switches, and more) that share a single point of failure. A compute pool is logically divided up into fault domains. Due to this, a hardware failure or compute hardware maintenance event that affects one fault domain does not affect instances in other fault domains. Depending on the embodiment, the number of fault domains for each AD may vary. For instance, in certain embodiments each AD contains three fault domains. A fault domain acts as a logical data center within an AD.

When a customer subscribes to an IaaS service, resources from CSPI are provisioned for the customer and associated with the customer's tenancy. The customer can use these provisioned resources to build private networks and deploy resources on these networks. The customer networks that are hosted in the cloud by the CSPI are referred to as virtual cloud networks (VCNs). A customer can set up one or more virtual cloud networks (VCNs) using CSPI resources allocated for the customer. A VCN is a virtual or software defined private network. The customer resources that are deployed in the customer's VCN can include compute instances (e.g., virtual machines, bare-metal instances) and other resources. These compute instances may represent various customer workloads such as applications, load balancers, databases, and the like. A compute instance deployed on a VCN can communicate with public accessible endpoints ("public endpoints") over a public network such as the Internet, with other instances in the same VCN or other VCNs (e.g., the customer's other VCNs, or VCNs not belonging to the customer), with the customer's on-premise data centers or networks, and with service endpoints, and other types of endpoints.

The CSP may provide various services using the CSPI. In some instances, customers of CSPI may themselves act like service providers and provide services using CSPI resources. A service provider may expose a service endpoint, which is characterized by identification information (e.g., an IP Address, a DNS name and port). A customer's resource (e.g., a compute instance) can consume a particular service by accessing a service endpoint exposed by the service for that particular service. These service endpoints are generally endpoints that are publicly accessible by users using public IP addresses associated with the endpoints via a public communication network such as the Internet. Network endpoints that are publicly accessible are also sometimes referred to as public endpoints.

In certain embodiments, a service provider may expose a service via an endpoint (sometimes referred to as a service endpoint) for the service. Customers of the service can then use this service endpoint to access the service. In certain implementations, a service endpoint provided for a service can be accessed by multiple customers that intend to consume that service. In other implementations, a dedicated service endpoint may be provided for a customer such that only that customer can access the service using that dedicated service endpoint.

In certain embodiments, when a VCN is created, it is associated with a private overlay Classless Inter-Domain Routing (CIDR) address space, which is a range of private overlay IP addresses that are assigned to the VCN (e.g., 10.0/16). A VCN includes associated subnets, route tables, and gateways. A VCN resides within a single region but can span one or more or all of the region's availability domains. A gateway is a virtual interface that is configured for a VCN and enables communication of traffic to and from the VCN to one or more endpoints outside the VCN. One or more different types of gateways may be configured for a VCN to enable communication to and from different types of endpoints.

A VCN can be subdivided into one or more sub-networks such as one or more subnets. A subnet is thus a unit of configuration or a subdivision that can be created within a VCN. A VCN can have one or multiple subnets. Each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN.

Each compute instance is associated with a virtual network interface card (VNIC), that enables the compute instance to participate in a subnet of a VCN. A VNIC is a logical representation of physical Network Interface Card (NIC). In general. a VNIC is an interface between an entity (e.g., a compute instance, a service) and a virtual network. A VNIC exists in a subnet, has one or more associated IP addresses, and associated security rules or policies. A VNIC is equivalent to a Layer-2 port on a switch. A VNIC is attached to a compute instance and to a subnet within a VCN. A VNIC associated with a compute instance enables the compute instance to be a part of a subnet of a VCN and enables the compute instance to communicate (e.g., send and receive packets) with endpoints that are on the same subnet as the compute instance, with endpoints in different subnets in the VCN, or with endpoints outside the VCN. The VNIC associated with a compute instance thus determines how the compute instance connects with endpoints inside and outside the VCN. A VNIC for a compute instance is created and associated with that compute instance when the compute instance is created and added to a subnet within a VCN. For a subnet comprising a set of compute instances, the subnet contains the VNICs corresponding to the set of compute instances, each VNIC attached to a compute instance within the set of computer instances.

Each compute instance is assigned a private overlay IP address via the VNIC associated with the compute instance. This private overlay IP address is assigned to the VNIC that is associated with the compute instance when the compute instance is created and used for routing traffic to and from the compute instance. All VNICs in a given subnet use the same route table, security lists, and DHCP options. As described above, each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN. For a VNIC on a particular subnet of a VCN, the private overlay IP address that is assigned to the VNIC is an address from the contiguous range of overlay IP addresses allocated for the subnet.

In certain embodiments, a compute instance may optionally be assigned additional overlay IP addresses in addition to the private overlay IP address, such as, for example, one or more public IP addresses if in a public subnet. These multiple addresses are assigned either on the same VNIC or over multiple VNICs that are associated with the compute instance. Each instance however has a primary VNIC that is created during instance launch and is associated with the overlay private IP address assigned to the instance—this primary VNIC cannot be removed. Additional VNICs, referred to as secondary VNICs, can be added to an existing instance in the same availability domain as the primary VNIC. All the VNICs are in the same availability domain as the instance. A secondary VNIC can be in a subnet in the same VCN as the primary VNIC, or in a different subnet that is either in the same VCN or a different one.

A compute instance may optionally be assigned a public IP address if it is in a public subnet. A subnet can be designated as either a public subnet or a private subnet at the time the subnet is created. A private subnet means that the resources (e.g., compute instances) and associated VNICs in the subnet cannot have public overlay IP addresses. A public subnet means that the resources and associated VNICs in the subnet can have public IP addresses. A customer can designate a subnet to exist either in a single availability domain or across multiple availability domains in a region or realm.

As described above, a VCN may be subdivided into one or more subnets. In certain embodiments, a Virtual Router (VR) configured for the VCN (referred to as the VCN VR or just VR) enables communications between the subnets of the VCN. For a subnet within a VCN, the VR represents a logical gateway for that subnet that enables the subnet (i.e., the compute instances on that subnet) to communicate with endpoints on other subnets within the VCN, and with other endpoints outside the VCN. The VCN VR is a logical entity that is configured to route traffic between VNICs in the VCN and virtual gateways ("gateways") associated with the VCN. Gateways are further described below with respect to FIG. 1. A VCN VR is a Layer-3/IP Layer concept. In one embodiment, there is one VCN VR for a VCN where the VCN VR has potentially an unlimited number of ports addressed by IP addresses, with one port for each subnet of the VCN. In this manner, the VCN VR has a different IP address for each subnet in the VCN that the VCN VR is attached to. The VR is also connected to the various gateways configured for a VCN. In certain embodiments, a particular overlay IP address from the overlay IP address range for a subnet is reserved for a port of the VCN VR for that subnet. For example, consider a VCN having two subnets with associated address ranges 10.0/16 and 10.1/16, respectively. For the first subnet within the VCN with address range 10.0/16, an address from this range is reserved for a port of the VCN VR for that subnet. In some instances, the first IP address from the range may be reserved for the VCN VR. For example, for the subnet with overlay IP address range 10.0/16, IP address 10.0.0.1 may be reserved for a port of the VCN VR for that subnet. For the second subnet within the same VCN with address range 10.1/16, the VCN VR may have a port for that second subnet with IP address 10.1.0.1. The VCN VR has a different IP address for each of the subnets in the VCN.

In some other embodiments, each subnet within a VCN may have its own associated VR that is addressable by the subnet using a reserved or default IP address associated with the VR. The reserved or default IP address may, for example, be the first IP address from the range of IP addresses associated with that subnet. The VNICs in the subnet can communicate (e.g., send and receive packets) with the VR associated with the subnet using this default or reserved IP address. In such an embodiment, the VR is the ingress/egress point for that subnet. The VR associated with a subnet within the VCN can communicate with other VRs associated with other subnets within the VCN. The VRs can also communicate with gateways associated with the VCN. The VR function for a subnet is running on or executed by one or more NVDs executing VNICs functionality for VNICs in the subnet.

Route tables, security rules, and DHCP options may be configured for a VCN. Route tables are virtual route tables for the VCN and include rules to route traffic from subnets within the VCN to destinations outside the VCN by way of gateways or specially configured instances. A VCN's route tables can be customized to control how packets are forwarded/routed to and from the VCN. DHCP options refers to configuration information that is automatically provided to the instances when they boot up.

Security rules configured for a VCN represent overlay firewall rules for the VCN. The security rules can include ingress and egress rules, and specify the types of traffic (e.g., based upon protocol and port) that is allowed in and out of the instances within the VCN. The customer can choose whether a given rule is stateful or stateless. For instance, the customer can allow incoming SSH traffic from anywhere to a set of instances by setting up a stateful ingress rule with source CIDR 0.0.0.0/0, and destination TCP port 22. Security rules can be implemented using network security groups or security lists. A network security group consists of a set of security rules that apply only to the resources in that group. A security list, on the other hand, includes rules that apply to all the resources in any subnet that uses the security list. A VCN may be provided with a default security list with default security rules. DHCP options configured for a VCN provide configuration information that is automatically provided to the instances in the VCN when the instances boot up.

In certain embodiments, the configuration information for a VCN is determined and stored by a VCN Control Plane. The configuration information for a VCN may include, for example, information about: the address range associated with the VCN, subnets within the VCN and associated information, one or more VRs associated with the VCN, compute instances in the VCN and associated VNICs, NVDs executing the various virtualization network functions (e.g., VNICs, VRs, gateways) associated with the VCN, state information for the VCN, and other VCN-related information. In certain embodiments, a VCN Distribution Service publishes the configuration information stored by the VCN Control Plane, or portions thereof, to the NVDs. The distributed information may be used to update information (e.g., forwarding tables, routing tables, etc.) stored and used by the NVDs to forward packets to and from the compute instances in the VCN.

In certain embodiments, the creation of VCNs and subnets are handled by a VCN Control Plane (CP) and the launching of compute instances is handled by a Compute Control Plane. The Compute Control Plane is responsible for allocating the physical resources for the compute instance and then calls the VCN Control Plane to create and attach VNICs to the compute instance. The VCN CP also sends VCN data mappings to the VCN data plane that is configured to perform packet forwarding and routing functions. In certain embodiments, the VCN CP provides a distribution service that is responsible for providing updates to the VCN data plane. Examples of a VCN Control Plane are also depicted in FIGS. 13, 14, 15, and 16 (see references 1316, 1416, 1516, and 1616) and described below.

A customer may create one or more VCNs using resources hosted by CSPI. A compute instance deployed on a customer VCN may communicate with different endpoints. These endpoints can include endpoints that are hosted by CSPI and endpoints outside CSPI.

Various different architectures for implementing cloud-based service using CSPI are depicted in FIGS. 1, 2, 3, 4, 5, 13, 14, 15, and 16, and are described below. FIG. 1 is a high level diagram of a distributed environment 100 showing an overlay or customer VCN hosted by CSPI according to certain embodiments. The distributed environment depicted in FIG. 1 includes multiple components in the overlay network. Distributed environment 100 depicted in FIG. 1 is merely an example and is not intended to unduly limit the scope of claimed embodiments. Many variations, alternatives, and modifications are possible. For example, in some implementations, the distributed environment depicted in FIG. 1 may have more or fewer systems or components than those shown in FIG. 1, may combine two or more systems, or may have a different configuration or arrangement of systems.

As shown in the example depicted in FIG. 1, distributed environment 100 comprises CSPI 101 that provides services and resources that customers can subscribe to and use to build their virtual cloud networks (VCNs). In certain embodiments, CSPI 101 offers IaaS services to subscribing customers. The data centers within CSPI 101 may be organized into one or more regions. One example region "Region US" 102 is shown in FIG. 1. A customer has configured a customer VCN 104 for region 102. The customer may deploy various compute instances on VCN 104, where the compute instances may include virtual machines or bare metal instances. Examples of instances include applications, database, load balancers, and the like.

In the embodiment depicted in FIG. 1, customer VCN 104 comprises two subnets, namely, "Subnet-1" and "Subnet-2", each subnet with its own CIDR IP address range. In FIG. 1, the overlay IP address range for Subnet-1 is 10.0/16 and the address range for Subnet-2 is 10.1/16. A VCN Virtual Router 105 represents a logical gateway for the VCN that enables communications between subnets of the VCN 104, and with other endpoints outside the VCN. VCN VR 105 is configured to route traffic between VNICs in VCN 104 and gateways associated with VCN 104. VCN VR 105 provides a port for each subnet of VCN 104. For example, VR 105 may provide a port with IP address 10.0.0.1 for Subnet-1 and a port with IP address 10.1.0.1 for Subnet-2.

Multiple compute instances may be deployed on each subnet, where the compute instances can be virtual machine instances, and/or bare metal instances. The compute instances in a subnet may be hosted by one or more host machines within CSPI 101. A compute instance participates in a subnet via a VNIC associated with the compute instance. For example, as shown in FIG. 1, a compute instance C1 is part of Subnet-1 via a VNIC associated with the compute instance. Likewise, compute instance C2 is part of Subnet-1 via a VNIC associated with C2. In a similar manner, multiple compute instances, which may be virtual machine instances or bare metal instances, may be part of Subnet-1. Via its associated VNIC, each compute instance is assigned a private overlay IP address and a MAC address. For example, in FIG. 1, compute instance C1 has an overlay IP address of 10.0.0.2 and a MAC address of M1, while compute instance C2 has an private overlay IP address of 10.0.0.3 and a MAC address of M2. Each compute instance in Subnet-1, including compute instances C1 and C2, has a default route to VCN VR 105 using IP address 10.0.0.1, which is the IP address for a port of VCN VR 105 for Subnet-1.

Subnet-2 can have multiple compute instances deployed on it, including virtual machine instances and/or bare metal instances. For example, as shown in FIG. 1, compute instances D1 and D2 are part of Subnet-2 via VNICs associated with the respective compute instances. In the embodiment depicted in FIG. 1, compute instance D1 has an overlay IP address of 10.1.0.2 and a MAC address of MM1, while compute instance D2 has an private overlay IP address of 10.1.0.3 and a MAC address of MM2. Each compute instance in Subnet-2, including compute instances D1 and D2, has a default route to VCN VR 105 using IP address 10.1.0.1, which is the IP address for a port of VCN VR 105 for Subnet-2.

VCN A 104 may also include one or more load balancers. For example, a load balancer may be provided for a subnet and may be configured to load balance traffic across multiple compute instances on the subnet. A load balancer may also be provided to load balance traffic across subnets in the VCN.

A particular compute instance deployed on VCN 104 can communicate with various different endpoints. These endpoints may include endpoints that are hosted by CSPI 200 and endpoints outside CSPI 200. Endpoints that are hosted by CSPI 101 may include: an endpoint on the same subnet as the particular compute instance (e.g., communications between two compute instances in Subnet-1); an endpoint on a different subnet but within the same VCN (e.g., communication between a compute instance in Subnet-1 and a compute instance in Subnet-2); an endpoint in a different VCN in the same region (e.g., communications between a compute instance in Subnet-1 and an endpoint in a VCN in the same region 106 or 110, communications between a compute instance in Subnet-1 and an endpoint in service network 110 in the same region); or an endpoint in a VCN in a different region (e.g., communications between a compute instance in Subnet-1 and an endpoint in a VCN in a different region 108). A compute instance in a subnet hosted by CSPI 101 may also communicate with endpoints that are not hosted by CSPI 101 (i.e., are outside CSPI 101). These outside endpoints include endpoints in the customer's on-premise network 116, endpoints within other remote cloud hosted networks 118, public endpoints 114 accessible via a public network such as the Internet, and other endpoints.

Communications between compute instances on the same subnet are facilitated using VNICs associated with the source compute instance and the destination compute instance. For example, compute instance C1 in Subnet-1 may want to send packets to compute instance C2 in Subnet-1. For a packet originating at a source compute instance and whose destination is another compute instance in the same subnet, the packet is first processed by the VNIC associated with the source compute instance. Processing performed by the VNIC associated with the source compute instance can include determining destination information for the packet from the packet headers, identifying any policies (e.g., security lists) configured for the VNIC associated with the source compute instance, determining a next hop for the packet, performing any packet encapsulation/decapsulation functions as needed, and then forwarding/routing the packet to the next hop with the goal of facilitating communication of the packet to its intended destination. When the destination compute instance is in the same subnet as the source compute instance, the VNIC associated with the source compute instance is configured to identify the VNIC associated with the destination compute instance and forward the packet to that VNIC for processing. The VNIC associated with the destination compute instance is then executed and forwards the packet to the destination compute instance.

For a packet to be communicated from a compute instance in a subnet to an endpoint in a different subnet in the same VCN, the communication is facilitated by the VNICs associated with the source and destination compute instances and the VCN VR. For example, if compute instance C1 in Subnet-1 in FIG. 1 wants to send a packet to compute instance D1 in Subnet-2, the packet is first processed by the VNIC associated with compute instance C1. The VNIC associated with compute instance C1 is configured to route the packet to the VCN VR 105 using default route or port 10.0.0.1 of the VCN VR. VCN VR 105 is configured to route the packet to Subnet-2 using port 10.1.0.1. The packet is then received and processed by the VNIC associated with D1 and the VNIC forwards the packet to compute instance D1.

For a packet to be communicated from a compute instance in VCN 104 to an endpoint that is outside VCN 104, the communication is facilitated by the VNIC associated with the source compute instance, VCN VR 105, and gateways associated with VCN 104. One or more types of gateways may be associated with VCN 104. A gateway is an interface between a VCN and another endpoint, where the another endpoint is outside the VCN. A gateway is a Layer-3/IP layer concept and enables a VCN to communicate with endpoints outside the VCN. A gateway thus facilitates traffic flow between a VCN and other VCNs or networks. Various different types of gateways may be configured for a VCN to facilitate different types of communications with different types of endpoints. Depending upon the gateway, the communications may be over public networks (e.g., the Internet)

or over private networks. Various communication protocols may be used for these communications.

For example, compute instance C1 may want to communicate with an endpoint outside VCN 104. The packet may be first processed by the VNIC associated with source compute instance C1. The VNIC processing determines that the destination for the packet is outside the Subnet-1 of C1. The VNIC associated with C1 may forward the packet to VCN VR 105 for VCN 104. VCN VR 105 then processes the packet and as part of the processing, based upon the destination for the packet, determines a particular gateway associated with VCN 104 as the next hop for the packet. VCN VR 105 may then forward the packet to the particular identified gateway. For example, if the destination is an endpoint within the customer's on-premise network, then the packet may be forwarded by VCN VR 105 to Dynamic Routing Gateway (DRG) gateway 122 configured for VCN 104. The packet may then be forwarded from the gateway to a next hop to facilitate communication of the packet to it final intended destination.

Various different types of gateways may be configured for a VCN. Examples of gateways that may be configured for a VCN are depicted in FIG. 1 and described below. Examples of gateways associated with a VCN are also depicted in FIGS. 13, 14, 15, and 16 (for example, gateways referenced by reference numbers 1334, 1336, 1338, 1434, 1436, 1438, 1534, 1536, 1538, 1634, 1636, and 1638) and described below. As shown in the embodiment depicted in FIG. 1, a Dynamic Routing Gateway (DRG) 122 may be added to or be associated with customer VCN 104 and provides a path for private network traffic communication between customer VCN 104 and another endpoint, where the another endpoint can be the customer's on-premise network 116, a VCN 108 in a different region of CSPI 101, or other remote cloud networks 118 not hosted by CSPI 101. Customer on-premise network 116 may be a customer network or a customer data center built using the customer's resources. Access to customer on-premise network 116 is generally very restricted. For a customer that has both a customer on-premise network 116 and one or more VCNs 104 deployed or hosted in the cloud by CSPI 101, the customer may want their on-premise network 116 and their cloud-based VCN 104 to be able to communicate with each other. This enables a customer to build an extended hybrid environment encompassing the customer's VCN 104 hosted by CSPI 101 and their on-premises network 116. DRG 122 enables this communication. To enable such communications, a communication channel 124 is set up where one endpoint of the channel is in customer on-premise network 116 and the other endpoint is in CSPI 101 and connected to customer VCN 104. Communication channel 124 can be over public communication networks such as the Internet or private communication networks. Various different communication protocols may be used such as IPsec VPN technology over a public communication network such as the Internet, Oracle's FastConnect technology that uses a private network instead of a public network, and others. The device or equipment in customer on-premise network 116 that forms one end point for communication channel 124 is referred to as the customer premise equipment (CPE), such as CPE 126 depicted in FIG. 1. On the CSPI 101 side, the endpoint may be a host machine executing DRG 122.

In certain embodiments, a Remote Peering Connection (RPC) can be added to a DRG, which allows a customer to peer one VCN with another VCN in a different region. Using such an RPC, customer VCN 104 can use DRG 122 to connect with a VCN 108 in another region. DRG 122 may also be used to communicate with other remote cloud networks 118, not hosted by CSPI 101 such as a Microsoft Azure cloud, Amazon AWS cloud, and others.

As shown in FIG. 1, an Internet Gateway (IGW) 120 may be configured for customer VCN 104 the enables a compute instance on VCN 104 to communicate with public endpoints 114 accessible over a public network such as the Internet. IGW 120 is a gateway that connects a VCN to a public network such as the Internet. IGW 120 enables a public subnet (where the resources in the public subnet have public overlay IP addresses) within a VCN, such as VCN 104, direct access to public endpoints 112 on a public network 114 such as the Internet. Using IGW 120, connections can be initiated from a subnet within VCN 104 or from the Internet.

A Network Address Translation (NAT) gateway 128 can be configured for customer's VCN 104 and enables cloud resources in the customer's VCN, which do not have dedicated public overlay IP addresses, access to the Internet and it does so without exposing those resources to direct incoming Internet connections (e.g., L4-L7 connections). This enables a private subnet within a VCN, such as private Subnet-1 in VCN 104, with private access to public endpoints on the Internet. In NAT gateways, connections can be initiated only from the private subnet to the public Internet and not from the Internet to the private subnet.

In certain embodiments, a Service Gateway (SGW) 126 can be configured for customer VCN 104 and provides a path for private network traffic between VCN 104 and supported services endpoints in a service network 110. In certain embodiments, service network 110 may be provided by the CSP and may provide various services. An example of such a service network is Oracle's Services Network, which provides various services that can be used by customers. For example, a compute instance (e.g., a database system) in a private subnet of customer VCN 104 can back up data to a service endpoint (e.g., Object Storage) without needing public IP addresses or access to the Internet. In certain embodiments, a VCN can have only one SGW, and connections can only be initiated from a subnet within the VCN and not from service network 110. If a VCN is peered with another, resources in the other VCN typically cannot access the SGW. Resources in on-premises networks that are connected to a VCN with FastConnect or VPN Connect can also use the service gateway configured for that VCN.

In certain implementations, SGW 126 uses the concept of a service Classless Inter-Domain Routing (CIDR) label, which is a string that represents all the regional public IP address ranges for the service or group of services of interest. The customer uses the service CIDR label when they configure the SGW and related route rules to control traffic to the service. The customer can optionally utilize it when configuring security rules without needing to adjust them if the service's public IP addresses change in the future.

A Local Peering Gateway (LPG) 132 is a gateway that can be added to customer VCN 104 and enables VCN 104 to peer with another VCN in the same region. Peering means that the VCNs communicate using private IP addresses, without the traffic traversing a public network such as the Internet or without routing the traffic through the customer's on-premises network 116. In preferred embodiments, a VCN has a separate LPG for each peering it establishes. Local Peering or VCN Peering is a common practice used to establish network connectivity between different applications or infrastructure management functions.

Service providers, such as providers of services in service network 110, may provide access to services using different access models. According to a public access model, services may be exposed as public endpoints that are publicly accessible by compute instance in a customer VCN via a public network such as the Internet and or may be privately accessible via SGW 126. According to a specific private access model, services are made accessible as private IP endpoints in a private subnet in the customer's VCN. This is referred to as a Private Endpoint (PE) access and enables a service provider to expose their service as an instance in the customer's private network. A Private Endpoint resource represents a service within the customer's VCN. Each PE manifests as a VNIC (referred to as a PE-VNIC, with one or more private IPs) in a subnet chosen by the customer in the customer's VCN. APE thus provides a way to present a service within a private customer VCN subnet using a VNIC. Since the endpoint is exposed as a VNIC, all the features associates with a VNIC such as routing rules, security lists, etc., are now available for the PE VNIC.

A service provider can register their service to enable access through a PE. The provider can associate policies with the service that restricts the service's visibility to the customer tenancies. A provider can register multiple services under a single virtual IP address (VIP), especially for multi-tenant services. There may be multiple such private endpoints (in multiple VCNs) that represent the same service.

Compute instances in the private subnet can then use the PE VNIC's private IP address or the service DNS name to access the service. Compute instances in the customer VCN can access the service by sending traffic to the private IP address of the PE in the customer VCN. A Private Access Gateway (PAGW) 130 is a gateway resource that can be attached to a service provider VCN (e.g., a VCN in service network 110) that acts as an ingress/egress point for all traffic from/to customer subnet private endpoints. PAGW 130 enables a provider to scale the number of PE connections without utilizing its internal IP address resources. A provider needs only configure one PAGW for any number of services registered in a single VCN. Providers can represent a service as a private endpoint in multiple VCNs of one or more customers. From the customer's perspective, the PE VNIC, which, instead of being attached to a customer's instance, appears attached to the service with which the customer wishes to interact. The traffic destined to the private endpoint is routed via PAGW 130 to the service. These are referred to as customer-to-service private connections (C2 S connections).

The PE concept can also be used to extend the private access for the service to customer's on-premises networks and data centers, by allowing the traffic to flow through FastConnect/IPsec links and the private endpoint in the customer VCN. Private access for the service can also be extended to the customer's peered VCNs, by allowing the traffic to flow between LPG 132 and the PE in the customer's VCN.

A customer can control routing in a VCN at the subnet level, so the customer can specify which subnets in the customer's VCN, such as VCN 104, use each gateway. A VCN's route tables are used to decide if traffic is allowed out of a VCN through a particular gateway. For example, in a particular instance, a route table for a public subnet within customer VCN 104 may send non-local traffic through IGW 120. The route table for a private subnet within the same customer VCN 104 may send traffic destined for CSP services through SGW 126. All remaining traffic may be sent via the NAT gateway 128. Route tables only control traffic going out of a VCN.

Security lists associated with a VCN are used to control traffic that comes into a VCN via a gateway via inbound connections. All resources in a subnet use the same route table and security lists. Security lists may be used to control specific types of traffic allowed in and out of instances in a subnet of a VCN. Security list rules may comprise ingress (inbound) and egress (outbound) rules. For example, an ingress rule may specify an allowed source address range, while an egress rule may specify an allowed destination address range. Security rules may specify a particular protocol (e.g., TCP, ICMP), a particular port (e.g., 22 for SSH, 3389 for Windows RDP), etc. In certain implementations, an instance's operating system may enforce its own firewall rules that are aligned with the security list rules. Rules may be stateful (e.g., a connection is tracked and the response is automatically allowed without an explicit security list rule for the response traffic) or stateless.

Access from a customer VCN (i.e., by a resource or compute instance deployed on VCN 104) can be categorized as public access, private access, or dedicated access. Public access refers to an access model where a public IP address or a NAT is used to access a public endpoint. Private access enables customer workloads in VCN 104 with private IP addresses (e.g., resources in a private subnet) to access services without traversing a public network such as the Internet. In certain embodiments, CSPI 101 enables customer VCN workloads with private IP addresses to access the (public service endpoints of) services using a service gateway. A service gateway thus offers a private access model by establishing a virtual link between the customer's VCN and the service's public endpoint residing outside the customer's private network.

Additionally, CSPI may offer dedicated public access using technologies such as FastConnect public peering where customer on-premises instances can access one or more services in a customer VCN using a FastConnect connection and without traversing a public network such as the Internet. CSPI also may also offer dedicated private access using FastConnect private peering where customer on-premises instances with private IP addresses can access the customer's VCN workloads using a FastConnect connection. FastConnect is a network connectivity alternative to using the public Internet to connect a customer's on-premise network to CSPI and its services. FastConnect provides an easy, elastic, and economical way to create a dedicated and private connection with higher bandwidth options and a more reliable and consistent networking experience when compared to Internet-based connections.

Figure 2:
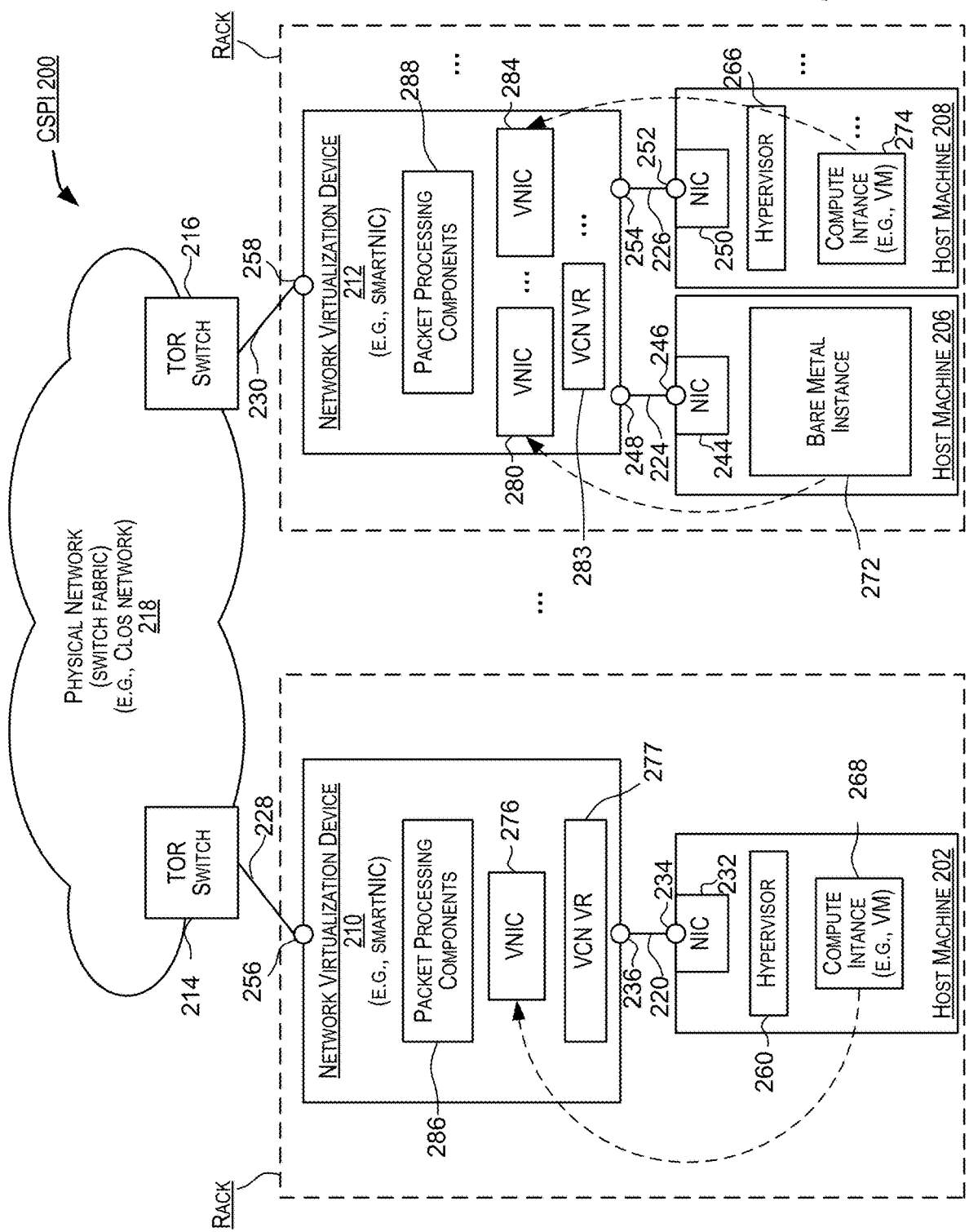
FIG. 2 depicts a simplified architectural diagram of the physical components in the physical network within CSPI according to certain embodiments.

FIG. 1 and the accompanying description above describes various virtualized components in an example virtual network. As described above, the virtual network is built on the underlying physical or substrate network. FIG. 2 depicts a simplified architectural diagram of the physical components in the physical network within CSPI 200 that provide the underlay for the virtual network according to certain embodiments. As shown, CSPI 200 provides a distributed environment comprising components and resources (e.g., compute, memory, and networking resources) provided by a cloud service provider (CSP). These components and resources are used to provide cloud services (e.g., IaaS services) to subscribing customers, i.e., customers that have sub scribed to one or more services provided by the CSP. Based upon the services subscribed to by a customer, a subset of resources (e.g., compute, memory, and networking resources) of CSPI 200 are provisioned for the customer. Customers can then build their own cloud-based (i.e., CSPI-hosted) customizable and private virtual networks using physical compute, memory, and networking resources provided by CSPI 200. As previously indicated, these customer networks are referred to as virtual cloud networks (VCNs). A customer can deploy one or more customer resources, such as compute instances, on these customer VCNs. Compute instances can be in the form of virtual machines, bare metal instances, and the like. CSPI 200 provides infrastructure and a set of complementary cloud services that enable customers to build and run a wide range of applications and services in a highly available hosted environment.

In the example embodiment depicted in FIG. 2, the physical components of CSPI 200 include one or more physical host machines or physical servers (e.g., 202, 206, 208), network virtualization devices (NVDs) (e.g., 210, 212), top-of-rack (TOR) switches (e.g., 214, 216), and a physical network (e.g., 218), and switches in physical network 218. The physical host machines or servers may host and execute various compute instances that participate in one or more subnets of a VCN. The compute instances may include virtual machine instances, and bare metal instances. For example, the various compute instances depicted in FIG. 1 may be hosted by the physical host machines depicted in FIG. 2. The virtual machine compute instances in a VCN may be executed by one host machine or by multiple different host machines. The physical host machines may also host virtual host machines, container-based hosts or functions, and the like. The VNICs and VCN VR depicted in FIG. 1 may be executed by the NVDs depicted in FIG. 2. The gateways depicted in FIG. 1 may be executed by the host machines and/or by the NVDs depicted in FIG. 2.

The host machines or servers may execute a hypervisor (also referred to as a virtual machine monitor or VMM) that creates and enables a virtualized environment on the host machines. The virtualization or virtualized environment facilitates cloud-based computing. One or more compute instances may be created, executed, and managed on a host machine by a hypervisor on that host machine. The hypervisor on a host machine enables the physical computing resources of the host machine (e.g., compute, memory, and networking resources) to be shared between the various compute instances executed by the host machine.

For example, as depicted in FIG. 2, host machines 202 and 208 execute hypervisors 260 and 266, respectively. These hypervisors may be implemented using software, firmware, or hardware, or combinations thereof. Typically, a hypervisor is a process or a software layer that sits on top of the host machine's operating system (OS), which in turn executes on the hardware processors of the host machine. The hypervisor provides a virtualized environment by enabling the physical computing resources (e.g., processing resources such as processors/cores, memory resources, networking resources) of the host machine to be shared among the various virtual machine compute instances executed by the host machine. For example, in FIG. 2, hypervisor 260 may sit on top of the OS of host machine 202 and enables the computing resources (e.g., processing, memory, and networking resources) of host machine 202 to be shared between compute instances (e.g., virtual machines) executed by host machine 202. A virtual machine can have its own operating system (referred to as a guest operating system), which may be the same as or different from the OS of the host machine. The operating system of a virtual machine executed by a host machine may be the same as or different from the operating system of another virtual machine executed by the same host machine. A hypervisor thus enables multiple operating systems to be executed alongside each other while sharing the same computing resources of the host machine. The host machines depicted in FIG. 2 may have the same or different types of hypervisors.

A compute instance can be a virtual machine instance or a bare metal instance. In FIG. 2, compute instances 268 on host machine 202 and 274 on host machine 208 are examples of virtual machine instances. Host machine 206 is an example of a bare metal instance that is provided to a customer.

In certain instances, an entire host machine may be provisioned to a single customer, and all of the one or more compute instances (either virtual machines or bare metal instance) hosted by that host machine belong to that same customer. In other instances, a host machine may be shared between multiple customers (i.e., multiple tenants). In such a multi-tenancy scenario, a host machine may host virtual machine compute instances belonging to different customers. These compute instances may be members of different VCNs of different customers. In certain embodiments, a bare metal compute instance is hosted by a bare metal server without a hypervisor. When a bare metal compute instance is provisioned, a single customer or tenant maintains control of the physical CPU, memory, and network interfaces of the host machine hosting the bare metal instance and the host machine is not shared with other customers or tenants.

As previously described, each compute instance that is part of a VCN is associated with a VNIC that enables the compute instance to become a member of a subnet of the VCN. The VNIC associated with a compute instance facilitates the communication of packets or frames to and from the compute instance. A VNIC is associated with a compute instance when the compute instance is created. In certain embodiments, for a compute instance executed by a host machine, the VNIC associated with that compute instance is executed by an NVD connected to the host machine. For example, in FIG. 2, host machine 202 executes a virtual machine compute instance 268 that is associated with VNIC 276, and VNIC 276 is executed by NVD 210 connected to host machine 202. As another example, bare metal instance 272 hosted by host machine 206 is associated with VNIC 280 that is executed by NVD 212 connected to host machine 206. As yet another example, VNIC 284 is associated with compute instance 274 executed by host machine 208, and VNIC 284 is executed by NVD 212 connected to host machine 208.

For compute instances hosted by a host machine, an NVD connected to that host machine also executes VCN VRs corresponding to VCNs of which the compute instances are members. For example, in the embodiment depicted in FIG. 2, NVD 210 executes VCN VR 277 corresponding to the VCN of which compute instance 268 is a member. NVD 212 may also execute one or more VCN VRs 283 corresponding to VCNs corresponding to the compute instances hosted by host machines 206 and 208.

A host machine may include one or more network interface cards (NIC) that enable the host machine to be connected to other devices. A NIC on a host machine may provide one or more ports (or interfaces) that enable the host machine to be communicatively connected to another device. For example, a host machine may be connected to an NVD using one or more ports (or interfaces) provided on the host machine and on the NVD. A host machine may also be connected to other devices such as another host machine.

For example, in FIG. 2, host machine 202 is connected to NVD 210 using link 220 that extends between a port 234 provided by a NIC 232 of host machine 202 and between a port 236 of NVD 210. Host machine 206 is connected to NVD 212 using link 224 that extends between a port 246 provided by a NIC 244 of host machine 206 and between a port 248 of NVD 212. Host machine 208 is connected to NVD 212 using link 226 that extends between a port 252 provided by a NIC 250 of host machine 208 and between a port 254 of NVD 212.

The NVDs are in turn connected via communication links to top-of-the-rack (TOR) switches, which are connected to physical network 218 (also referred to as the switch fabric). In certain embodiments, the links between a host machine and an NVD, and between an NVD and a TOR switch are Ethernet links. For example, in FIG. 2, NVDs 210 and 212 are connected to TOR switches 214 and 216, respectively, using links 228 and 230. In certain embodiments, the links 220, 224, 226, 228, and 230 are Ethernet links. The collection of host machines and NVDs that are connected to a TOR is sometimes referred to as a rack.

Figure 5:
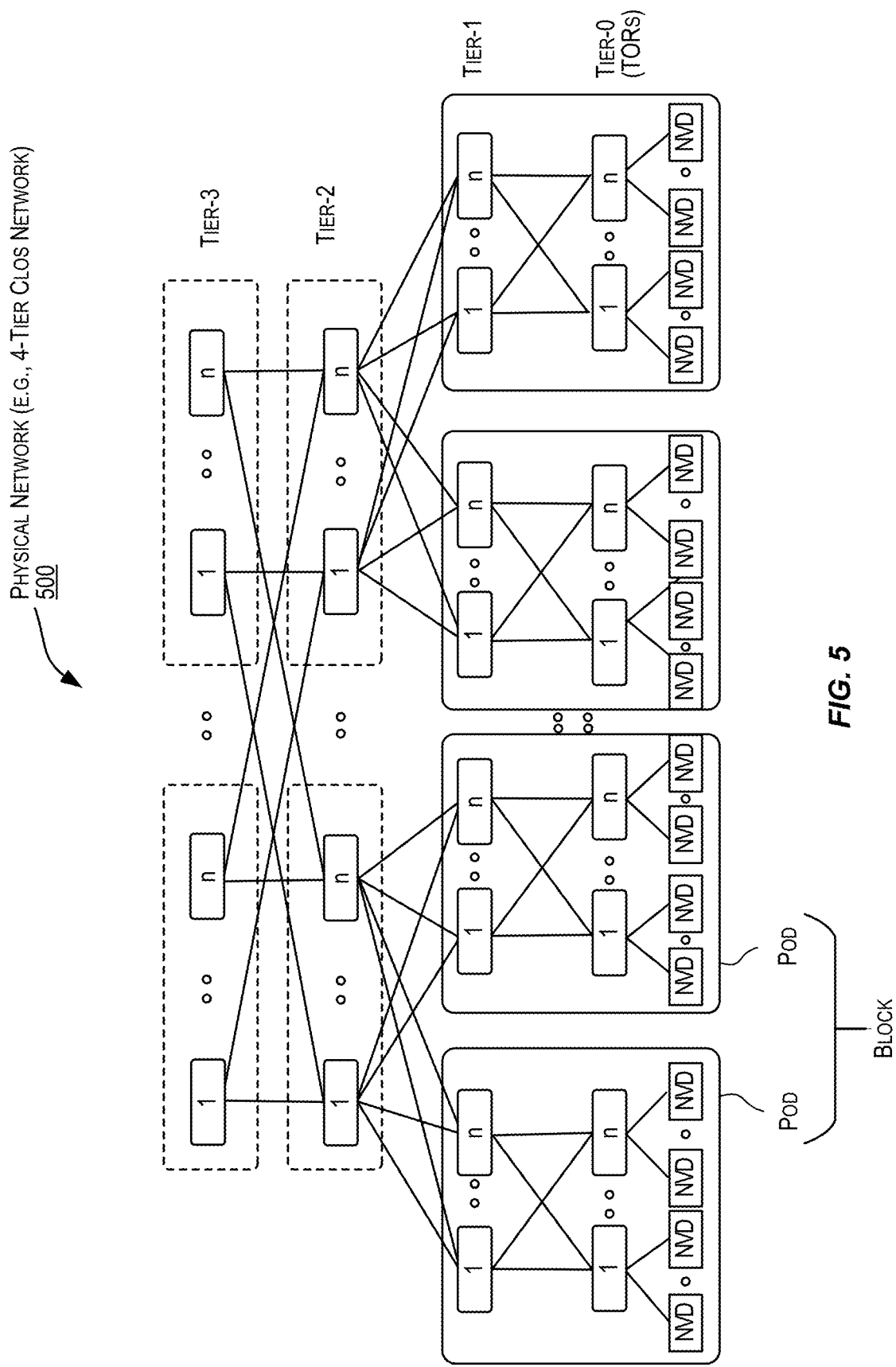
FIG. 5 depicts a simplified block diagram of a physical network provided by a CSPI according to certain embodiments.

Physical network 218 provides a communication fabric that enables TOR switches to communicate with each other. Physical network 218 can be a multi-tiered network. In certain implementations, physical network 218 is a multi-tiered Clos network of switches, with TOR switches 214 and 216 representing the leaf level nodes of the multi-tiered and multi-node physical switching network 218. Different Clos network configurations are possible including but not limited to a 2-tier network, a 3-tier network, a 4-tier network, a 5-tier network, and in general a "n"-tiered network. An example of a Clos network is depicted in FIG. 5 and described below.

Various different connection configurations are possible between host machines and NVDs such as one-to-one configuration, many-to-one configuration, one-to-many configuration, and others. In a one-to-one configuration implementation, each host machine is connected to its own separate NVD. For example, in FIG. 2, host machine 202 is connected to NVD 210 via MC 232 of host machine 202. In a many-to-one configuration, multiple host machines are connected to one NVD. For example, in FIG. 2, host machines 206 and 208 are connected to the same NVD 212 via NICs 244 and 250, respectively.

Figure 3:
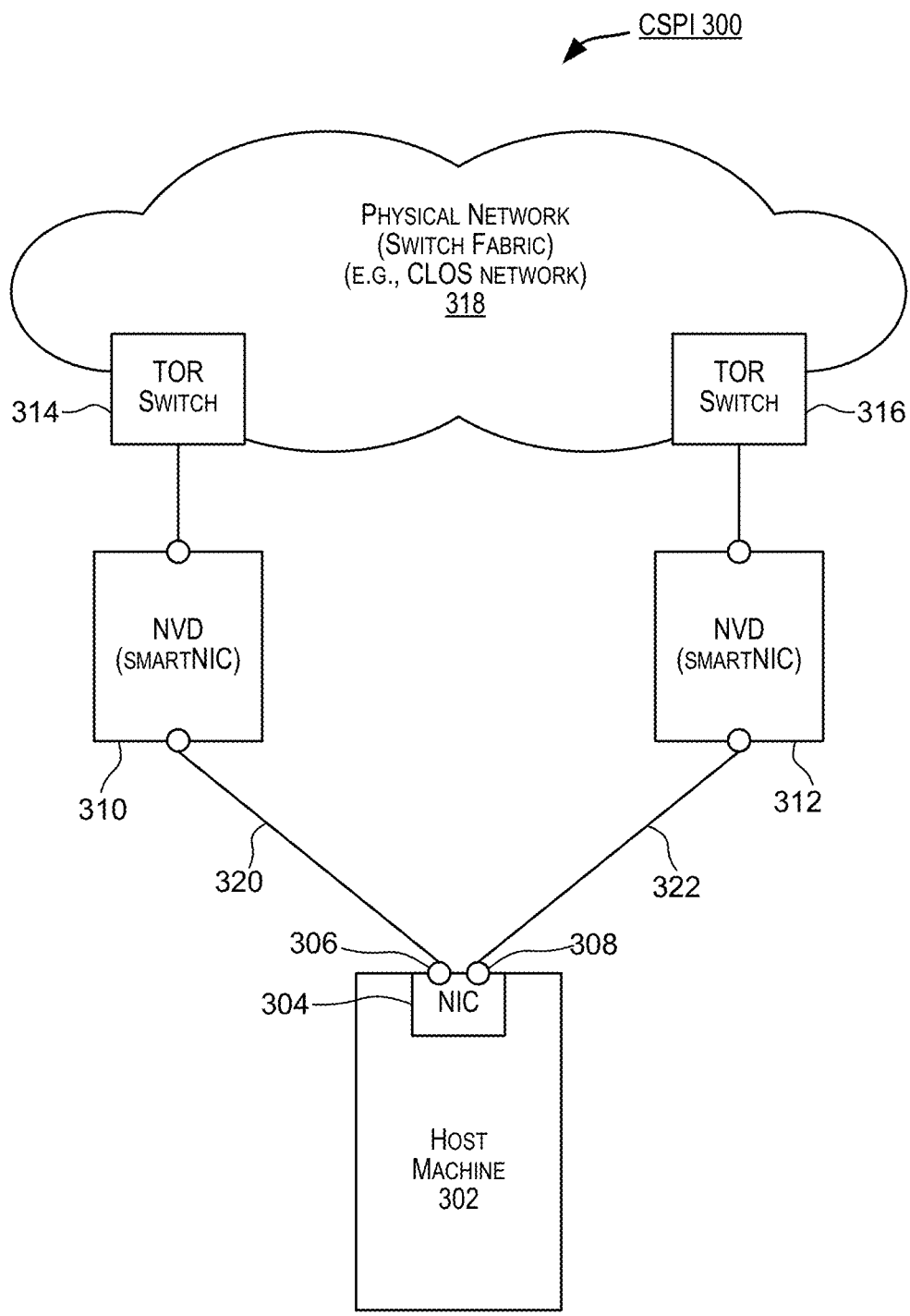
FIG. 3 shows an example arrangement within CSPI where a host machine is connected to multiple network virtualization devices (NVDs) according to certain embodiments.

In a one-to-many configuration, one host machine is connected to multiple NVDs. FIG. 3 shows an example within CSPI 300 where a host machine is connected to multiple NVDs. As shown in FIG. 3, host machine 302 comprises a network interface card (NIC) 304 that includes multiple ports 306 and 308. Host machine 300 is connected to a first NVD 310 via port 306 and link 320, and connected to a second NVD 312 via port 308 and link 322. Ports 306 and 308 may be Ethernet ports and the links 320 and 322 between host machine 302 and NVDs 310 and 312 may be Ethernet links. NVD 310 is in turn connected to a first TOR switch 314 and NVD 312 is connected to a second TOR switch 316. The links between NVDs 310 and 312, and TOR switches 314 and 316 may be Ethernet links. TOR switches 314 and 316 represent the Tier-0 switching devices in multi-tiered physical network 318.

The arrangement depicted in FIG. 3 provides two separate physical network paths to and from physical switch network 318 to host machine 302: a first path traversing TOR switch 314 to NVD 310 to host machine 302, and a second path traversing TOR switch 316 to NVD 312 to host machine 302. The separate paths provide for enhanced availability (referred to as high availability) of host machine 302. If there are problems in one of the paths (e.g., a link in one of the paths goes down) or devices (e.g., a particular NVD is not functioning), then the other path may be used for communications to/from host machine 302.

In the configuration depicted in FIG. 3, the host machine is connected to two different NVDs using two different ports provided by a NIC of the host machine. In other embodiments, a host machine may include multiple NICs that enable connectivity of the host machine to multiple NVDs.

Referring back to FIG. 2, an NVD is a physical device or component that performs one or more network and/or storage virtualization functions. An NVD may be any device with one or more processing units (e.g., CPUs, Network Processing Units (NPUs), FPGAs, packet processing pipelines, etc.), memory including cache, and ports. The various virtualization functions may be performed by software/firmware executed by the one or more processing units of the NVD.

An NVD may be implemented in various different forms. For example, in certain embodiments, an NVD is implemented as an interface card referred to as a smartNIC or an intelligent NIC with an embedded processor onboard. A smartNIC is a separate device from the NICs on the host machines. In FIG. 2, the NVDs 210 and 212 may be implemented as smartNICs that are connected to host machines 202, and host machines 206 and 208, respectively.

A smartNIC is however just one example of an NVD implementation. Various other implementations are possible. For example, in some other implementations, an NVD or one or more functions performed by the NVD may be incorporated into or performed by one or more host machines, one or more TOR switches, and other components of CSPI 200. For example, an NVD may be embodied in a host machine where the functions performed by an NVD are performed by the host machine. As another example, an NVD may be part of a TOR switch or a TOR switch may be configured to perform functions performed by an NVD that enables the TOR switch to perform various complex packet transformations that are used for a public cloud. A TOR that performs the functions of an NVD is sometimes referred to as a smart TOR. In yet other implementations, where virtual machines (VMs) instances, but not bare metal (BM) instances, are offered to customers, functions performed by an NVD may be implemented inside a hypervisor of the host machine. In some other implementations, some of the functions of the NVD may be offloaded to a centralized service running on a fleet of host machines.

In certain embodiments, such as when implemented as a smartNIC as shown in FIG. 2, an NVD may comprise multiple physical ports that enable it to be connected to one or more host machines and to one or more TOR switches. A port on an NVD can be classified as a host-facing port (also referred to as a "south port") or a network-facing or TOR-facing port (also referred to as a "north port"). A host-facing port of an NVD is a port that is used to connect the NVD to a host machine. Examples of host-facing ports in FIG. 2 include port 236 on NVD 210, and ports 248 and 254 on NVD 212. A network-facing port of an NVD is a port that is used to connect the NVD to a TOR switch. Examples of network-facing ports in FIG. 2 include port 256 on NVD 210, and port 258 on NVD 212. As shown in FIG. 2, NVD 210 is connected to TOR switch 214 using link 228 that extends from port 256 of NVD 210 to the TOR switch 214. Likewise, NVD 212 is connected to TOR switch 216 using link 230 that extends from port 258 of NVD 212 to the TOR switch 216.

An NVD receives packets and frames from a host machine (e.g., packets and frames generated by a compute instance hosted by the host machine) via a host-facing port and, after performing the necessary packet processing, may forward the packets and frames to a TOR switch via a network-facing port of the NVD. An NVD may receive packets and frames from a TOR switch via a network-facing port of the NVD and, after performing the necessary packet processing, may forward the packets and frames to a host machine via a host-facing port of the NVD.

In certain embodiments, there may be multiple ports and associated links between an NVD and a TOR switch. These ports and links may be aggregated to form a link aggregator group of multiple ports or links (referred to as a LAG). Link aggregation allows multiple physical links between two end-points (e.g., between an NVD and a TOR switch) to be treated as a single logical link. All the physical links in a given LAG may operate in full-duplex mode at the same speed. LAGs help increase the bandwidth and reliability of the connection between two endpoints. If one of the physical links in the LAG goes down, traffic is dynamically and transparently reassigned to one of the other physical links in the LAG. The aggregated physical links deliver higher bandwidth than each individual link. The multiple ports associated with a LAG are treated as a single logical port. Traffic can be load-balanced across the multiple physical links of a LAG. One or more LAGs may be configured between two endpoints. The two endpoints may be between an NVD and a TOR switch, between a host machine and an NVD, and the like.

An NVD implements or performs network virtualization functions. These functions are performed by software/firmware executed by the NVD. Examples of network virtualization functions include without limitation: packet encapsulation and de-capsulation functions; functions for creating a VCN network; functions for implementing network policies such as VCN security list (firewall) functionality; functions that facilitate the routing and forwarding of packets to and from compute instances in a VCN; and the like. In certain embodiments, upon receiving a packet, an NVD is configured to execute a packet processing pipeline for processing the packet and determining how the packet is to be forwarded or routed. As part of this packet processing pipeline, the NVD may execute one or more virtual functions associated with the overlay network such as executing VNICs associated with compute instances in the VCN, executing a Virtual Router (VR) associated with the VCN, the encapsulation and decapsulation of packets to facilitate forwarding or routing in the virtual network, execution of certain gateways (e.g., the Local Peering Gateway), the implementation of Security Lists, Network Security Groups, network address translation (NAT) functionality (e.g., the translation of Public IP to Private IP on a host by host basis), throttling functions, and other functions.

In certain embodiments, the packet processing data path in an NVD may comprise multiple packet pipelines, each composed of a series of packet transformation stages. In certain implementations, upon receiving a packet, the packet is parsed and classified to a single pipeline. The packet is then processed in a linear fashion, one stage after another, until the packet is either dropped or sent out over an interface of the NVD. These stages provide basic functional packet processing building blocks (e.g., validating headers, enforcing throttle, inserting new Layer-2 headers, enforcing L4 firewall, VCN encapsulation/decapsulation, etc.) so that new pipelines can be constructed by composing existing stages, and new functionality can be added by creating new stages and inserting them into existing pipelines.

An NVD may perform both control plane and data plane functions corresponding to a control plane and a data plane of a VCN. Examples of a VCN Control Plane are also depicted in FIGS. 13, 14, 15, and 16 (see references 1316, 1416, 1516, and 1616) and described below. Examples of a VCN Data Plane are depicted in FIGS. 13, 14, 15, and 16 (see references 1318, 1418, 1518, and 1618) and described below. The control plane functions include functions used for configuring a network (e.g., setting up routes and route tables, configuring VNICs, etc.) that controls how data is to be forwarded. In certain embodiments, a VCN Control Plane is provided that computes all the overlay-to-substrate mappings centrally and publishes them to the NVDs and to the virtual network edge devices such as various gateways such as the DRG, the SGW, the IGW, etc. Firewall rules may also be published using the same mechanism. In certain embodiments, an NVD only gets the mappings that are relevant for that NVD. The data plane functions include functions for the actual routing/forwarding of a packet based upon configuration set up using control plane. A VCN data plane is implemented by encapsulating the customer's network packets before they traverse the substrate network. The encapsulation/decapsulation functionality is implemented on the NVDs. In certain embodiments, an NVD is configured to intercept all network packets in and out of host machines and perform network virtualization functions.

As indicated above, an NVD executes various virtualization functions including VNICs and VCN VRs. An NVD may execute VNICs associated with the compute instances hosted by one or more host machines connected to the VNIC. For example, as depicted in FIG. 2, NVD 210 executes the functionality for VNIC 276 that is associated with compute instance 268 hosted by host machine 202 connected to NVD 210. As another example, NVD 212 executes VNIC 280 that is associated with bare metal compute instance 272 hosted by host machine 206, and executes VNIC 284 that is associated with compute instance 274 hosted by host machine 208. A host machine may host compute instances belonging to different VCNs, which belong to different customers, and the NVD connected to the host machine may execute the VNICs (i.e., execute VNICs-relate functionality) corresponding to the compute instances.

An NVD also executes VCN Virtual Routers corresponding to the VCNs of the compute instances. For example, in the embodiment depicted in FIG. 2, NVD 210 executes VCN VR 277 corresponding to the VCN to which compute instance 268 belongs. NVD 212 executes one or more VCN VRs 283 corresponding to one or more VCNs to which compute instances hosted by host machines 206 and 208 belong. In certain embodiments, the VCN VR corresponding to that VCN is executed by all the NVDs connected to host machines that host at least one compute instance belonging to that VCN. If a host machine hosts compute instances belonging to different VCNs, an NVD connected to that host machine may execute VCN VRs corresponding to those different VCNs.

In addition to VNICs and VCN VRs, an NVD may execute various software (e.g., daemons) and include one or more hardware components that facilitate the various network virtualization functions performed by the NVD. For purposes of simplicity, these various components are grouped together as "packet processing components" shown in FIG. 2. For example, NVD 210 comprises packet processing components 286 and NVD 212 comprises packet processing components 288. For example, the packet processing components for an NVD may include a packet processor that is configured to interact with the NVD's ports and hardware interfaces to monitor all packets received by and communicated using the NVD and store network information. The network information may, for example, include network flow information identifying different network flows handled by the NVD and per flow information (e.g., per flow statistics). In certain embodiments, network flows information may be stored on a per VNIC basis. The packet processor may perform packet-by-packet manipulations as well as implement stateful NAT and L4 firewall (FW). As another example, the packet processing components may include a replication agent that is configured to replicate information stored by the NVD to one or more different replication target stores. As yet another example, the packet processing components may include a logging agent that is configured to perform logging functions for the NVD. The packet processing components may also include software for monitoring the performance and health of the NVD and, also possibly of monitoring the state and health of other components connected to the NVD.

FIG. 1 shows the components of an example virtual or overlay network including a VCN, subnets within the VCN, compute instances deployed on subnets, VNICs associated with the compute instances, a VR for a VCN, and a set of gateways configured for the VCN. The overlay components depicted in FIG. 1 may be executed or hosted by one or more of the physical components depicted in FIG. 2. For example, the compute instances in a VCN may be executed or hosted by one or more host machines depicted in FIG. 2. For a compute instance hosted by a host machine, the VNIC associated with that compute instance is typically executed by an NVD connected to that host machine (i.e., the VNIC functionality is provided by the NVD connected to that host machine). The VCN VR function for a VCN is executed by all the NVDs that are connected to host machines hosting or executing the compute instances that are part of that VCN. The gateways associated with a VCN may be executed by one or more different types of NVDs. For example, certain gateways may be executed by smartNICs, while others may be executed by one or more host machines or other implementations of NVDs.

As described above, a compute instance in a customer VCN may communicate with various different endpoints, where the endpoints can be within the same subnet as the source compute instance, in a different subnet but within the same VCN as the source compute instance, or with an endpoint that is outside the VCN of the source compute instance. These communications are facilitated using VNICs associated with the compute instances, the VCN VRs, and the gateways associated with the VCNs.

For communications between two compute instances on the same subnet in a VCN, the communication is facilitated using VNICs associated with the source and destination compute instances. The source and destination compute instances may be hosted by the same host machine or by different host machines. A packet originating from a source compute instance may be forwarded from a host machine hosting the source compute instance to an NVD connected to that host machine. On the NVD, the packet is processed using a packet processing pipeline, which can include execution of the VNIC associated with the source compute instance. Since the destination endpoint for the packet is within the same subnet, execution of the VNIC associated with the source compute instance results in the packet being forwarded to an NVD executing the VNIC associated with the destination compute instance, which then processes and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs). The VNICs may use routing/forwarding tables stored by the NVD to determine the next hop for the packet.

For a packet to be communicated from a compute instance in a subnet to an endpoint in a different subnet in the same VCN, the packet originating from the source compute instance is communicated from the host machine hosting the source compute instance to the NVD connected to that host machine. On the NVD, the packet is processed using a packet processing pipeline, which can include execution of one or more VNICs, and the VR associated with the VCN. For example, as part of the packet processing pipeline, the NVD executes or invokes functionality corresponding to the VNIC (also referred to as executes the VNIC) associated with source compute instance. The functionality performed by the VNIC may include looking at the VLAN tag on the packet. Since the packet's destination is outside the subnet, the VCN VR functionality is next invoked and executed by the NVD. The VCN VR then routes the packet to the NVD executing the VNIC associated with the destination compute instance. The VNIC associated with the destination compute instance then processes the packet and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs).

If the destination for the packet is outside the VCN of the source compute instance, then the packet originating from the source compute instance is communicated from the host machine hosting the source compute instance to the NVD connected to that host machine. The NVD executes the VNIC associated with the source compute instance. Since the destination end point of the packet is outside the VCN, the packet is then processed by the VCN VR for that VCN. The NVD invokes the VCN VR functionality, which may result in the packet being forwarded to an NVD executing the appropriate gateway associated with the VCN. For example, if the destination is an endpoint within the customer's on-premise network, then the packet may be forwarded by the VCN VR to the NVD executing the DRG gateway configured for the VCN. The VCN VR may be executed on the same NVD as the NVD executing the VNIC associated with the source compute instance or by a different NVD. The gateway may be executed by an NVD, which may be a smartNIC, a host machine, or other NVD implementation. The packet is then processed by the gateway and forwarded to a next hop that facilitates communication of the packet to its intended destination endpoint. For example, in the embodiment depicted in FIG. 2, a packet originating from compute instance 268 may be communicated from host machine 202 to NVD 210 over link 220 (using NIC 232). On NVD 210, VNIC 276 is invoked since it is the VNIC associated with source compute instance 268. VNIC 276 is configured to examine the encapsulated information in the packet, and determine a next hop for forwarding the packet with the goal of facilitating communication of the packet to its intended destination endpoint, and then forward the packet to the determined next hop.

A compute instance deployed on a VCN can communicate with various different endpoints. These endpoints may include endpoints that are hosted by CSPI 200 and endpoints outside CSPI 200. Endpoints hosted by CSPI 200 may include instances in the same VCN or other VCNs, which may be the customer's VCNs, or VCNs not belonging to the customer. Communications between endpoints hosted by CSPI 200 may be performed over physical network 218. A compute instance may also communicate with endpoints that are not hosted by CSPI 200, or are outside CSPI 200. Examples of these endpoints include endpoints within a customer's on-premise network or data center, or public endpoints accessible over a public network such as the Internet. Communications with endpoints outside CSPI 200 may be performed over public networks (e.g., the Internet) (not shown in FIG. 2) or private networks (not shown in FIG. 2) using various communication protocols.

The architecture of CSPI 200 depicted in FIG. 2 is merely an example and is not intended to be limiting. Variations, alternatives, and modifications are possible in alternative embodiments. For example, in some implementations, CSPI 200 may have more or fewer systems or components than those shown in FIG. 2, may combine two or more systems, or may have a different configuration or arrangement of systems. The systems, subsystems, and other components depicted in FIG. 2 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

Figure 4:
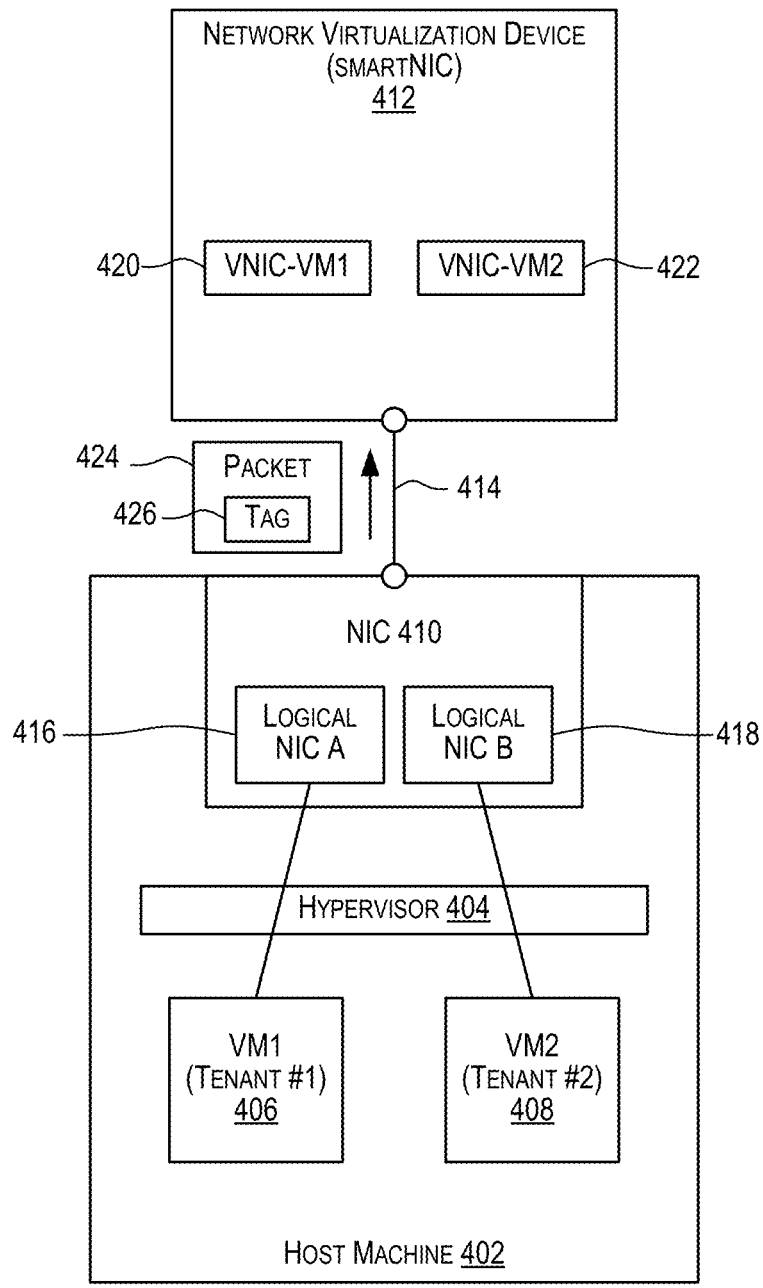
FIG. 4 depicts connectivity between a host machine and an NVD for providing I/O virtualization for supporting multitenancy according to certain embodiments.

FIG. 4 depicts connectivity between a host machine and an NVD for providing I/O virtualization for supporting multitenancy according to certain embodiments. As depicted in FIG. 4, host machine 402 executes a hypervisor 404 that provides a virtualized environment. Host machine 402 executes two virtual machine instances, VM1 406 belonging to customer/tenant #1 and VM2 408 belonging to customer/tenant #2. Host machine 402 comprises a physical NIC 410 that is connected to an NVD 412 via link 414. Each of the compute instances is attached to a VNIC that is executed by NVD 412. In the embodiment in FIG. 4, VM1 406 is attached to VNIC-VM1 420 and VM2 408 is attached to VNIC-VM2 422.

As shown in FIG. 4, NIC 410 comprises two logical NICs, logical NIC A 416 and logical NIC B 418. Each virtual machine is attached to and configured to work with its own logical NIC. For example, VM1 406 is attached to logical NIC A 416 and VM2 408 is attached to logical NIC B 418. Even though host machine 402 comprises only one physical NIC 410 that is shared by the multiple tenants, due to the logical NICs, each tenant's virtual machine believes they have their own host machine and NIC.

In certain embodiments, each logical NIC is assigned its own VLAN ID. Thus, a specific VLAN ID is assigned to logical NIC A 416 for Tenant #1 and a separate VLAN ID is assigned to logical NIC B 418 for Tenant #2. When a packet is communicated from VM1 406, a tag assigned to Tenant #1 is attached to the packet by the hypervisor and the packet is then communicated from host machine 402 to NVD 412 over link 414. In a similar manner, when a packet is communicated from VM2 408, a tag assigned to Tenant #2 is attached to the packet by the hypervisor and the packet is then communicated from host machine 402 to NVD 412 over link 414. Accordingly, a packet 424 communicated from host machine 402 to NVD 412 has an associated tag 426 that identifies a specific tenant and associated VM. On the NVD, for a packet 424 received from host machine 402, the tag 426 associated with the packet is used to determine whether the packet is to be processed by VNIC-VM1 420 or by VNIC-VM2 422. The packet is then processed by the corresponding VNIC. The configuration depicted in FIG. 4 enables each tenant's compute instance to believe that they own their own host machine and NIC. The setup depicted in FIG. 4 provides for I/O virtualization for supporting multi-tenancy.

FIG. 5 depicts a simplified block diagram of a physical network 500 according to certain embodiments. The embodiment depicted in FIG. 5 is structured as a Clos network. A Clos network is a particular type of network topology designed to provide connection redundancy while maintaining high bisection bandwidth and maximum resource utilization. A Clos network is a type of non-blocking, multistage or multi-tiered switching network, where the number of stages or tiers can be two, three, four, five, etc. The embodiment depicted in FIG. 5 is a 3-tiered network comprising tiers 1, 2, and 3. The TOR switches 504 represent Tier-0 switches in the Clos network. One or more NVDs are connected to the TOR switches. Tier-0 switches are also referred to as edge devices of the physical network. The Tier-0 switches are connected to Tier-1 switches, which are also referred to as leaf switches. In the embodiment depicted in FIG. 5, a set of "n" Tier-0 TOR switches are connected to a set of "n" Tier-1 switches and together form a pod. Each Tier-0 switch in a pod is interconnected to all the Tier-1 switches in the pod, but there is no connectivity of switches between pods. In certain implementations, two pods are referred to as a block. Each block is served by or connected to a set of "n" Tier-2 switches (sometimes referred to as spine switches). There can be several blocks in the physical network topology. The Tier-2 switches are in turn connected to "n" Tier-3 switches (sometimes referred to as super-spine switches). Communication of packets over physical network 500 is typically performed using one or more Layer-3 communication protocols. Typically, all the layers of the physical network, except for the TORs layer are n-ways redundant thus allowing for high availability. Policies may be specified for pods and blocks to control the visibility of switches to each other in the physical network so as to enable scaling of the physical network.

A feature of a Clos network is that the maximum hop count to reach from one Tier-0 switch to another Tier-0 switch (or from an NVD connected to a Tier-0-switch to another NVD connected to a Tier-0 switch) is fixed. For example, in a 3-Tiered Clos network at most seven hops are needed for a packet to reach from one NVD to another NVD, where the source and target NVDs are connected to the leaf tier of the Clos network. Likewise, in a 4-tiered Clos network, at most nine hops are needed for a packet to reach from one NVD to another NVD, where the source and target NVDs are connected to the leaf tier of the Clos network. Thus, a Clos network architecture maintains consistent latency throughout the network, which is important for communication within and between data centers. A Clos topology scales horizontally and is cost effective. The bandwidth/throughput capacity of the network can be easily increased by adding more switches at the various tiers (e.g., more leaf and spine switches) and by increasing the number of links between the switches at adjacent tiers.

In certain embodiments, each resource within CSPI is assigned a unique identifier called a Cloud Identifier (CID).

This identifier is included as part of the resource's information and can be used to manage the resource, for example, via a Console or through APIs. An example syntax for a CID is:

ocid 1.<RESOURCE TYPE>.<REALM>. [REGION][.FUTURE USE].<UNIQUE ID> where,
ocid 1: The literal string indicating the version of the CID;
resource type: The type of resource (for example, instance, volume, VCN, subnet, user, group, and so on);
realm: The realm the resource is in. Example values are "c1" for the commercial realm, "c2" for the Government Cloud realm, or "c3" for the Federal Government Cloud realm, etc. Each realm may have its own domain name;
region: The region the resource is in. If the region is not applicable to the resource, this part might be blank;
future use: Reserved for future use.
unique ID: The unique portion of the ID. The format may vary depending on the type of resource or service.

Route Management

A network may utilize one or several load balancers that can each distribute network or application traffic across a number of other devices such as across a number of servers. The use of a load balancer can, for example, improve application and/or system availability and/or responsiveness, and can prevent server overload.

Within a network, a load balancer may be created, deleted, or migrated. A load balancer can have multiple instances that can be within a same host or within different hosts. For example, a single load balancer may have at least two instances, each of which is located in a separate host. A load balancer may have multiple instances to increase the capacity and/or robustness of the load balancer. For example, in load balancers with multiple independent instances located on independent hosts, multiple instances and/or multiple hosts would have to become inoperable and/or malfunction before the load balancer would go off line.

While the load balancer may have two instances, to a customer, there is only a single load balancer.

In embodiments in which the load balancer has multiple instances, the load balancer can be accessed through a route for each of these multiple instances. Regardless of the path taken by traffic, and regardless through which of the multiple instances the traffic travels, the traffic would arrive at the same endpoint, which endpoint can be a server, a customer, and virtual machine, or the like.

These multiple routes can include a primary route, also referred to herein as a primary path, and at least one secondary route, also referred to herein as a secondary path. Although the present application frequently discusses the primary route as a single primary route, a load balancer could include multiple primary routes. The primary path, either alone or in aggregate with all of the other primary paths, can receive all of the traffic destined to the endpoint associated with the paths, and the secondary path can be held in reserve. By doing this, a secondary path is maintained that can quickly take the traffic destined to the endpoint if the primary path fails or is changed. Thus, providing a load balancer with multiple, paths, one of which is primary and at least one of which is secondary, the load balancer can be redundantly connected with the network, and can thereby have improved availability and/or reliability.

Primary and secondary routes can be determined based on an associated AS-path length. This AS-path length can include a parameter that identifies a "length" of an associated path. When a route is being selected, the AS-path lengths of the different routes are identified, and the traffic is provided to the route having the shortest AS-path length. Thus, a primary route has a shorter AS-path length then a secondary route, and changing a primary route to a secondary route includes changing the AS-path length of that primary route.

While multiple paths to a load balancer provides improved reliability and availability, it also provides some difficulties. Specifically, updating of the routes, such as occurs when the primary route is re-designated as a secondary route and/or when one of the secondary routes is re-designated as a primary route. Currently during this flip, a database that is accessible all of the hosts that will be affected by the flip is updated with new route information. Specifically, this database includes information identifying path lengths for the routes, and this database is updated to include the new path length information for routes affected by the flip. This can include updating the route information of host serving as the current primary route to increase its AS-path length, and updating the route information of the host serving as the current secondary route to decrease its AS-path length. Each host can include a BGPAgent, that can receive updated route information that is relevant to the BGPAgent's host from the database. The BGPAgent can then provide the received route information to ExaBGP, an application which can receive the route information from the BGPAgent, and can advertise that route information to a network device such as a switch, and specifically to a TOR. In the case that a host is changed from a primary route to a secondary route, the host, and specifically ExaBGP can advertise the updated route information, and specifically can advertise the increased AS-path length.

However, the successful execution of the flip requires both the host switching from primary route to secondary route to advertise this change, and the host switching from secondary route to primary route to also advertise this change. These advertisements, however, do not always take place simultaneously. In such a circumstance, there may be no primary route (in the event that the host that was previously the secondary route is slower to advertise the route changes than the host that was previously the primary route), or alternatively, there may be two primary routes (in the event that the host that was previously the primary route is slower to advertise the updated routes than the host that was previously the secondary route). In such a circumstance, traffic may not be routed to the endpoint.

In addition to problem associated with flipping routes, current systems have further shortcomings in identifying whether routes are being properly advertised and/or in determining whether each host and its associated BGPAgent and ExaBGP are properly functioning.

Systems and methods disclosed herein address these problems. For example, the present relates to a network system and/or methods of using the same to perform a health check to determine whether routes are being properly undated by one or more of the hosts. Further, the network system can perform a mismatch check that can validate that advertised routes match the routes that should be advertised, or more specifically, that advertised routes match routes identified in the database. Finally, the network system can perform a secure flip that eliminates risks arising from advertising timing discrepancies.

Figure 6:
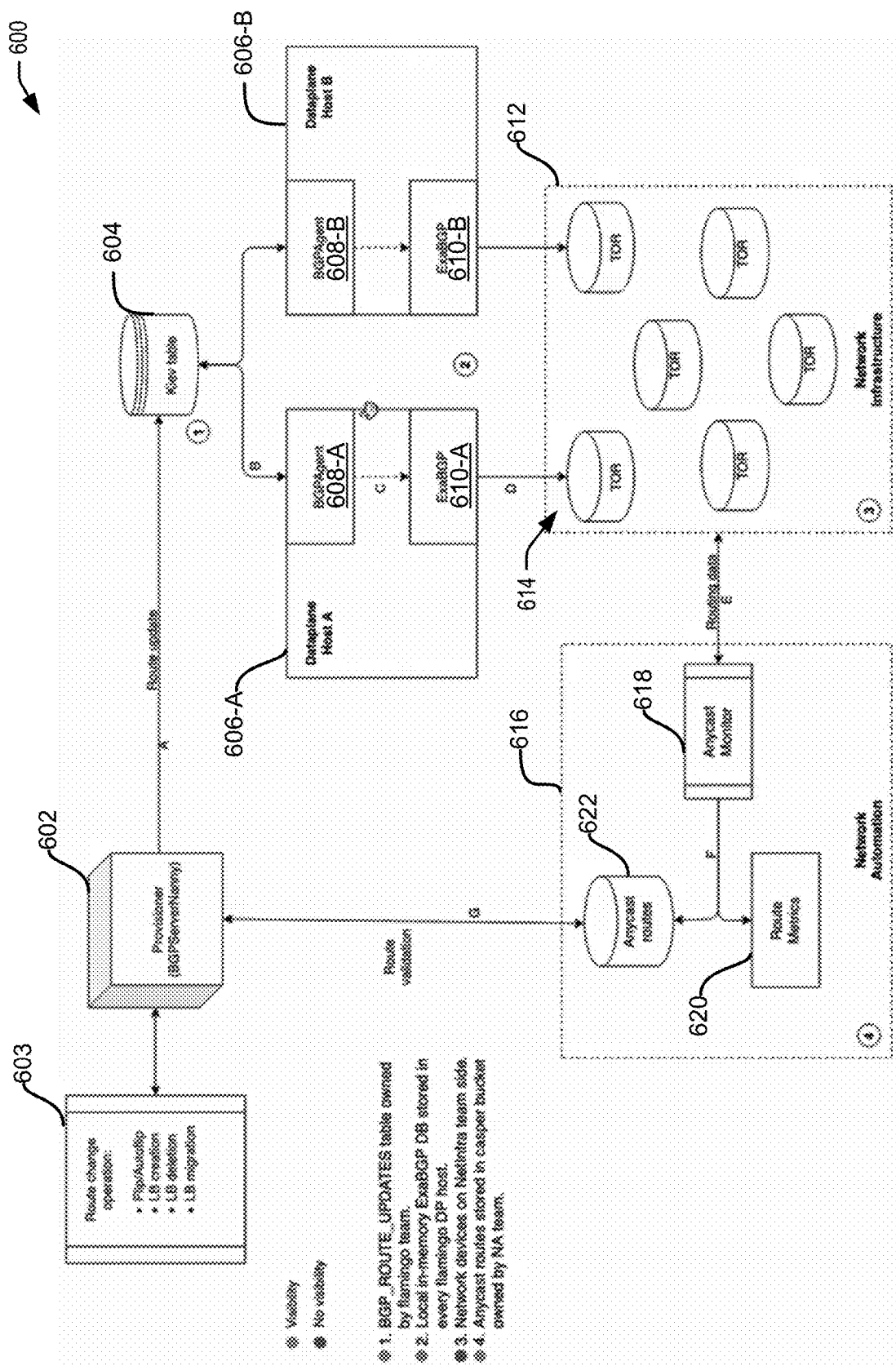
FIG. 6 is a schematic depiction of one embodiment of a network system for load balancer route management.

FIG. 6 depicts one embodiment of a network system 600. The network system 600, also referred to herein as "network 600" or a "communications network 600", can be included in a physical network, such as depicted in FIG. 5. In some embodiments, the network system 600 can be a part of a physical network. The network system 600 includes a provisioner 602, also referred to herein as a BGPServerNanny 602. The provisioner 602 can comprise hardware and/or software. In some embodiments, the provisioner 602 can comprise an application running on, for example, one or more processors and/or servers. The provisioner 602 can be configured to control routing, and specifically can be configured to perform a health check (e.g., deliver a test route and analyze the results of the delivery of the test route), perform a mismatch check, and/or perform a flip. In some embodiments, the provisioner 602 can be configured to provide route updates to the database 604, to receive data monitoring routes, and/or to analyze the data monitoring routes.

In some embodiments, the provisioner 602 is configured to update AS-path lengths in the database 604. In some embodiments, for example, a route change operation can be performed as indicated in block 603, which route change operation can include a flip between primary and secondary routes, the creation of a load balancer, the deletion of the load balancer, or load balancer migration. In some embodiments, information relating to the route change operation can be provided to the provisioner 602.

The database 604 can comprise a structured set of data held in memory. The database 604 can serve as the source of true information regarding routes for one or several low balancers. The database 604 can be accessible to some or all of the hosts 606, and specifically, can be accessible by some or all of the hosts that are advertising route information from the database 604. The database can include information relating to one or several routes, and specifically can include information identifying a route and the AS-path length of that route. In some embodiments, the database 604 can further include information identifying which of the routes is/are primary routes, and which of the routes is/are secondary routes. In some embodiments, the database 604 can receive route information such as AS-path lengths from the provisioner 602 and can provide that information to one, some, or all of the hosts 606, and specifically can provide that information to a BGPAgent 608 of each of the one, some, or all of the hosts 606.

The communication network 600 can comprise a plurality of hosts 606. The hosts 606 can be embodied in hardware or in software and can be, in some embodiments, hosts within the data plane. In some embodiments, each of the hosts can provide a computing environment in which one or several applications and/or programs run. In some embodiments some or all of these one or several applications and/or programs on the host can facilitate in the creation and/or advertising of the routes. In some embodiments, these one or several applications and/or programs can include a routing agent such as a BGPAgent 608 and an advertising agent such as an ExaBGP 610. In some embodiments, and as shown in FIG. 6, the hosts 606 can each contain a BGPAgent 608 and an ExaBGP 610. In some embodiments, each of the hosts 606 in the communication network 600 can comprise a routing agent and an advertising agent.

The BGPAgent 608 can configured to retrieve information, and specifically route information from the database 604. In some embodiments, the database 604 can push updated route information to the BGPAgent 608, and in some embodiments, the BGPAgent 608 can pull route information from the database 604. In some embodiments, for example, the BGPAgent 608 can pull information from the database 604 relevant to the host within which the BGPAgent 608 resides and/or relevant to the load balancer associated with the BGPAgent 608. The BGPAgent 608 then populates information received from the database 604 to ExaBGP 610. In some embodiments, this population of information to ExaBGP 610 can include the filtering and/or curating of information received by the BGPAgent 608 such that the BGPAgent 608 only provides information to ExaBGP 610 that is relevant to ExaBGP 608.

ExaBGP 610 can receive information from BGPAgent 608 and can then advertise that information to all or portions of the network infrastructure 612. In some embodiments, this can include advertising the received information to one or several switches, with switches can be one or several TOR switches 614. In some embodiments, this information can be advertised by ExaBGP 610 according to a communication protocol such as, for example, Border Gateway Protocol (BGP). In some embodiments, ExaBGP 610 converts data received from BGPAgent 608 into BGP. This can include, for example, converting the data to align with a BGP syntax. ExaBGP 610 can then advertise the routes of the converted data to all or portions of the network infrastructure 612.

The portions of the network infrastructure 612, including the TOR switches 614 are communicatingly connected with a network automation module 616 the network automation module 616 can collect routing data from the Tor switches 614 and/or from all or portions network infrastructure 612. This routing data can, for example, identify routes and the AS-path lengths of those routes. In some embodiments, the routing data can be received by the any cast monitor 618 of the network automation module 616. The any cast monitor can provide the routing data to a route metrics module 620 and/or to a routes database 622. The routes database six or 22 can be accessed by the provisioner 602 purposes about validation.

Test Route/Health Check

Figure 7:
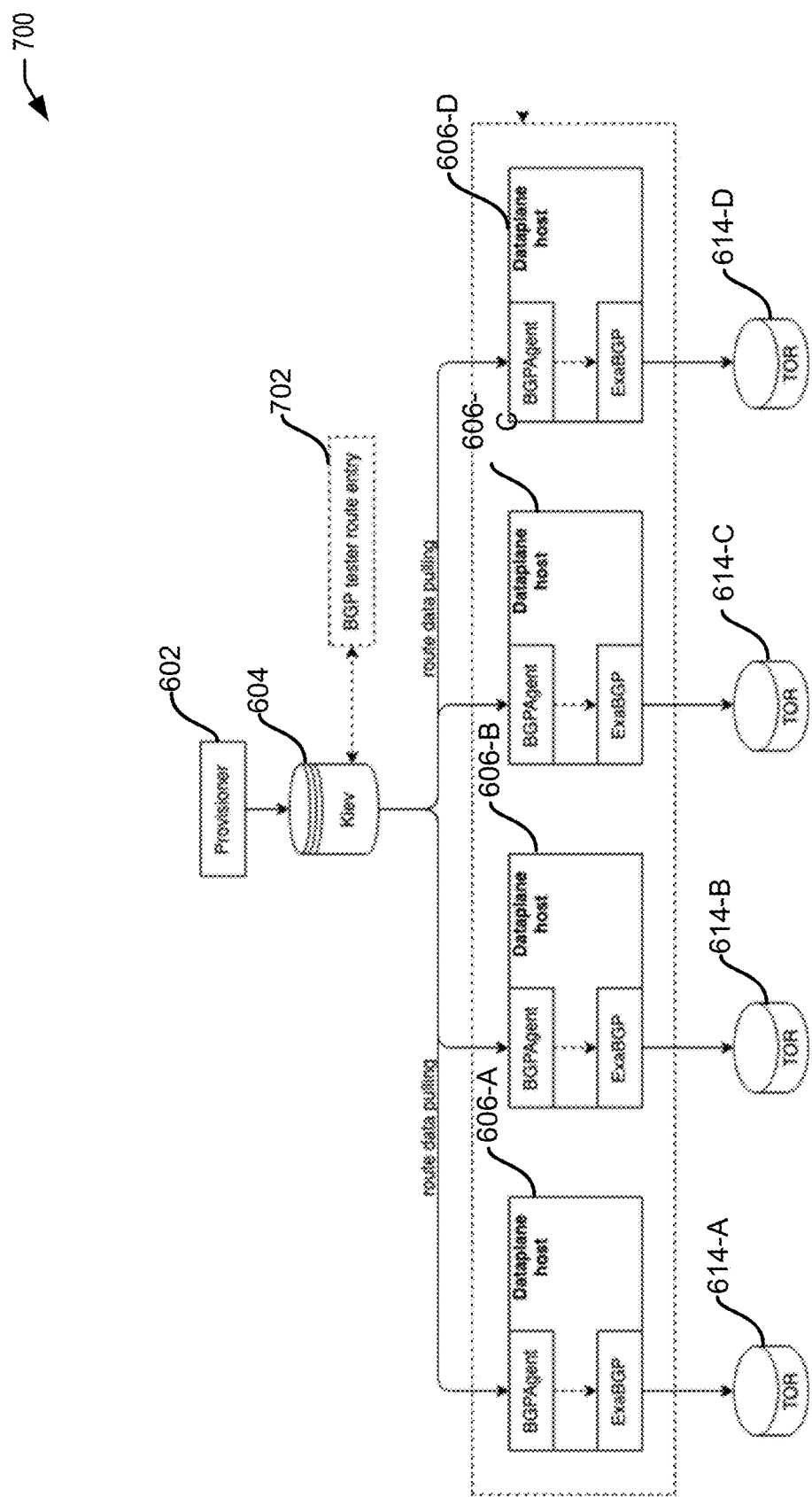
FIG. 7 is a schematic illustration of one embodiment of a system for performing a health check.

With reference now to FIG. 7, a schematic illustration of one embodiment of a system 700 for performing a health check is shown. It can be determined to perform a health check, and the provisioner 602 can update the database 604 with a tester route entry 702. The tester route entry 702 can identify an endpoint that is unused for traffic and/or that is used for testing purposes. The endpoint can correspond to and/or have an IP address The tester route 702 can be relevant to some or all of the hosts 606.

The BGPAgents 608 of the hosts 606 can retrieve and/or pull the route data from the database 604, which route data can include the tester route 702. This route data can then be provided to the ExaBGP 610 of the host 606, space which ExaBGP 610 can convert the route data to BGP syntax and can then advertise the route data to the TOR switch 614 associated with the host 606. As advertisements of route data are received by the TOR switches 614, that receiving TOR switch 614 provides routing data to the network automation module 616, which can then provide the routing data to the provisioner 602. The provisioner 602 can determine the success of the health check based on the received routing data. In some embodiments, and in the event that it is determined that the health check is unsuccessful, the provisioner 602 can trigger one or several alarms and/or alerts and/or can trigger remedial action to resolve the issue giving rise to the unsuccessful health check.

Figure 8:
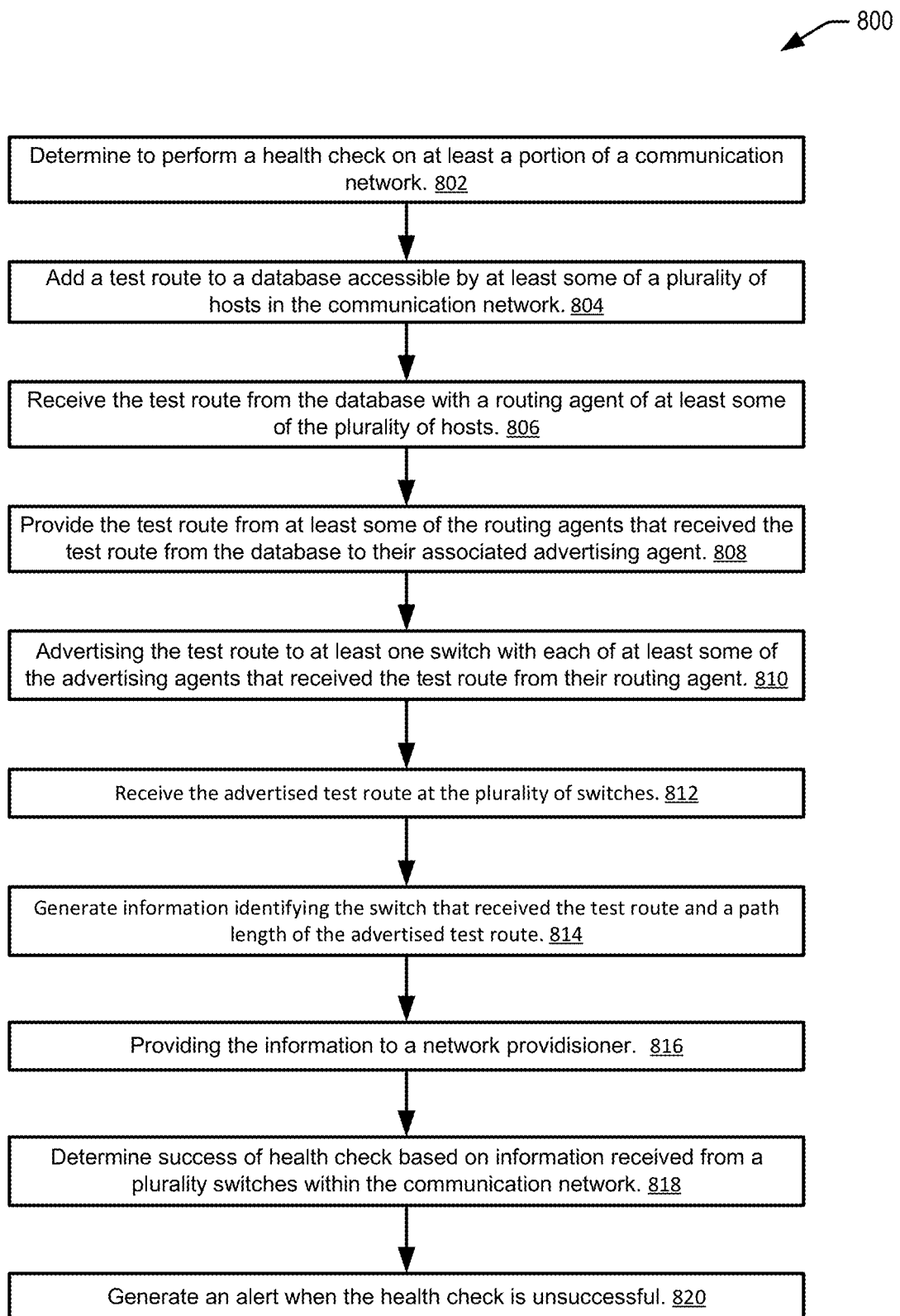
FIG. 8 is a flowchart illustrating one embodiment of a process for performing the health check.

With reference now to FIG. 8, a flowchart illustrating one embodiment of a process 800 for performing the health check is shown. The process 800 can be performed to determine if routes are properly being propagated through the network 600 and/or to identify the error in propagating the routes through the network 600. In some embodiments, for example, a routing agent may fail to properly retrieve and/or receive a route update including, for example, test route from the database 604, an advertising agent may fail to receive the route update including, for example the test route from the routing agent, the advertising agent may fail to properly advertise the routing update including, for example, the test route, and/or the switch may fail to properly receive the route update including, for example, the test route. The process 800 can determine whether the route update, which can include the test route, is properly propagated through the network 600.

The process 800 can be performed by all or portions of the network system 600. The process 800 begins at block 802 wherein it is determined to perform a health check on at least a portion of the communication network 600. In some embodiments, this determination can be made by the provisioner 602 which can, for example, perform a health check at regular time intervals, upon prompting by a user, upon completing of a predetermined action type, or the like.

At block 804, a test route 702 is added to database 604, which databases accessible by at least some of the plurality of hosts 606 and the communication network 600. The test route 702 can be added to the database 604 by the provisioner 602. In some embodiments, the test route 702 can identify hosts 606 for which the test route 702 is relevant and an endpoint of the test route 702. In some embodiments, the database 604 is accessible by each of a plurality of hosts 606, and in some embodiments, the test route is indicated as applicable to one, some, or every host 606. In some embodiments, the test route is indicated as applicable to every host 606 in a set of a plurality of hosts 606. In some embodiments, the endpoint of the test route 702 is not configured to receive communications.

At block 806 the test route 702 is received from the database 604 by a routing agent, and specifically by the BGPAgent 608 of at least some of the hosts 606 of the communications network 600. In some embodiments, the test route 702 can be received when the routing agent of a host 606 polls that information from the database 604. In some embodiments, the test route 702 can be received by every routing agent to which the test route is indicated as applicable, and in some embodiments, some of the routing agents to which the test route is indicated as applicable can fail to receive the test route. In some embodiments, receiving the test route from the database 604 with the routing agents can include retrieving the test route 702 from the database 604 with the routing agents.

At block 808 the test route 702 is provided by at least some of the routing agents that retrieved the test route 702 from the database 604 in block 806 to their associated advertising agent, and specifically to their associated ExaBGP 6210. In some embodiments, the test route 702 can be received by every advertising agent associated with a routing agent that received the test route 702, and in some embodiments, some of the advertising agents associated with a routing agent that received the test route 702 can fail to receive the test route. Thus, in some embodiments, each of the routing agents can provide the test route to their associated advertising agent.

At block 810, the test route 702 is advertised to at least one switch 614 by each of at least some of the advertising agents that received the test route 702 from the routing agent. In other words, at least some of the ExaBGPs 610 that received the test route 702 from their BGPAgent 608 advertise the test route 702 to their associated switch 614, which switches can comprise one or several TOR switches 614. In some embodiments, the test route can be advertised by at least some of the hosts 606 of the network 600, and specifically by the advertising agents of at least some of the hosts 606 of the network to a plurality of switches 614 in the network 600. In some embodiments, all of the advertising agents that received the test route 702 from their associated routing agent advertise the test route 702 to at least one switch 614, and in some embodiments, some of the advertising agents that received the test route 702 from their associated routing agent fail to advertise the test route 702 to at least one switch 614.

At block 812, the advertised test routes are received by the TOR switches 614 to which the test route 702 was advertised. In some embodiments the test route 702 can be advertised to a switch 614 associated with the advertising agent, and thus the test route 702 can be received by a switch 614 associated with the advertising agent that is advertising the test route 702. In some embodiments, every switch 614 to which the test route 702 was advertised receives the test route 702, and in some embodiments, some of the switches 614 to which the test route 702 was advertised fail to receive the test route 702.

At block 814, route metrics which can be information identifying the switch, and specifically the Tor switch 614, the route, and the path length, and specifically the AS-path length of the route are generated. In some embodiments this switch can be a switch that received the test route 702, and the path length can be the path length of the test route. This information can be generated by the switch 614. At block 816 the information generated in block 814 is provided to the provisioner 602. In some embodiments, each of a set of switches can provide information generated in block 814 to the network provisioner 602. In some embodiments, the information generated in block 814 can be provided to the provisioner by the switch 614 via, for example, network automation module 616. In some embodiments, the information generated in block 814 can be provided to the provisioner 602 by the switch 614 via, for example, providing the information generated in block 814 to the anycast monitor 618, and storing the information generated in block 814 in anycast routes database 622, which can be a database that is accessible by the network provisioner 602.

At block 818 the success of the health check is determined based on information received from a plurality of switches 614 within the communication network 600. In some embodiments, the success of the health check can be determined by the provisioner 602 based on the information received form the plurality of switches 614. In some embodiments, the health check is successful when each of the switches 614 that was supposed to receive the test route 702 in fact received the test route as indicated by information generated by that switch 614 subsequent to receipt of the test route 702. This determination of success of the health check can include determining if each of the switches 614 that was intended to receive the test route 702 in fact received the test route 702, and if the path length received and/or stored by each of the switches matches the path length of the test route 702 stored in the database 604. In some embodiments, determining success of the health check can include determining if the path length of the test route stored by each the plurality of switches 614 within a predetermined time period subsequent to adding the test route 702 to the database 604 matches the path length of the test route 702 stored in the database 604.

Alternatively the health check is successful when more than a predetermined number or percent of the switches that were supposed to receive the test route 702 in fact received the test route as indicated by information generated by those switches 614 subsequent to receipt of the test route 702. In some embodiments, the health check is unsuccessful when at least one of the switches that was supposed receive the test route 702 did not receive the test route as indicated by information generated by that switch 614. Alternatively, in some embodiments, the health check is unsuccessful when greater than a predetermined number or percent of switches 614 that were supposed receive the test route 702 did not receive the test route as indicated by information generated by those switches 614.

At block 820, alert is generated when the health check is unsuccessful. In some embodiments, this alert can comprise an alert or on alarm that can provide an indication to a user that the health check was unsuccessful. In some embodiments, and as a part of block 820, the system 600 can further determine one or several potential causes of the unsuccessful health check and/or one or remedial actions to remedy the unsuccessful health check. In some embodiments, step 820 can be performed by the provisioner 602.

Figure 9:
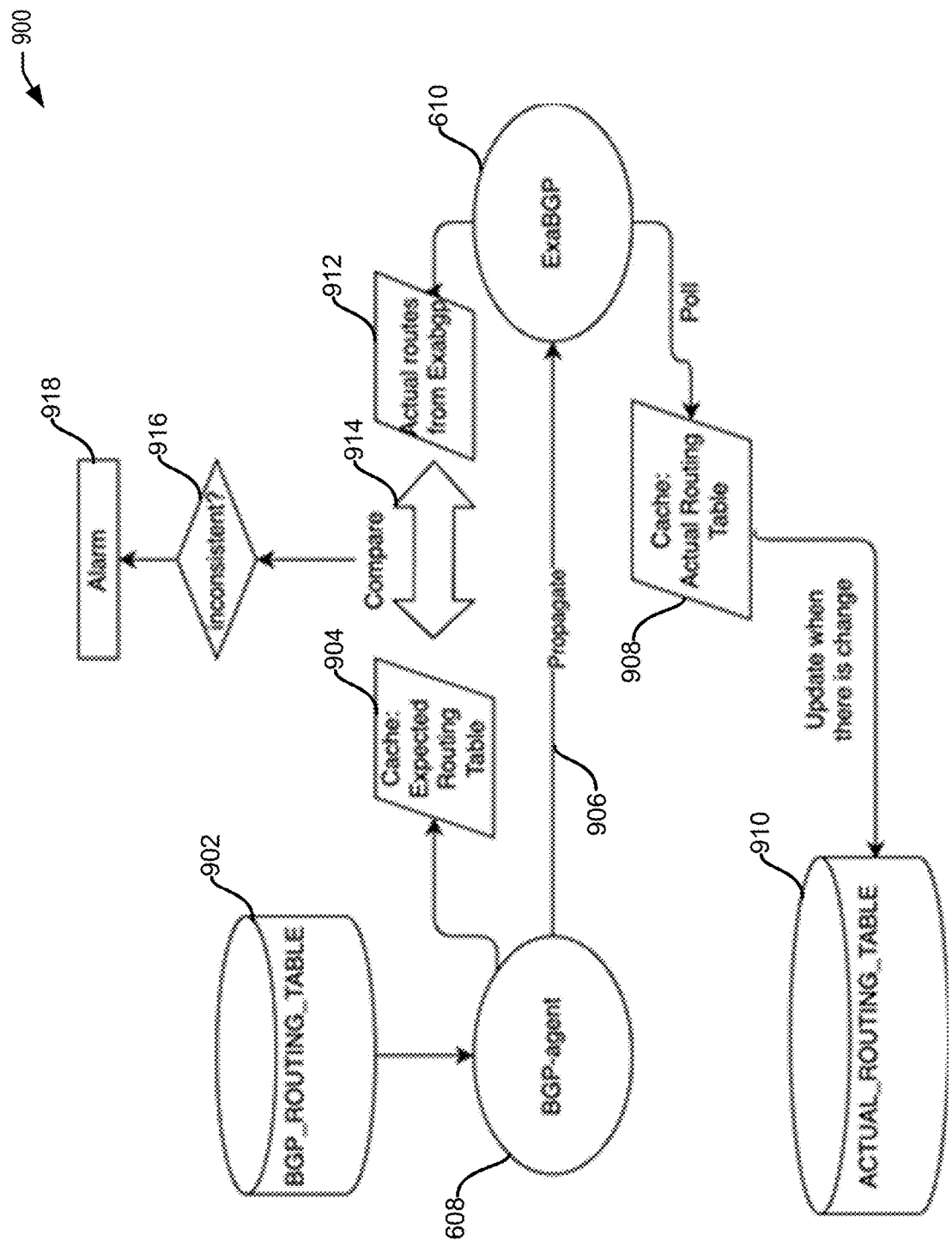
FIG. 9 is a schematic illustration of one embodiment of a mismatch check.

Mismatch Check with reference now to FIG. 9, a schematic illustration of a mismatch check 900 is depicted. The mismatch check 900 can be performed by all or portions of the system 600. In some embodiments, the mismatch check 900 can be performed to determine whether the actual advertised routing table matches the routing table in the database 604. In some embodiments, and when the system 600 is properly functioning, the advertised routing table will match the routing table in the database 604, especially after a predetermined amount of time has passed since any updates were made to the routing table and/or to the routing data contained in the database 604.

As the BGPAgent 608 accesses the BGP Routing Table 902 that contains the route information in the database 604, the BGPAgent 608 creates, in cache, an expected routing table 904. The expected routing table 904 matches the route information most recently pulled from the database 604, and specifically from the BGP routing table 902.

The BGPAgent 602 propagates the route information to ExaBGP 610, which advertises route information to one or several switches 614 in the network 600. The route information is stored by ExaBGP 610.

BGPAgent 608 can periodically request information relating to the actual routing table from ExaBGP 610. ExaBGP 610 can provide this actual route information to BGPAgent 608, AND BGPAgent 608 can create a local actual routing table 908 that can comprise a snapshot of current routes and/or of current route information. This local actual routing table 908 can be created in cache.

In addition to creating the local routing table 908, BGPAgent can compare 914 actual routing information 912 received from ExaBGP 610 with the cached expected routing table 904. It can be determined, based on this comparison, if the actual routing table and the expected routing table are consistent 916. If the actual and expected routing tables match, then it can be determined that updates are occurring properly. Alternatively, if it is determined that the actual routing table does not match the expected routing table, then an alarm and/or alert can be triggered 918. In some embodiments, this can include triggering one or several different alarms and/or alarm levels based on the degree of mismatch between the actual and expected routing tables. In some embodiments, the alarm and/or alert can be provided to the user, and in some embodiments, one or several remedial actions can be provided to the user, and/or implemented when the actual routing table does not match the expected routing table.

Additional to this comparison between actual and expected routes, as the BGPAgent 608 receives actual route information from the ExaBGP 610, BGPAgent 608 can compare the received information to the information stored in the local routing table 908. If there is a difference between the snapshot of routes stored in the local routing table 908 and the actual route information received from the ExaBGP 610, then the BGPAgent 608 can update a table, named the database actual routing table 910, in the database 604. In some embodiments, updating the database actual routing table 910 in the database can include the host 606, via the host's 606 BGPAgent 608, sending an update to the database 604.

Figure 10:
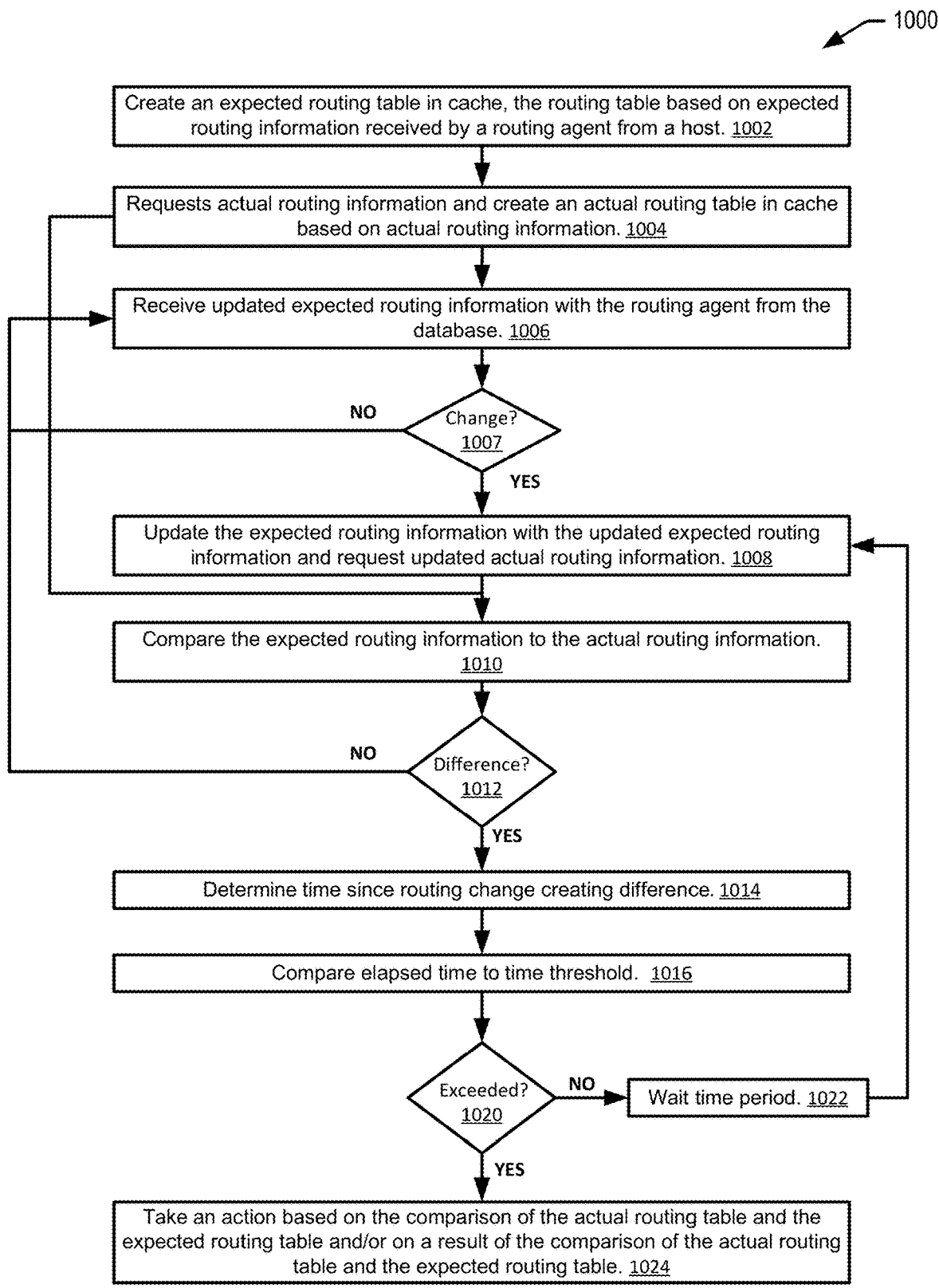
FIG. 10 is a flowchart illustrating one embodiment of a process for performing a mismatch check.

With reference now to FIG. 10, a flowchart illustrating one embodiment of a process 1000 for performing a mismatch check is shown. The process can be performed by all or portions of the system 600 including by, for example, the provisioner 602, the database 604, one or several host 606, the routing agent such as the BGPAgent 608 of each of the one or several hosts 606, and/or the advertising agent such as ExaBGP 610 of each of the one or several supposed 606. The process 1000 begins at block 1002 where an expected routing table 604 is created. The expected routing table can be created based on expected routing information received by a routing agent of a host 606 from a database 604 accessible by each of a plurality of hosts 606. The expected routing table 604 can be created by a routing agent such as the BGPAgent 608 of a host 606. The expected routing table 604 can be created in cache.

At block 1004 the routing agent request actual routing information from, for example, the advertising agent associated with the routing agent and/or associated with the same host 606 as the routing agent. Upon receipt of the routing information, the routing agent can create an actual routing table that contains the received actual routing information. This actual routing table can be local actual routing table 908 can be created in cache. In some embodiments, and upon completion of the step of block 1004, the process 1000 proceeds to block 1006 as discussed immediately below, whereas in some embodiments, the process 1000 proceeds to the step of block 1010 as discussed further below.

At block 1006, the routing agent receives updated expected routing information from the database 604. This database 604 can be, in some embodiments, accessible by each of a plurality of hosts 606 within the network 600. This update can reflect a change to one or several routes, the inclusion of a test route as part of a health check, or the like. In some embodiments, the routing agent can receive the updated expected routing information subsequent to querying the database 6044 such information.

A decision state 1007, the updated expected routing information is compared to the expected routing information, they can be, for example, contained within the expected routing table 904. Based on this comparison, it is determined if there has been a change to the routing information. If there has been no change, then the process 1000 returns to block 1006 and awaits the next receipt of updated expected routing information.

If it is determined that there has been a change to the routing information, then the process 1000 proceeds to block 1008 wherein the expected routing information is updated. In some embodiments, this can include updating the expected routing information contained in the expected routing table 904. This update can be performed by the routing agent. In some embodiments, and as part of the staff of block 1008, updated actual routing information can be requested. This updated actual routing information can be requested from the advertising agent, and specifically can be requested from ExaBGP 610.

At block 1010 the expected routing information is compared to the actual routing information. In some embodiments, this comparison can be performed by the routing agent. In some embodiments, this comparison can include the comparison of the expected routing information as contained in the expected routing table 904 with the actual routing information as contained in the local actual routing table 908. Thus, in some embodiments, this can include comparing the actual routing table 908 and the expected routing table 904. In embodiments in which routing tables have been updated, this can include a comparison of the updated actual routing table to the updated expected routing table.

At decision step 1012, and based on the comparison of the expected routing information the actual routing information, it is determined if there is a difference between the actual information and the expected routing information. Thus, decision step 1012 can include, determining that the actual routing table matches the expected routing table, or can include determining that the actual routing table does not match the expected routing table. In embodiments in which the actual routing table does not match the expected routing table, the decision step 1012 can include determining a difference between the actual routing table and the expected routing table. In some embodiments, and based on the outcome of decision step 1012, an action is taken based on the comparison of the actual routing table and the expected routing table.

In some embodiments, the determination of whether there is a difference between the actual routing information and the expected routing information can include determining whether there is a difference in routes identified the actual routing information versus the expected routing information and/or a difference in path lengths of routes identified in the actual routing information versus the expected routing information. If it is determined that there is no difference between the actual and expected routing information, and in the process 1000 can return to block 1006 and the weight of further update to the expected routing information.

Alternatively, if it is determined there is a difference between the actual and expected routing information, than the process 1000 proceeds to block 1014 wherein the time since the change to the routing information is determined. This can include, determining a time since initiation of a route change, or more specifically can include determining the amount of elapsed time cents the routing change was made and that is creating the difference between the actual routing information in the expected information. In some embodiments, the database 604 can include information indicating when route information was last updated, and the routing agent query the database 604 for this information. Upon receipt of information indicating when route information was last updated, the routing agent can determine the amount of time elapsed since the change in routing information giving rise the difference between the actual routing information and expected routing information.

At block 1016 the amount of elapsed time is compared to a time threshold. In some embodiments, the time threshold can delineate between acceptable amounts of elapsed time and unacceptable amounts of elapsed time. For example, a discrepancy between actual and expected route information may be acceptable if the discrepancy arises and glass during a very brief time interval subsequent to the change in the routing information giving rise that discrepancy. More specifically, if route information in the database 604 is updated, it may take several seconds but for that change in the route information propagates throughout the network 600, and there may be some period of time that is acceptable for that information to propagate to the network. The threshold reference in block 1016 can delineate between route information that has not yet propagated through the network 600 but that is still within the acceptable time frame for completing that propagation and route information that has not propagated through the network 600 although more than unacceptable amount of time has passed since that route information was changed.

At decision step 1020, it is determined if the time threshold has been exceeded. This determination can be made by the provisioner 602, the host 606, and/or the routing agent. If it is determined that the threshold has not been exceeded, then the process 1000 proceeds to block 1022 and waits for a period of time. In some embodiments, the process 1000 waits until sufficient time passes such that the threshold would be exceeded if the difference between the actual and expected routing information remains. After waiting for the time period, than the process 1000 returns to block 1008 and proceeds as outlined above. In some embodiments, and as part of returning to block 1008, the routing agent can query the database 604 for updated expected routing information, and can query that advertising agent for updated actual routing information.

Thus, in some embodiments in which a mismatch is detected, but the time threshold has not been exceeded, the process 1000 can wait a period of time, and can determine if there are any updates to the routing tables. If any updates to the routing tables are identified, then the routing tables can be updated, and the expected routing table can be compared to the actual routing table, and the process can again return to decision step 1012, and can proceed as outlined above. If it is determined that there is a difference between the compared actual and expected routing tables, steps 1014 and 1016 can, in some embodiments, be performed, and the process 1000 can advance to decision step 1020, where it can be determined if the time threshold has been exceeded. If the time threshold has not been exceeded, the process 1000 returns to block 1022.

Returning again to decision step 1020, if it is determined that the threshold has been exceeded, then the process 1000 proceeds to block 1024 and an action is taken. In some embodiments, this action can include the triggering of an alarm or of the alert indicating that the threshold has been exceeded and that the expected routing information does not match the actual routing information. In some embodiments, this action can be taken based on the comparison of the actual routing table 908 and the expected routing table 904 and/or on result of the comparison of the actual routing table 908 and expected routing table 904. In some embodiments come this action can include performing a health check to determine if all or portions of network properly functioning and/or to identify portions of the network 600 that are not properly functioning. In some embodiments, and as part of block 1024, one or several remedial actions can be identified and/or taken to address the identified mismatch.

Route Flip

Figure 11:
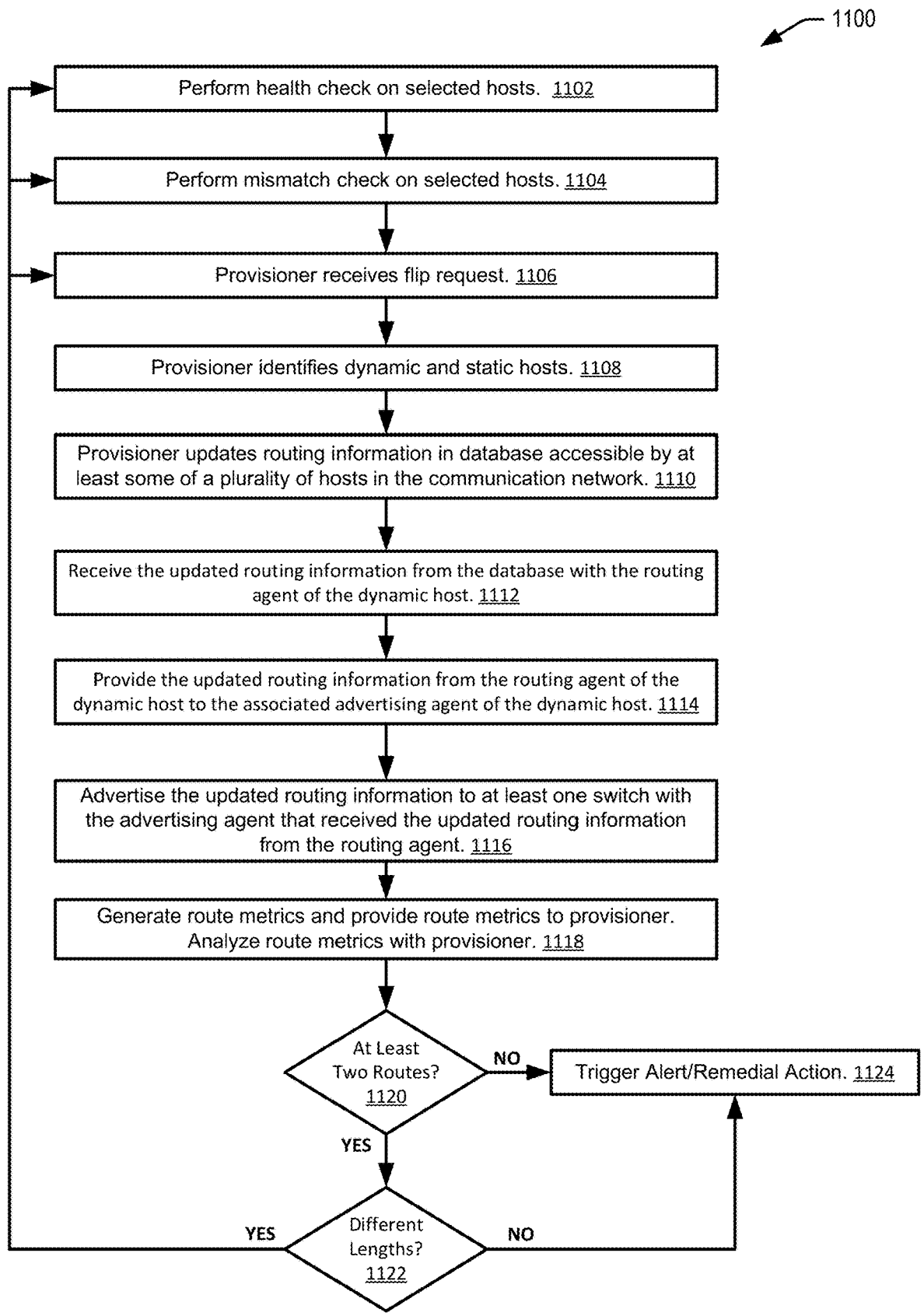
FIG. 11 is a flowchart illustrating one embodiment of a process for performing a route flip.

With reference now to FIG. 11, a flowchart illustrating one embodiment of a process 1100 for performing a route flip is shown. A route flip includes, for a load balancer, changing a primary route to a secondary route and at least one secondary route to a primary route. The process can be performed by all or portions of the network 600 including by, for example, the provisioner 602, the database 604, one or several host 606, the routing agent such as the BGPAgent 608 of each of the one or several hosts 606, and/or the advertising agent such as ExaBGP 610 of each of the one or several supposed 606. In some embodiments, the process 1100 can include steps 1102 and 1104, whereas in other embodiments, the process 1100 this not include the steps.

In embodiments including step 1102, the process 1100 begins at block 1102 wherein a health check is performed on one or several hosts 606. In some embodiments, the health check can be performed on all of the host 606, and in other embodiments, the health check can be performed on a subset of hosts 606. The health check can be performed as outlined in process 800 depicted in FIG. 8.

In some embodiments, if the health check is passed, and if the process 1100 includes the step of block 1104, then the process 1100 proceeds to block 1104 wherein a mismatch check is performed on one or several hosts 606. In some embodiments, the mismatch check can be performed on all of the host 606, and in other embodiments, the mismatch check can be performed on a subset of hosts 606. The mismatch check can be performed as outlined in process 1000 depicted in FIG. 10. In some embodiments, if the mismatch check is passed, then the process 1100 proceeds to block 1106, and in some embodiments, if the mismatch check is not passed, then remedial action is taken and/or alarms are triggered in the process 1100 waits until the mismatch check is passed.

At block 1106 the provisioner 602 receives a route flip request. In some embodiments, the route flip request can be a request to flip a primary route and a secondary route in a communications network 600, which network 600 can include at least a first host 606-A and a second host 606-B, each of which hosts 606 includes a routing agent and an advertising agent. In some embodiments, each of the first host 606-A and the second host 606-B are associated with a load balancer, and specifically with the same load balancer. In some embodiments, the route flip request can be received from the user. In some embodiments, the health check of block 1102 can be performed after receiving the request to flip the primary route and the secondary route of block 1106, and in some embodiments, the health check can be performed before the step of block 1110.

At block 1108, the provisioner 602 identifies one or several dynamic hosts and one or several static hosts. In some embodiments, this can include identifying the first host 606-A as the dynamic host, or in other words having a dynamic path length, and identifying the second host 606-B as the static host, or in other words having a static path length. In some embodiments, the first host 606-A has the primary route when the path length of the first host 606-A is less than the path length of the second host 606-B, and in some embodiments, the first host 606-A has the secondary route when the path length of the first host 606-A is greater than the path length of the second host 606-B.

In some embodiments, the provisioner 602 can identify one or several static hosts and/or one or several dynamic hosts based on attributes of those hosts 606. In some embodiments, for example, a static host can have a predetermined path length, which path length can remain constant. Thus, by identifying hosts 606 having this predetermined path length, the static hosts can be identified. Similarly, in such an embodiment, identifying hosts 606 without this predetermined path length can identify dynamic hosts. Alternatively, in some embodiments, the database 604 can comprise data which can be, for example, stored in a table that identifies some or all of the hosts 606 as either a static host or as a dynamic host.

At block 1110, routing information in the database 604 is updated. The database 605 can, in some embodiments, be accessible by the dynamic hosts 606, and thus can be accessible by the first host 606-A. In some embodiments, this updating of information can include updating of path lengths for at least some of the plurality of hosts 606 in the network 600. More specifically, this updating of information can include updating of path lengths for at least some of the plurality of hosts 606 in the networks, which some of the plurality of hosts 606 are dynamic hosts. In some embodiments, the information in the database 604 can be updated by the provisioner 602. In some embodiments, this update can include changing the path length of the first host 606-A from a first path length to a second path length. In some embodiments, the first path length can be less than the second path length, and in some embodiments, the first path length can be greater than the second path length. In some embodiments, the first path length of the first host 606-A is less than the path length of the second host 606-B, and in some embodiments, the second path length of the first host 606-A is greater than the path length of the second host 606-B. In some embodiments, the first path length of the first host 606-A is greater than the path length of the second host 606-B, and in some embodiments, the second path length of the first host 606-A is less than the path length of the second host 606-B.

At block 1112, the updated routing information can be received from the database 604 by the hosts 606, and specifically by the routing agent such as the BGPAgent 608 of the hosts 606. In some embodiments, the routing information can be received by the routing agents of the dynamic hosts that are affected by the updated routing information. Thus, in some embodiments, the updated routing information can be received from the database 604 by the routing agent of the first host 606-A.

In some embodiments, for example, the routing agents can pull all routing updates from the database 604, and in other embodiments, the routing agents can pull routing updates from the database 604 that are relevant to the host of the routing agents. Thus, in some embodiments, the routing agent only retrieves routing information relevant to the routing agent's hosts 606, and in other embodiments, the routing agent retrieves more routing information than that which is relevant to the routing agent's host 606. In some embodiments in which the routing agent retrieves more routing information than is relevant to the routing agent's host 606, the routing agent filters this routing information and only provides routing information relevant to the routing agent's host 606 to ExaBGP 610.

At block 1114, the updated routing information is provided by the routing agent to the advertising agent. In some embodiments, the routing information can be provided by the routing agent of the dynamic host to the advertising agent of that same dynamic host. In some embodiments, this can include, for example, the BGPAgent 608 of the dynamic host providing the updated routing information to the ExaBGP 610 of the dynamic host. Thus, in some embodiments, the updated routing information can be provided by the routing agent of the first host 606-A to the advertising agent of the first host 606-A.

At block 1116, the updated routing information is advertised to the network 600. In some embodiments, this can include advertising the updated routing information to at least one switch, such as to at least one TOR switch 614. The updated routing information can be advertised by the host 606, and specifically by the advertising agent of the host 606, and more specifically by the ExaBGP 610 of the host 606 that received the updated routing information from the routing agent. The updated routing information can be advertised by the advertising agent to the switch associated with the host 606. In some embodiments, the advertising agent of each of the dynamic hosts. Thus, in some embodiments, the updated routing information can be advertised by the first host 606-A, and specifically by the advertising agent of the first host 606-A within the communication network 600. In some embodiments, advertising the updated routing information changes the path length of the first host 606-A from the first path length to the second path length. In some embodiments, changing the path length of the first host 606-A from the first path length to the second path length switches the first host 606-A from having the primary route to having the secondary route, or alternatively switches the first host 606-A from having the secondary route to having the primary route.

At block 1118, route metrics are generated and provided to the provisioner 602. In some embodiments, the route metrics can be generated by, for example, the hosts 606, and in some embodiments, the route metrics can be generated by, for example, the switches 614. The route metrics can include information identifying the switch, and specifically the Tor switch 614, the route, and the path length, and specifically the AS-path length of the route. Route metrics can, in some embodiments, be generated for each route, and/or for each route updated based on the updated routing information. Thus, in some embodiments, the first host 606-A and/or the second host 606-B can generate route metrics and can provide those route metrics to the provisioner 602.

The route metrics can be provided to the provisioner 602 by the switch 614 via, for example, network automation module 616. In some embodiments, and upon receipt of the route metrics, the provisioner 602 can analyze the route metrics. In some embodiments, this can include identifying load balancers to which the route metrics are relevant, identifying routes associated with each of the load balancers, and identifying metrics of those routes. In some embodiments, the provisioner 602 can further analyze the route metrics of each load balancer to determine the number of routes associated with each load balancer and the path length of each of these routes. In some embodiments, the provisioner can compare the route metrics to one or several threshold values, which thresholds delineate between acceptable and unacceptable metrics. For example, in some embodiments, the thresholds delineate between load balancers having at least both: one primary route; and one secondary route, and load balancers that do not have at least both: one primary route; and one secondary route. Thus, in some embodiments, the load balancer associated with the first and second hosts 606-A, 606-B can be identified, and the number of routes associated with the load balancer is determined.

At decision step 1120, it is determined if each load balancer has at least two associated routes. This determination can be made by the provisioner 602 based on the analysis of route metrics by the provisioner of block 1118. If it is determined that there is a load balancer without at least two routes, then the process 1100 proceeds to block 1124 and triggers an alert and/or takes a remedial action. Thus, if it is determined that the load balancer associated with the first host 606-A and the second host 606-B has less than two routes, then the process 1100 proceeds to block 1124.

Alternatively, if it is determined that each load balancer has at least two routes, then the process 1100 proceeds to decision step 1122, wherein it is determined if the routes of each load balancer have different lengths, and specifically, if the routes of each load balancer have at least two different lengths. Thus, if it is determined that the load balancer associated with the first and second hosts 606-A, 606-B has at least two routes, then the process 1100 proceeds to decision step 1122, wherein it is determined if the routes of each load balancer have different lengths, and specifically, if the routes of each load balancer have at least two different lengths.

In some embodiments, determining if the routes of each load balancer have different lengths can include determining whether each load balancer has a primary route having a first path length, and a secondary route having a second path length. In some embodiments, the primary path length is less than the secondary path length. If it is determined that at least one load balancer has routes that only have a single length, and thus does not have a primary route and a secondary route, then the process 1100 proceeds to block 1124 and triggers an alert and/or takes a remedial action. In some embodiments, this alert can comprise an alert or on alarm that can provide an indication to a user that the flip was unsuccessful. In some embodiments, and as a part of block 1124 the system 600 can further determine one or several potential causes of the unsuccessful route flip and/or one or remedial actions to remedy the unsuccessful route flip. In some embodiments, step 1124 can be performed by the provisioner 602.

Thus, in some embodiments, at decision step 1122, it can be determined that the load balancer associated with the first host 606-A and the second host 606-B has a plurality of primary routes, or has no primary routes. In either of these cases, the process 1100 proceeds to block 1124 and triggers an alarm. Thus an alarm can be triggered when it is determined that there are more than one primary route or that there are no primary routes.

Alternatively, if it is determined that each load balancer has a primary route and a secondary route, then the process 1100 returns to one of steps 1102, 1104, and 1106 and proceeds as outlined above. Thus, if it is determined that the load balancer associated with the first host 606-A and the second host 606-B has a primary route and at least one secondary route, then the process 1100 returns to one of steps 1102, 1104, and 1106 and proceeds as outlined above.

With reference now to FIG. 12, a chart 1200 depicting the effect of the route flip on path lengths is shown. The chart 1200 depicts two hosts, a first host A that is the dynamic host and a second host B that is the static host. The original as path length of host A is 1 and the original path length of host B is 20. Thus, host A is the primary path and host B is the secondary path. As host A is the dynamic host, when the route is flipped, updated route information for host A is added to database 604, and this information in ultimately advertised by the advertising agent such as ExaBGP 610 for host A. In this updated route information, host A has a path length of 30, which is longer than the path length of host B. Thus, after this route flip, host B is the primary route and host A is the secondary route.

A second flip is performed. As route A is the dynamic host, updated route information for host A is added to the database 604, and this information in ultimately advertised by the advertising agent such as ExaBGP 610 for host A. In this updated route information, host A has a path length of 1, which is shorter than the path length of host B. Thus, after this route flip, host A is the primary route and host B is the secondary route. Via the implementation of the method 1100, the path length of the dynamic host is changed while the path length of the static host remains the same. Thus, only a single one of the hosts advertises a change in path length, thereby avoiding problems arising from missing either a primary or secondary path.

In some embodiments, the nature of a host 606, whether it is static or dynamic, can be determined and/or set when a load balancer is created, and can be tracked when a load balancer and/or route is migrated. In some embodiments, this can include, for example, maintaining path length of routes when migrating a load balancer so that hosts 606 can be identified as static or dynamic hosts.

Example Implementation

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be setup. In some instances, the provisioning can be done manually, a provisioning tool may be utilized to provision the resources, and/or deployment tools may be utilized to deploy the code once the infrastructure is provisioned.

Figure 13:
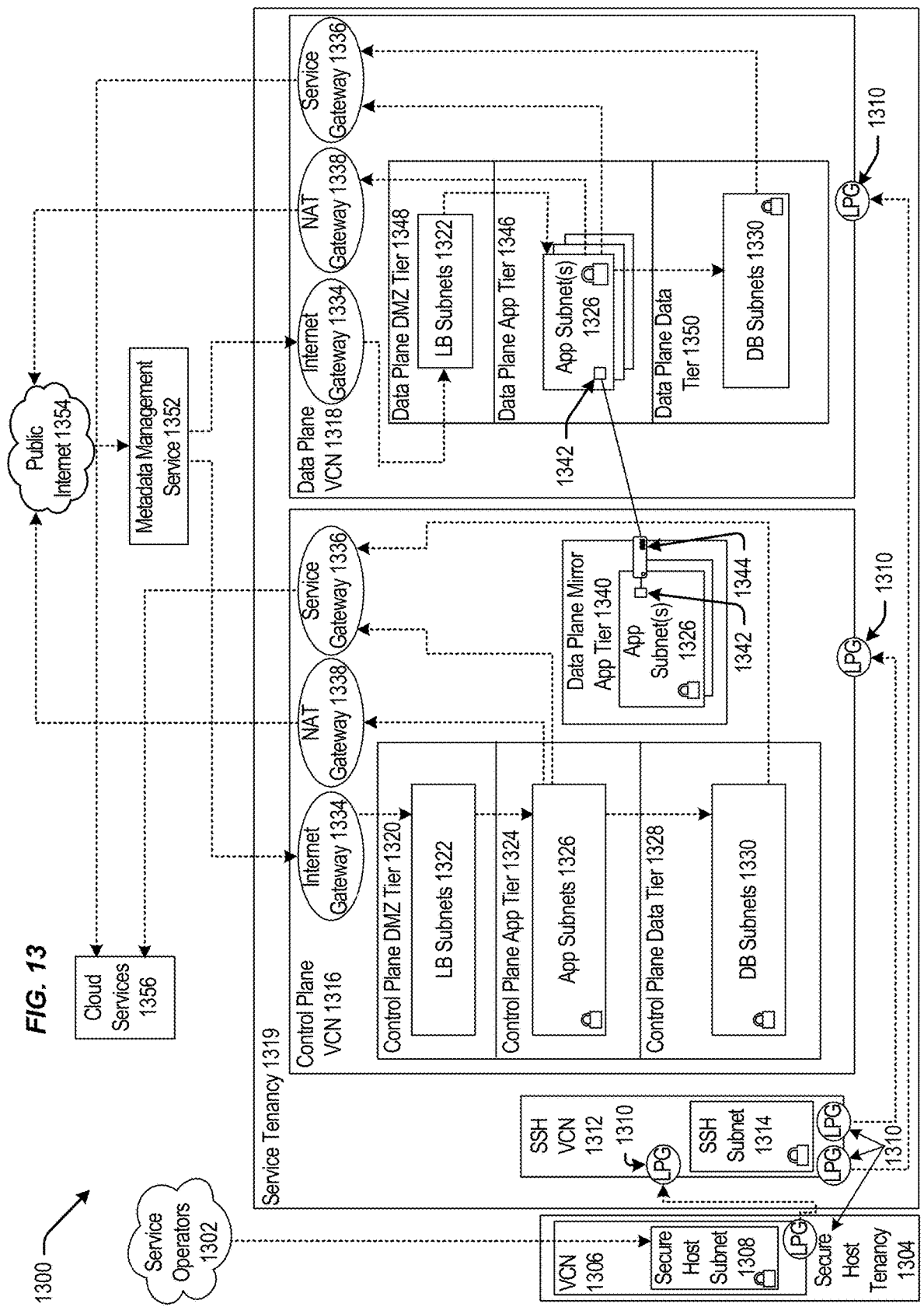
FIG. 13 is a block diagram illustrating one pattern for implementing a cloud infrastructure as a service system, according to at least one embodiment.

FIG. 13 is a block diagram 1300 illustrating an example pattern of an IaaS architecture, according to at least one embodiment. Service operators 1302 can be communicatively coupled to a secure host tenancy 1304 that can include a virtual cloud network (VCN) 1306 and a secure host subnet 1308. In some examples, the service operators 1302 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1306 and/or the Internet.

The VCN 1306 can include a local peering gateway (LPG) 1310 that can be communicatively coupled to a secure shell (SSH) VCN 1312 via an LPG 1310 contained in the SSH VCN 1312. The SSH VCN 1312 can include an SSH subnet 1314, and the SSH VCN 1312 can be communicatively coupled to a control plane VCN 1316 via the LPG 1310 contained in the control plane VCN 1316. Also, the SSH VCN 1312 can be communicatively coupled to a data plane VCN 1318 via an LPG 1310. The control plane VCN 1316 and the data plane VCN 1318 can be contained in a service tenancy 1319 that can be owned and/or operated by the IaaS provider.

The control plane VCN 1316 can include a control plane demilitarized zone (DMZ) tier 1320 that acts as a perimeter network (e.g., portions of a corporate network between the corporate intranet and external networks). The DMZ-based servers may have restricted responsibilities and help keep breaches contained. Additionally, the DMZ tier 1320 can include one or more load balancer (LB) subnet(s) 1322, a control plane app tier 1324 that can include app subnet(s) 1326, a control plane data tier 1328 that can include database (DB) subnet(s) 1330 (e.g., frontend DB subnet(s) and/or backend DB subnet(s)). The LB subnet(s) 1322 contained in the control plane DMZ tier 1320 can be communicatively coupled to the app subnet(s) 1326 contained in the control plane app tier 1324 and an Internet gateway 1334 that can be contained in the control plane VCN 1316, and the app subnet(s) 1326 can be communicatively coupled to the DB subnet(s) 1330 contained in the control plane data tier 1328 and a service gateway 1336 and a network address translation (NAT) gateway 1338. The control plane VCN 1316 can include the service gateway 1336 and the NAT gateway 1338.

The control plane VCN 1316 can include a data plane mirror app tier 1340 that can include app subnet(s) 1326. The app subnet(s) 1326 contained in the data plane mirror app tier 1340 can include a virtual network interface controller (VNIC) 1342 that can execute a compute instance 1344. The compute instance 1344 can communicatively couple the app subnet(s) 1326 of the data plane mirror app tier 1340 to app subnet(s) 1326 that can be contained in a data plane app tier 1346.

The data plane VCN 1318 can include the data plane app tier 1346, a data plane DMZ tier 1348, and a data plane data tier 1350. The data plane DMZ tier 1348 can include LB subnet(s) 1322 that can be communicatively coupled to the app subnet(s) 1326 of the data plane app tier 1346 and the Internet gateway 1334 of the data plane VCN 1318. The app subnet(s) 1326 can be communicatively coupled to the service gateway 1336 of the data plane VCN 1318 and the NAT gateway 1338 of the data plane VCN 1318. The data plane data tier 1350 can also include the DB subnet(s) 1330 that can be communicatively coupled to the app subnet(s) 1326 of the data plane app tier 1346.

The Internet gateway 1334 of the control plane VCN 1316 and of the data plane VCN 1318 can be communicatively coupled to a metadata management service 1352 that can be communicatively coupled to public Internet 1354. Public Internet 1354 can be communicatively coupled to the NAT gateway 1338 of the control plane VCN 1316 and of the data plane VCN 1318. The service gateway 1336 of the control plane VCN 1316 and of the data plane VCN 1318 can be communicatively couple to cloud services 1356.

In some examples, the service gateway 1336 of the control plane VCN 1316 or of the data plane VCN 1318 can make application programming interface (API) calls to cloud services 1356 without going through public Internet 1354. The API calls to cloud services 1356 from the service gateway 1336 can be one-way: the service gateway 1336 can make API calls to cloud services 1356, and cloud services 1356 can send requested data to the service gateway 1336. But, cloud services 1356 may not initiate API calls to the service gateway 1336.

In some examples, the secure host tenancy 1304 can be directly connected to the service tenancy 1319, which may be otherwise isolated. The secure host subnet 1308 can communicate with the SSH subnet 1314 through an LPG 1310 that may enable two-way communication over an otherwise isolated system. Connecting the secure host subnet 1308 to the SSH subnet 1314 may give the secure host subnet 1308 access to other entities within the service tenancy 1319.

The control plane VCN 1316 may allow users of the service tenancy 1319 to set up or otherwise provision desired resources. Desired resources provisioned in the control plane VCN 1316 may be deployed or otherwise used in the data plane VCN 1318. In some examples, the control plane VCN 1316 can be isolated from the data plane VCN 1318, and the data plane mirror app tier 1340 of the control plane VCN 1316 can communicate with the data plane app tier 1346 of the data plane VCN 1318 via VNICs 1342 that can be contained in the data plane mirror app tier 1340 and the data plane app tier 1346.

In some examples, users of the system, or customers, can make requests, for example create, read, update, or delete (CRUD) operations, through public Internet 1354 that can communicate the requests to the metadata management service 1352. The metadata management service 1352 can communicate the request to the control plane VCN 1316 through the Internet gateway 1334. The request can be received by the LB subnet(s) 1322 contained in the control plane DMZ tier 1320. The LB subnet(s) 1322 may determine that the request is valid, and in response to this determination, the LB subnet(s) 1322 can transmit the request to app subnet(s) 1326 contained in the control plane app tier 1324. If the request is validated and requires a call to public Internet 1354, the call to public Internet 1354 may be transmitted to the NAT gateway 1338 that can make the call to public Internet 1354. Metadata that may be desired to be stored by the request can be stored in the DB subnet(s) 1330.

In some examples, the data plane mirror app tier 1340 can facilitate direct communication between the control plane VCN 1316 and the data plane VCN 1318. For example, changes, updates, or other suitable modifications to configuration may be desired to be applied to the resources contained in the data plane VCN 1318. Via a VNIC 1342, the control plane VCN 1316 can directly communicate with, and can thereby execute the changes, updates, or other suitable modifications to configuration to, resources contained in the data plane VCN 1318.

In some embodiments, the control plane VCN 1316 and the data plane VCN 1318 can be contained in the service tenancy 1319. In this case, the user, or the customer, of the system may not own or operate either the control plane VCN 1316 or the data plane VCN 1318. Instead, the IaaS provider may own or operate the control plane VCN 1316 and the data plane VCN 1318, both of which may be contained in the service tenancy 1319. This embodiment can enable isolation of networks that may prevent users or customers from interacting with other users', or other customers', resources. Also, this embodiment may allow users or customers of the system to store databases privately without needing to rely on public Internet 1354, which may not have a desired level of threat prevention, for storage.

In other embodiments, the LB subnet(s) 1322 contained in the control plane VCN 1316 can be configured to receive a signal from the service gateway 1336. In this embodiment, the control plane VCN 1316 and the data plane VCN 1318 may be configured to be called by a customer of the IaaS provider without calling public Internet 1354. Customers of the IaaS provider may desire this embodiment since database(s) that the customers use may be controlled by the IaaS provider and may be stored on the service tenancy 1319, which may be isolated from public Internet 1354.

Figure 14:
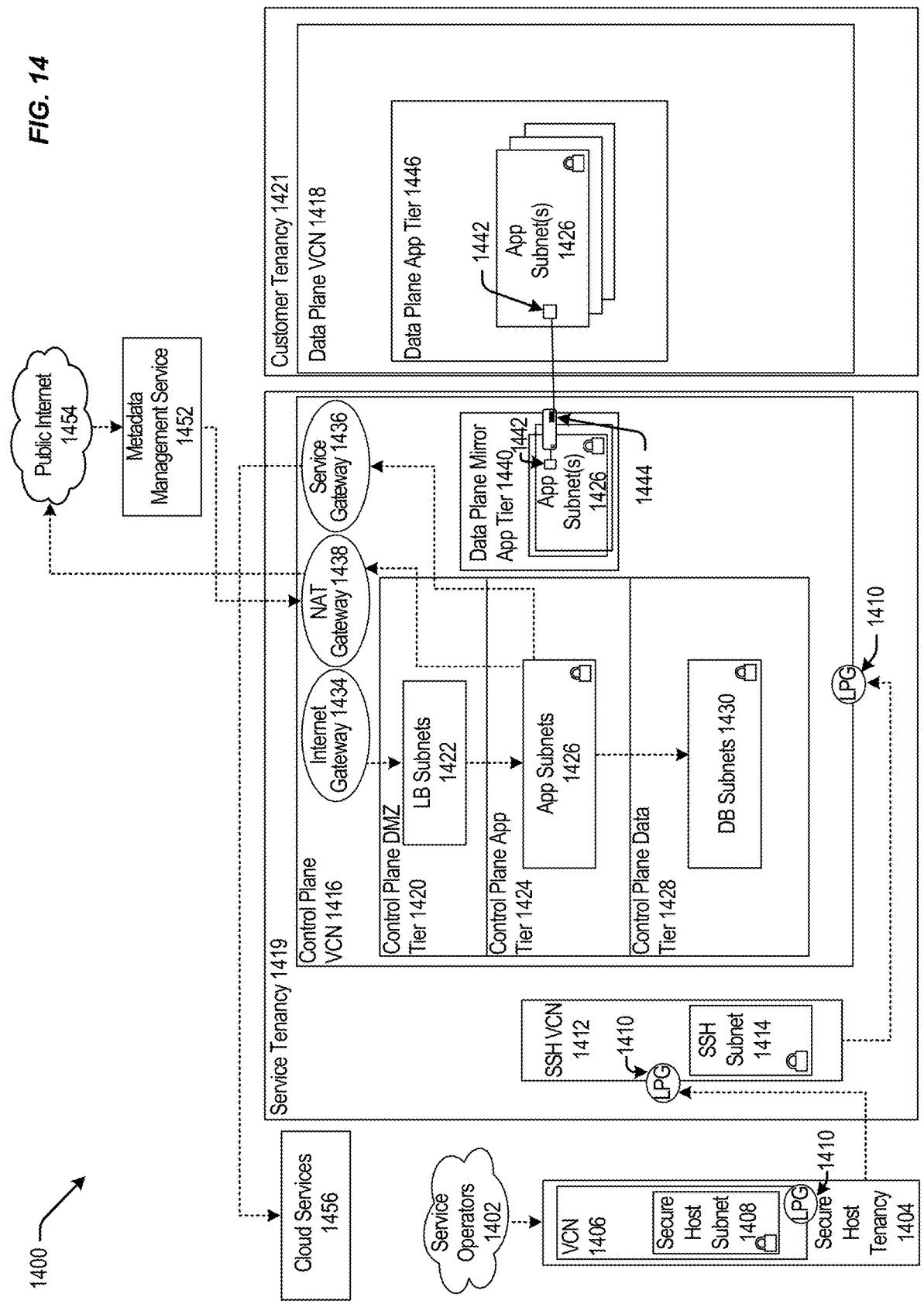
FIG. 14 is a block diagram illustrating another pattern for implementing a cloud infrastructure as a service system, according to at least one embodiment.

FIG. 14 is a block diagram 1400 illustrating another example pattern of an IaaS architecture, according to at least one embodiment. Service operators 1402 (e.g., service operators 1302 of FIG. 13) can be communicatively coupled to a secure host tenancy 1404 (e.g., the secure host tenancy 1304 of FIG. 13) that can include a virtual cloud network (VCN) 1406 (e.g., the VCN 1306 of FIG. 13) and a secure host subnet 1408 (e.g., the secure host subnet 1308 of FIG. 13). The VCN 1406 can include a local peering gateway (LPG) 1410 (e.g., the LPG 1310 of FIG. 13) that can be communicatively coupled to a secure shell (SSH) VCN 1412 (e.g., the SSH VCN 1312 of FIG. 13) via an LPG 1310 contained in the SSH VCN 1412. The SSH VCN 1412 can include an SSH subnet 1414 (e.g., the SSH subnet 1314 of FIG. 13), and the SSH VCN 1412 can be communicatively coupled to a control plane VCN 1416 (e.g., the control plane VCN 1316 of FIG. 13) via an LPG 1410 contained in the control plane VCN 1416. The control plane VCN 1416 can be contained in a service tenancy 1419 (e.g., the service tenancy 1319 of FIG. 13), and the data plane VCN 1418 (e.g., the data plane VCN 1318 of FIG. 13) can be contained in a customer tenancy 1421 that may be owned or operated by users, or customers, of the system.

The control plane VCN 1416 can include a control plane DMZ tier 1420 (e.g., the control plane DMZ tier 1320 of FIG. 13) that can include LB subnet(s) 1422 (e.g., LB subnet(s) 1322 of FIG. 13), a control plane app tier 1424 (e.g., the control plane app tier 1324 of FIG. 13) that can include app subnet(s) 1426 (e.g., app subnet(s) 1326 of FIG. 13), a control plane data tier 1428 (e.g., the control plane data tier 1328 of FIG. 13) that can include database (DB) subnet(s) 1430 (e.g., similar to DB subnet(s) 1330 of FIG. 13). The LB subnet(s) 1422 contained in the control plane DMZ tier 1420 can be communicatively coupled to the app subnet(s) 1426 contained in the control plane app tier 1424 and an Internet gateway 1434 (e.g., the Internet gateway 1334 of FIG. 13) that can be contained in the control plane VCN 1416, and the app subnet(s) 1426 can be communicatively coupled to the DB subnet(s) 1430 contained in the control plane data tier 1428 and a service gateway 1436 (e.g., the service gateway 1336 of FIG. 13) and a network address translation (NAT) gateway 1438 (e.g., the NAT gateway 1338 of FIG. 13). The control plane VCN 1416 can include the service gateway 1436 and the NAT gateway 1438.

The control plane VCN 1416 can include a data plane mirror app tier 1440 (e.g., the data plane mirror app tier 1340 of FIG. 13) that can include app subnet(s) 1426. The app subnet(s) 1426 contained in the data plane mirror app tier 1440 can include a virtual network interface controller (VNIC) 1442 (e.g., the VNIC of 1342) that can execute a compute instance 1444 (e.g., similar to the compute instance 1344 of FIG. 13). The compute instance 1444 can facilitate communication between the app subnet(s) 1426 of the data plane mirror app tier 1440 and the app subnet(s) 1426 that can be contained in a data plane app tier 1446 (e.g., the data plane app tier 1346 of FIG. 13) via the VNIC 1442 contained in the data plane mirror app tier 1440 and the VNIC 1442 contained in the data plane app tier 1446.

The Internet gateway 1434 contained in the control plane VCN 1416 can be communicatively coupled to a metadata management service 1452 (e.g., the metadata management service 1352 of FIG. 13) that can be communicatively coupled to public Internet 1454 (e.g., public Internet 1354 of FIG. 13). Public Internet 1454 can be communicatively coupled to the NAT gateway 1438 contained in the control plane VCN 1416. The service gateway 1436 contained in the control plane VCN 1416 can be communicatively couple to cloud services 1456 (e.g., cloud services 1356 of FIG. 13).

In some examples, the data plane VCN 1418 can be contained in the customer tenancy 1421. In this case, the IaaS provider may provide the control plane VCN 1416 for each customer, and the IaaS provider may, for each customer, set up a unique compute instance 1444 that is contained in the service tenancy 1419. Each compute instance 1444 may allow communication between the control plane VCN 1416, contained in the service tenancy 1419, and the data plane VCN 1418 that is contained in the customer tenancy 1421. The compute instance 1444 may allow resources, that are provisioned in the control plane VCN 1416 that is contained in the service tenancy 1419, to be deployed or otherwise used in the data plane VCN 1418 that is contained in the customer tenancy 1421.

In other examples, the customer of the IaaS provider may have databases that live in the customer tenancy 1421. In this example, the control plane VCN 1416 can include the data plane mirror app tier 1440 that can include app subnet(s) 1426. The data plane mirror app tier 1440 can reside in the data plane VCN 1418, but the data plane mirror app tier 1440 may not live in the data plane VCN 1418. That is, the data plane mirror app tier 1440 may have access to the customer tenancy 1421, but the data plane mirror app tier 1440 may not exist in the data plane VCN 1418 or be owned or operated by the customer of the IaaS provider. The data plane mirror app tier 1440 may be configured to make calls to the data plane VCN 1418 but may not be configured to make calls to any entity contained in the control plane VCN 1416. The customer may desire to deploy or otherwise use resources in the data plane VCN 1418 that are provisioned in the control plane VCN 1416, and the data plane mirror app tier 1440 can facilitate the desired deployment, or other usage of resources, of the customer.

In some embodiments, the customer of the IaaS provider can apply filters to the data plane VCN 1418. In this embodiment, the customer can determine what the data plane VCN 1418 can access, and the customer may restrict access to public Internet 1454 from the data plane VCN 1418. The IaaS provider may not be able to apply filters or otherwise control access of the data plane VCN 1418 to any outside networks or databases. Applying filters and controls by the customer onto the data plane VCN 1418, contained in the customer tenancy 1421, can help isolate the data plane VCN 1418 from other customers and from public Internet 1454.

In some embodiments, cloud services 1456 can be called by the service gateway 1436 to access services that may not exist on public Internet 1454, on the control plane VCN 1416, or on the data plane VCN 1418. The connection between cloud services 1456 and the control plane VCN 1416 or the data plane VCN 1418 may not be live or continuous. Cloud services 1456 may exist on a different network owned or operated by the IaaS provider. Cloud services 1456 may be configured to receive calls from the service gateway 1436 and may be configured to not receive calls from public Internet 1454. Some cloud services 1456 may be isolated from other cloud services 1456, and the control plane VCN 1416 may be isolated from cloud services 1456 that may not be in the same region as the control plane VCN 1416. For example, the control plane VCN 1416 may be located in "Region 1," and cloud service "Deployment 13," may be located in Region 1 and in "Region 2." If a call to Deployment 13 is made by the service gateway 1436 contained in the control plane VCN 1416 located in Region 1, the call may be transmitted to Deployment 13 in Region 1. In this example, the control plane VCN 1416, or Deployment 13 in Region 1, may not be communicatively coupled to, or otherwise in communication with, Deployment 13 in Region 2.

Figure 15:
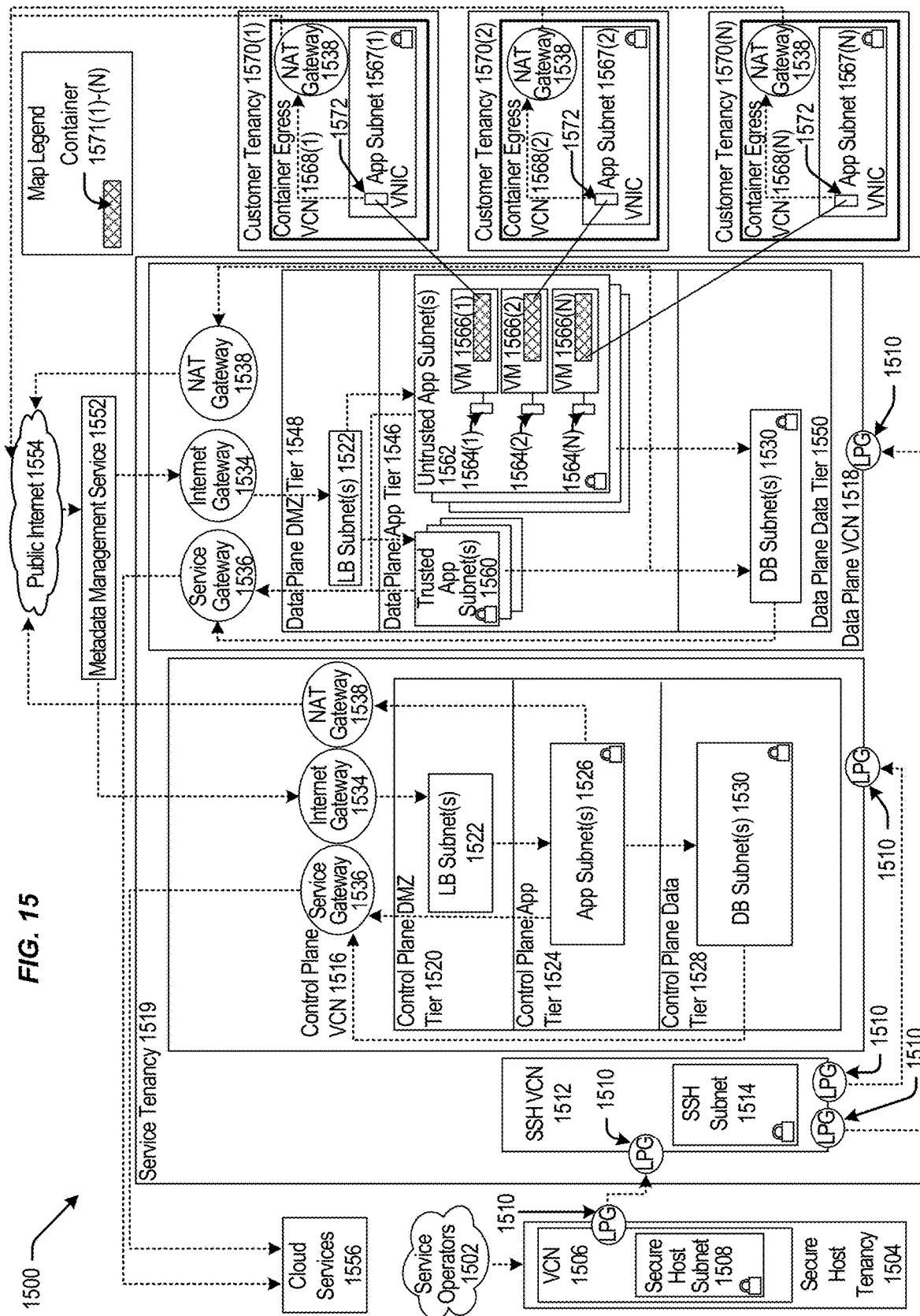
FIG. 15 is a block diagram illustrating another pattern for implementing a cloud infrastructure as a service system, according to at least one embodiment.

FIG. 15 is a block diagram 1500 illustrating another example pattern of an IaaS architecture, according to at least one embodiment. Service operators 1502 (e.g., service operators 1302 of FIG. 13) can be communicatively coupled to a secure host tenancy 1504 (e.g., the secure host tenancy 1304 of FIG. 13) that can include a virtual cloud network (VCN) 1506 (e.g., the VCN 1306 of FIG. 13) and a secure host subnet 1508 (e.g., the secure host subnet 1308 of FIG. 13). The VCN 1506 can include an LPG 1510 (e.g., the LPG 1310 of FIG. 13) that can be communicatively coupled to an SSH VCN 1512 (e.g., the SSH VCN 1312 of FIG. 13) via an LPG 1510 contained in the SSH VCN 1512. The SSH VCN 1512 can include an SSH subnet 1514 (e.g., the SSH subnet 1314 of FIG. 13), and the SSH VCN 1512 can be communicatively coupled to a control plane VCN 1516 (e.g., the control plane VCN 1316 of FIG. 13) via an LPG 1510 contained in the control plane VCN 1516 and to a data plane VCN 1518 (e.g., the data plane 1318 of FIG. 13) via an LPG 1510 contained in the data plane VCN 1518. The control plane VCN 1516 and the data plane VCN 1518 can be contained in a service tenancy 1519 (e.g., the service tenancy 1319 of FIG. 13).

The control plane VCN 1516 can include a control plane DMZ tier 1520 (e.g., the control plane DMZ tier 1320 of FIG. 13) that can include load balancer (LB) subnet(s) 1522 (e.g., LB subnet(s) 1322 of FIG. 13), a control plane app tier 1524 (e.g., the control plane app tier 1324 of FIG. 13) that can include app subnet(s) 1526 (e.g., similar to app subnet(s) 1326 of FIG. 13), a control plane data tier 1528 (e.g., the control plane data tier 1328 of FIG. 13) that can include DB subnet(s) 1530. The LB subnet(s) 1522 contained in the control plane DMZ tier 1520 can be communicatively coupled to the app subnet(s) 1526 contained in the control plane app tier 1524 and to an Internet gateway 1534 (e.g., the Internet gateway 1334 of FIG. 13) that can be contained in the control plane VCN 1516, and the app subnet(s) 1526 can be communicatively coupled to the DB subnet(s) 1530 contained in the control plane data tier 1528 and to a service gateway 1536 (e.g., the service gateway of FIG. 13) and a network address translation (NAT) gateway 1538 (e.g., the NAT gateway 1338 of FIG. 13). The control plane VCN 1516 can include the service gateway 1536 and the NAT gateway 1538.

The data plane VCN 1518 can include a data plane app tier 1546 (e.g., the data plane app tier 1346 of FIG. 13), a data plane DMZ tier 1548 (e.g., the data plane DMZ tier 1348 of FIG. 13), and a data plane data tier 1550 (e.g., the data plane data tier 1350 of FIG. 13). The data plane DMZ tier 1548 can include LB subnet(s) 1522 that can be communicatively coupled to trusted app subnet(s) 1560 and untrusted app subnet(s) 1562 of the data plane app tier 1546 and the Internet gateway 1534 contained in the data plane VCN 1518. The trusted app subnet(s) 1560 can be communicatively coupled to the service gateway 1536 contained in the data plane VCN 1518, the NAT gateway 1538 contained in the data plane VCN 1518, and DB subnet(s) 1530 contained in the data plane data tier 1550. The untrusted app subnet(s) 1562 can be communicatively coupled to the service gateway 1536 contained in the data plane VCN 1518 and DB subnet(s) 1530 contained in the data plane data tier 1550. The data plane data tier 1550 can include DB subnet(s) 1530 that can be communicatively coupled to the service gateway 1536 contained in the data plane VCN 1518.

The untrusted app subnet(s) 1562 can include one or more primary VNICs 1564(1)-(N) that can be communicatively coupled to tenant virtual machines (VMs) 1566(1)-(N). Each tenant VM 1566(1)-(N) can be communicatively coupled to a respective app subnet 1567(1)-(N) that can be contained in respective container egress VCNs 1568(1)-(N) that can be contained in respective customer tenancies 1570(1)-(N). Respective secondary VNICs 1572(1)-(N) can facilitate communication between the untrusted app subnet(s) 1562 contained in the data plane VCN 1518 and the app subnet contained in the container egress VCNs 1568(1)-(N). Each container egress VCNs 1568(1)-(N) can include a NAT gateway 1538 that can be communicatively coupled to public Internet 1554 (e.g., public Internet 1354 of FIG. 13).

The Internet gateway 1534 contained in the control plane VCN 1516 and contained in the data plane VCN 1518 can be communicatively coupled to a metadata management service 1552 (e.g., the metadata management system 1352 of FIG. 13) that can be communicatively coupled to public Internet 1554. Public Internet 1554 can be communicatively coupled to the NAT gateway 1538 contained in the control plane VCN 1516 and contained in the data plane VCN 1518. The service gateway 1536 contained in the control plane VCN 1516 and contained in the data plane VCN 1518 can be communicatively couple to cloud services 1556.

In some embodiments, the data plane VCN 1518 can be integrated with customer tenancies 1570. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1546. Code to run the function may be executed in the VMs 1566(1)-(N), and the code may not be configured to run anywhere else on the data plane VCN 1518. Each VM 1566(1)-(N) may be connected to one customer tenancy 1570. Respective containers 1571(1)-(N) contained in the VMs 1566(1)-(N) may be configured to run the code. In this case, there can be a dual isolation (e.g., the containers 1571(1)-(N) running code, where the containers 1571(1)-(N) may be contained in at least the VM 1566(1)-(N) that are contained in the untrusted app subnet(s) 1562), which may help prevent incorrect or otherwise undesirable code from damaging the network of the IaaS provider or from damaging a network of a different customer. The containers 1571(1)-(N) may be communicatively coupled to the customer tenancy 1570 and may be configured to transmit or receive data from the customer tenancy 1570. The containers 1571(1)-(N) may not be configured to transmit or receive data from any other entity in the data plane VCN 1518. Upon completion of running the code, the IaaS provider may kill or otherwise dispose of the containers 1571(1)-(N).

In some embodiments, the trusted app subnet(s) 1560 may run code that may be owned or operated by the IaaS provider. In this embodiment, the trusted app subnet(s) 1560 may be communicatively coupled to the DB subnet(s) 1530 and be configured to execute CRUD operations in the DB subnet(s) 1530. The untrusted app subnet(s) 1562 may be communicatively coupled to the DB subnet(s) 1530, but in this embodiment, the untrusted app subnet(s) may be configured to execute read operations in the DB subnet(s) 1530. The containers 1571(1)-(N) that can be contained in the VM 1566(1)-(N) of each customer and that may run code from the customer may not be communicatively coupled with the DB subnet(s) 1530.

In other embodiments, the control plane VCN 1516 and the data plane VCN 1518 may not be directly communicatively coupled. In this embodiment, there may be no direct communication between the control plane VCN 1516 and the data plane VCN 1518. However, communication can occur indirectly through at least one method. An LPG 1510 may be established by the IaaS provider that can facilitate communication between the control plane VCN 1516 and the data plane VCN 1518. In another example, the control plane VCN 1516 or the data plane VCN 1518 can make a call to cloud services 1556 via the service gateway 1536. For example, a call to cloud services 1556 from the control plane VCN 1516 can include a request for a service that can communicate with the data plane VCN 1518.

Figure 16:
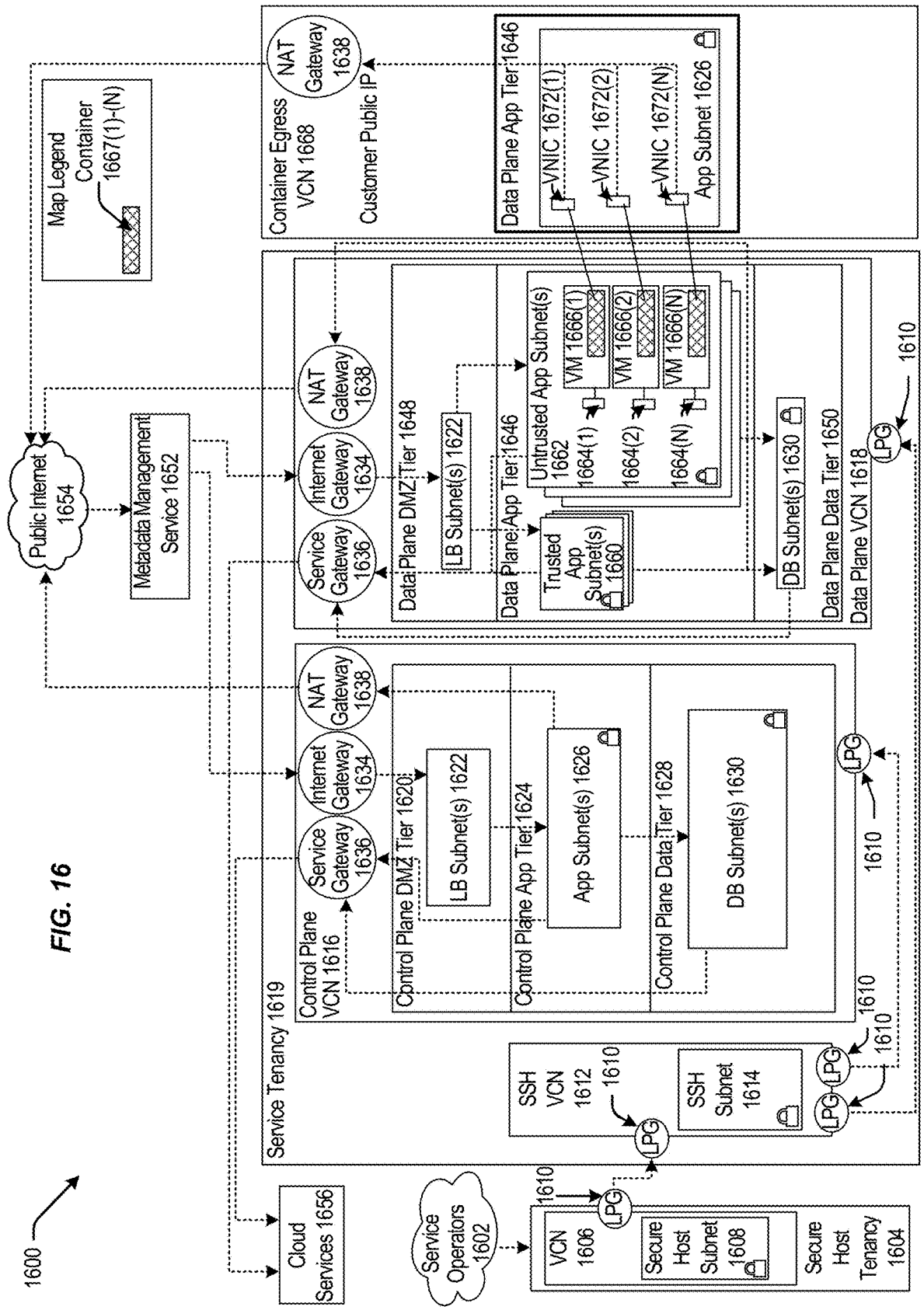
FIG. 16 is a block diagram illustrating another pattern for implementing a cloud infrastructure as a service system, according to at least one embodiment.

FIG. 16 is a block diagram 1600 illustrating another example pattern of an IaaS architecture, according to at least one embodiment. Service operators 1602 (e.g., service operators 1302 of FIG. 13) can be communicatively coupled to a secure host tenancy 1604 (e.g., the secure host tenancy 1304 of FIG. 13) that can include a virtual cloud network (VCN) 1606 (e.g., the VCN 1306 of FIG. 13) and a secure host subnet 1608 (e.g., the secure host subnet 1308 of FIG. 13). The VCN 1606 can include an LPG 1610 (e.g., the LPG 1310 of FIG. 13) that can be communicatively coupled to an SSH VCN 1612 (e.g., the SSH VCN 1312 of FIG. 13) via an LPG 1610 contained in the SSH VCN 1612. The SSH VCN 1612 can include an SSH subnet 1614 (e.g., the SSH subnet 1314 of FIG. 13), and the SSH VCN 1612 can be communicatively coupled to a control plane VCN 1616 (e.g., the control plane VCN 1316 of FIG. 13) via an LPG 1610 contained in the control plane VCN 1616 and to a data plane VCN 1618 (e.g., the data plane 1318 of FIG. 13) via an LPG 1610 contained in the data plane VCN 1618. The control plane VCN 1616 and the data plane VCN 1618 can be contained in a service tenancy 1619 (e.g., the service tenancy 1319 of FIG. 13).

The control plane VCN 1616 can include a control plane DMZ tier 1620 (e.g., the control plane DMZ tier 1320 of FIG. 13) that can include LB subnet(s) 1622 (e.g., LB subnet(s) 1322 of FIG. 13), a control plane app tier 1624 (e.g., the control plane app tier 1324 of FIG. 13) that can include app subnet(s) 1626 (e.g., app subnet(s) 1326 of FIG. 13), a control plane data tier 1628 (e.g., the control plane data tier 1328 of FIG. 13) that can include DB subnet(s) 1630 (e.g., DB subnet(s) 1530 of FIG. 15). The LB subnet(s) 1622 contained in the control plane DMZ tier 1620 can be communicatively coupled to the app subnet(s) 1626 contained in the control plane app tier 1624 and to an Internet gateway 1634 (e.g., the Internet gateway 1334 of FIG. 13) that can be contained in the control plane VCN 1616, and the app subnet(s) 1626 can be communicatively coupled to the DB subnet(s) 1630 contained in the control plane data tier 1628 and to a service gateway 1636 (e.g., the service gateway of FIG. 13) and a network address translation (NAT) gateway 1638 (e.g., the NAT gateway 1338 of FIG. 13). The control plane VCN 1616 can include the service gateway 1636 and the NAT gateway 1638.

The data plane VCN 1618 can include a data plane app tier 1646 (e.g., the data plane app tier 1346 of FIG. 13), a data plane DMZ tier 1648 (e.g., the data plane DMZ tier 1348 of FIG. 13), and a data plane data tier 1650 (e.g., the data plane data tier 1350 of FIG. 13). The data plane DMZ tier 1648 can include LB subnet(s) 1622 that can be communicatively coupled to trusted app subnet(s) 1660 (e.g., trusted app subnet(s) 1560 of FIG. 15) and untrusted app subnet(s) 1662 (e.g., untrusted app subnet(s) 1562 of FIG. 15) of the data plane app tier 1646 and the Internet gateway 1634 contained in the data plane VCN 1618. The trusted app subnet(s) 1660 can be communicatively coupled to the service gateway 1636 contained in the data plane VCN 1618, the NAT gateway 1638 contained in the data plane VCN 1618, and DB subnet(s) 1630 contained in the data plane data tier 1650. The untrusted app subnet(s) 1662 can be communicatively coupled to the service gateway 1636 contained in the data plane VCN 1618 and DB subnet(s) 1630 contained in the data plane data tier 1650. The data plane data tier 1650 can include DB subnet(s) 1630 that can be communicatively coupled to the service gateway 1636 contained in the data plane VCN 1618.

The untrusted app subnet(s) 1662 can include primary VNICs 1664(1)-(N) that can be communicatively coupled to tenant virtual machines (VMs) 1666(1)-(N) residing within the untrusted app subnet(s) 1662. Each tenant VM 1666(1)-(N) can run code in a respective container 1667(1)-(N), and be communicatively coupled to an app subnet 1626 that can be contained in a data plane app tier 1646 that can be contained in a container egress VCN 1668. Respective secondary VNICs 1672(1)-(N) can facilitate communication between the untrusted app subnet(s) 1662 contained in the data plane VCN 1618 and the app subnet contained in the container egress VCN 1668. The container egress VCN can include a NAT gateway 1638 that can be communicatively coupled to public Internet 1654 (e.g., public Internet 1354 of FIG. 13).

The Internet gateway 1634 contained in the control plane VCN 1616 and contained in the data plane VCN 1618 can be communicatively coupled to a metadata management service 1652 (e.g., the metadata management system 1352 of FIG. 13) that can be communicatively coupled to public Internet 1654. Public Internet 1654 can be communicatively coupled to the NAT gateway 1638 contained in the control plane VCN 1616 and contained in the data plane VCN 1618. The service gateway 1636 contained in the control plane VCN 1616 and contained in the data plane VCN 1618 can be communicatively couple to cloud services 1656.

In some examples, the pattern illustrated by the architecture of block diagram 1600 of FIG. 16 may be considered an exception to the pattern illustrated by the architecture of block diagram 1500 of FIG. 15 and may be desirable for a customer of the IaaS provider if the IaaS provider cannot directly communicate with the customer (e.g., a disconnected region). The respective containers 1667(1)-(N) that are contained in the VMs 1666(1)-(N) for each customer can be accessed in real-time by the customer. The containers 1667(1)-(N) may be configured to make calls to respective secondary VNICs 1672(1)-(N) contained in app subnet(s) 1626 of the data plane app tier 1646 that can be contained in the container egress VCN 1668. The secondary VNICs 1672(1)-(N) can transmit the calls to the NAT gateway 1638 that may transmit the calls to public Internet 1654. In this example, the containers 1667(1)-(N) that can be accessed in real-time by the customer can be isolated from the control plane VCN 1616 and can be isolated from other entities contained in the data plane VCN 1618. The containers 1667(1)-(N) may also be isolated from resources from other customers.

In other examples, the customer can use the containers 1667(1)-(N) to call cloud services 1656. In this example, the customer may run code in the containers 1667(1)-(N) that requests a service from cloud services 1656. The containers 1667(1)-(N) can transmit this request to the secondary VNICs 1672(1)-(N) that can transmit the request to the NAT gateway that can transmit the request to public Internet 1654. Public Internet 1654 can transmit the request to LB subnet(s) 1622 contained in the control plane VCN 1616 via the Internet gateway 1634. In response to determining the request is valid, the LB subnet(s) can transmit the request to app subnet(s) 1626 that can transmit the request to cloud services 1656 via the service gateway 1636.

It should be appreciated that IaaS architectures 1300, 1400, 1500, 1600 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 17:
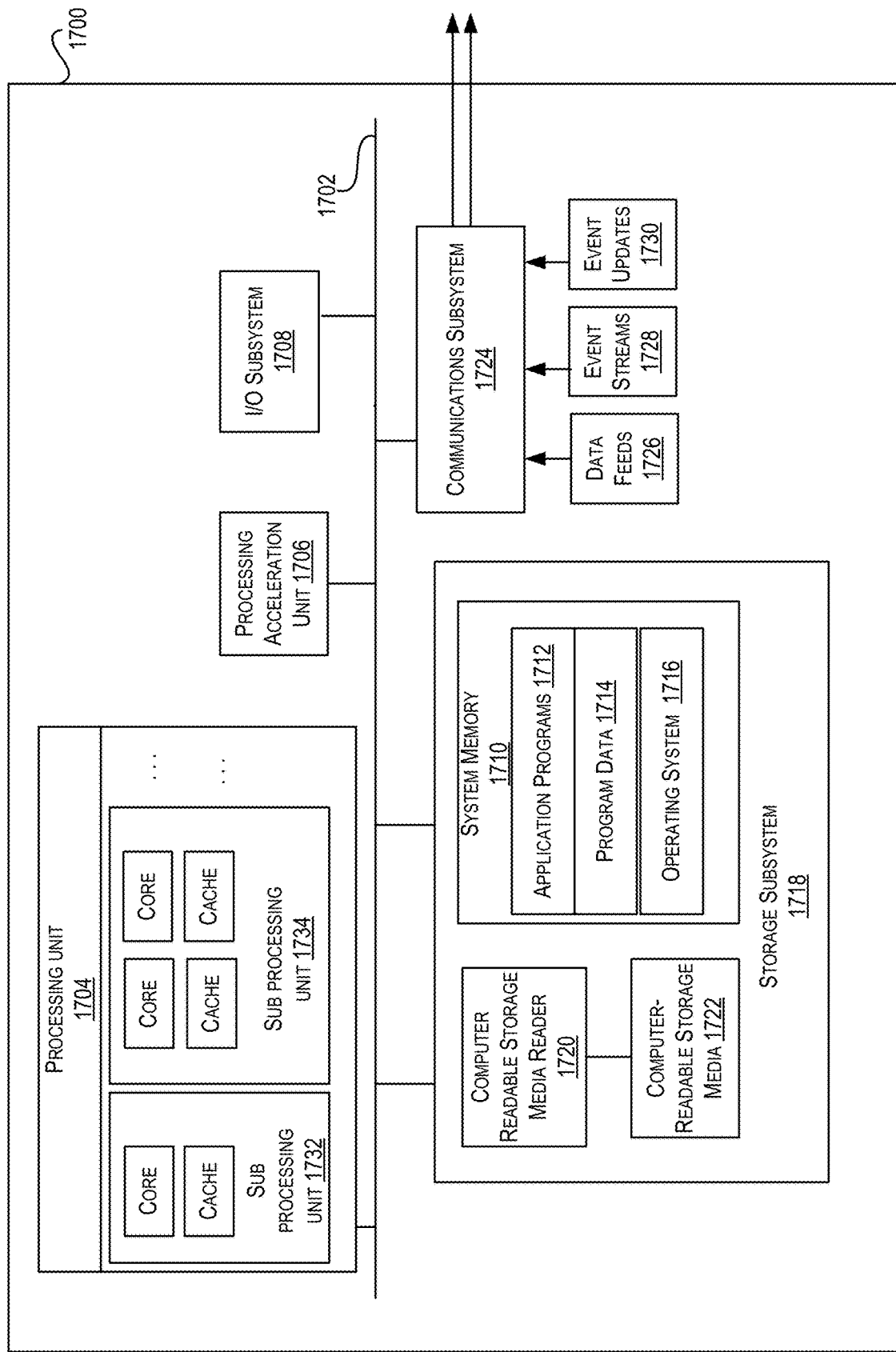
FIG. 17 is a block diagram illustrating an example computer system, according to at least one embodiment.

FIG. 17 illustrates an example computer system 1700, in which various embodiments may be implemented. The system 1700 may be used to implement any of the computer systems described above. As shown in the figure, computer system 1700 includes a processing unit 1704 that communicates with a number of peripheral subsystems via a bus subsystem 1702. These peripheral subsystems may include a processing acceleration unit 1706, an I/O subsystem 1708, a storage subsystem 1718 and a communications subsystem 1724. Storage subsystem 1718 includes tangible computer-readable storage media 1722 and a system memory 1710.

Bus subsystem 1702 provides a mechanism for letting the various components and subsystems of computer system 1700 communicate with each other as intended. Although bus subsystem 1702 is shown schematically as a single bus, alternative embodiments of the bus subsystem may utilize multiple buses. Bus subsystem 1702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1704, which can be implemented as one or more integrated circuits (e.g., a conventional microprocessor or microcontroller), controls the operation of computer system 1700. One or more processors may be included in processing unit 1704. These processors may include single core or multicore processors. In certain embodiments, processing unit 1704 may be implemented as one or more independent processing units 1732 and/or 1734 with single or multicore processors included in each processing unit. In other embodiments, processing unit 1704 may also be implemented as a quad-core processing unit formed by integrating two dual-core processors into a single chip.

In various embodiments, processing unit 1704 can execute a variety of programs in response to program code and can maintain multiple concurrently executing programs or processes. At any given time, some or all of the program code to be executed can be resident in processor(s) 1704 and/or in storage subsystem 1718. Through suitable programming, processor(s) 1704 can provide various functionalities described above. Computer system 1700 may additionally include a processing acceleration unit 1706, which can include a digital signal processor (DSP), a special-purpose processor, and/or the like.

I/O subsystem 1708 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display sub system, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1700 to a user or other computer. For example, user interface output devices may include, without limitation, a variety of display devices that visually convey text, graphics and audio/video information such as monitors, printers, speakers, headphones, automotive navigation systems, plotters, voice output devices, and modems. Computer system 1700 may comprise a storage subsystem 1718 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1704 provide the functionality described above. Storage subsystem 1718 may also provide a repository for storing data used in accordance with the present disclosure.

As depicted in the example in FIG. 17, storage subsystem 1718 can include various components including a system memory 1710, computer-readable storage media 1722, and a computer readable storage media reader 1720. System memory 1710 may store program instructions that are loadable and executable by processing unit 1704. System memory 1710 may also store data that is used during the execution of the instructions and/or data that is generated during the execution of the program instructions. Various different kinds of programs may be loaded into system memory 1710 including but not limited to client applications, Web browsers, mid-tier applications, relational database management systems (RDBMS), virtual machines, containers, etc.

System memory 1710 may also store an operating system 1716. Examples of operating system 1716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1700 executes one or more virtual machines, the virtual machines along with their guest operating systems (GOSs) may be loaded into system memory 1710 and executed by one or more processors or cores of processing unit 1704.

System memory 1710 can come in different configurations depending upon the type of computer system 1700. For example, system memory 1710 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1710 may include a basic input/output system (BIOS) containing basic routines that help to transfer information between elements within computer system 1700, such as during start-up.

Computer-readable storage media 1722 may represent remote, local, fixed, and/or removable storage devices plus storage media for temporarily and/or more permanently containing, storing, computer-readable information for use by computer system 1700 including instructions executable by processing unit 1704 of computer system 1700.

Computer-readable storage media 1722 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1700.

By way of example, computer-readable storage media 1722 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1722 may include, but is not limited to, Zip® drives, flash memory cards, universal serial bus (USB) flash drives, secure digital (SD) cards, DVD disks, digital video tape, and the like. Computer-readable storage media 1722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1700.

Machine-readable instructions executable by one or more processors or cores of processing unit 1704 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1724 provides an interface to other computer systems and networks. Communications subsystem 1724 serves as an interface for receiving data from and transmitting data to other systems from computer system 1700. For example, communications subsystem 1724 may enable computer system 1700 to connect to one or more devices via the Internet. In some embodiments communications subsystem 1724 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1724 can provide wired network connectivity (e.g., Ethernet) in addition to or instead of a wireless interface.

In some embodiments, communications subsystem 1724 may also receive input communication in the form of structured and/or unstructured data feeds 1726, event streams 1728, event updates 1730, and the like on behalf of one or more users who may use computer system 1700.

By way of example, communications subsystem 1724 may be configured to receive data feeds 1726 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1724 may also be configured to receive data in the form of continuous data streams, which may include event streams 1728 of real-time events and/or event updates 1730, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1724 may also be configured to output the structured and/or unstructured data feeds 1726, event streams 1728, event updates 1730, and the like to one or more databases that may be in communication with one or more streaming data source computers coupled to computer system 1700.

Computer system 1700 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1700 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
   determining to perform a health check on a portion of a communications network, the communications network comprising a plurality of hosts, each of the plurality of hosts comprising a routing agent and an advertising agent;
   adding a test route to a database accessible by each of the plurality of hosts, the test route indicated as applicable to every host and pointing to an IP address, the test route having an expected path length;
   receiving the test route from the database with the routing agents of at least some of the plurality of hosts;
   for each of the at least some of the plurality of hosts, providing the test route from the routing agent to the advertising agent;
   advertising the test route with at least some of the plurality of hosts to a plurality of switches within the communications network; and
   determining success of health check based on information received from the plurality of switches and information in the database, the information received from the switches indicating a length of the test route, and the information in the database indicating the expected path length of the test route.

2. The method of claim 1, wherein the at least some of the plurality of hosts comprises all of the plurality of hosts.

3. The method of claim 1, wherein the at least some of the plurality of hosts comprises less than all of the plurality of hosts.

4. The method of claim 1, wherein receiving the test route from the database with the routing agents comprises retrieving the test route with the routing agents.

5. The method of claim 1, wherein the plurality of switches comprises a plurality of Top-Of-Rack (TOR) switches.

6. The method of claim 1, wherein advertising the test route comprises: each of the advertising agents advertising the test route to a one of the plurality of switches associated with the advertising agent.

7. The method of claim 6, further comprising receiving the advertised test route at the one of the plurality of switches associated with the advertising agent.

8. The method of claim 7, further comprising generating the information indicative of the switch receiving the advertised test route and the path length of the advertised test route.

9. The method of claim 8, further comprising providing the information to a network provisioner.

10. The method of claim 9, wherein providing the information to a network provisioner comprises storing the information in a database accessible by the network provisioner.

11. The method of claim 9, wherein information for each of the plurality of switches is provided to the network provisioner.

12. The method of claim 11, wherein the network provisioner determines success of the health check based on the information received from the plurality of switches.

13. The method of claim 12, wherein determining success of the health check comprises determining if the path length of the test route stored by each the plurality of switches matches the path length of the advertised test route.

14. The method of claim 13, further comprising generating an alert when the health check is unsuccessful.

15. The method of claim 12, wherein determining success of the health check comprises determining if the path length of the test route stored by each the plurality of switches within a predetermined time period subsequent to adding the test route to the database matches the path length of the advertised test route.

16. A system comprising:
    memory comprising a database of routing information;
    a plurality of hosts, wherein each of the plurality of hosts comprises a routing agent and an advertising agent, and wherein the database of routing information is accessible by each of the hosts;
    a plurality of switches, wherein the advertising agents of the plurality of hosts are coupled at least one of the switches, and wherein the advertising agent is configured to advertise a route to the at least one of the switches with which it is coupled;
    at least one processor configured to:
      determine to perform a health check on a portion of a communications network comprising the plurality of hosts and the plurality of switches; and
      add a test route to the database of routing information, the test route indicated as applicable to each of the plurality of hosts and pointing to an IP address, the test route having an expected path length;
    wherein at least some of the plurality of hosts are configured to:
      receive the test route from the database with the routing agent of each of the at least some of the plurality of hosts;
      provide the test route from the routing agent to the advertising agent; and
      advertise the test route to the plurality of switches within the communications network; and
    wherein the at least one processor can determine success of health check based on information received from the plurality of switches and information in the database, the information received from the switches indicating a length of the test route, and the information in the database indicating the expected path length of the test route.

17. The system of claim 16, wherein advertising the test route comprises: each of the advertising agents advertising the test route to a one of the plurality of switches associated with the advertising agent.

18. A non-transitory computer-readable storage medium storing a plurality of instructions executable by one or more processors, the plurality of instructions when executed by the one or more processors cause the one or more processors to:

determine to perform a health check on a portion of a communications network, the communications network comprising a plurality of hosts, each of the plurality of hosts comprising a routing agent and an advertising agent;

add a test route to a database accessible by each of the plurality of hosts, the test route indicated as applicable to every host and pointing to an IP address, the test route having an expected path length;

receive the test route from the database with the routing agents of at least some of the plurality of hosts;

for each of the at least some of the plurality of hosts, provide the test route from the routing agent to the advertising agent;

advertise the test route with at least some of the plurality of hosts to a plurality of switches within the communications network; and determine success of health check based on information received from the plurality of switches and information in the database, the information received from the switches indicating a length of the test route, and the information in the database indicating the expected path length of the test route.

19. The non-transitory computer-readable storage medium of claim 18, wherein advertising the test route comprises: each of the advertising agents advertising the test route to a one of the plurality of switches associated with the advertising agent.

20. The non-transitory computer-readable storage medium of claim 19, wherein determining the success of the health check based on information received from the plurality of switches comprises:

receiving the advertised test route at the one of the plurality of switches associated with the advertising agent;

generating information indicative of the switch receiving the advertised test route and the path length of the advertised test route;

providing the information to a network provisioner, wherein providing the information to a network provisioner comprises storing the information in a database accessible by the network provisioner, and wherein information for each of the plurality of switches is provided to the network provisioner; and determining success of the health check with the network provisioner based on the information received from the plurality of switches.

* * * * *

UNITED STATES PATENT AND TRADEMARK OFFICE
CERTIFICATE OF CORRECTION

| | | |
|---|---|---|
| PATENT NO. | : 12,301,477 B2 | Page 1 of 1 |
| APPLICATION NO. | : 17/946526 | |
| DATED | : May 13, 2025 | |
| INVENTOR(S) | : Dorantes Loarca et al. | |

It is certified that error appears in the above-identified patent and that said Letters Patent is hereby corrected as shown below:

In the Drawings

On sheet 2 of 17, in FIG. 2, under reference numeral 268, Line 2, delete "INTANCE" and insert -- INSTANCE --, therefor.

On sheet 2 of 17, in FIG. 2, under reference numeral 274, Line 2, delete "INTANCE" and insert -- INSTANCE --, therefor.

On sheet 8 of 17, in FIG. 8, and on the title page, the illustrative print figure, under reference numeral 816, Line 1, delete "providisioner." and insert -- provisioner. --, therefor.

In the Specification

In Column 9, Line 62, delete "general." and insert -- general, --, therefor.

In Column 17, Line 4, delete "and or" and insert -- and/or --, therefor.

In Column 53, Lines 64-67, delete "(EISA) bus, Video Electronics Standards Association (VESA) local bus, and Peripheral Component Interconnect (PCI) bus, which can be implemented as a Mezzanine bus manufactured to the IEEE P1386.1 standard." and insert the same on Line 63, as a continuation of same paragraph.

Signed and Sealed this
Twenty-second Day of July, 2025

Coke Morgan Stewart
*Acting Director of the United States Patent and Trademark Office*